(12) United States Patent
Rozin et al.

(10) Patent No.: US 12,327,143 B2
(45) Date of Patent: Jun. 10, 2025

(54) MEMORY FOR A NEURAL NETWORK PROCESSING SYSTEM

(71) Applicant: Synaptics Incorporated, San Jose, CA (US)

(72) Inventors: Hagay Rozin, Raanana (IL); Ilan Adar, Shoham (IL); Arnon Senderov, Raanana (IL)

(73) Assignee: Synaptics Incorporated, San Jose, CA (US)

( * ) Notice: Subject to any disclaimer, the term of this patent is extended or adjusted under 35 U.S.C. 154(b) by 57 days.

(21) Appl. No.: 18/365,138

(22) Filed: Aug. 3, 2023

(65) Prior Publication Data

US 2025/0045120 A1   Feb. 6, 2025

(51) Int. Cl.
*G06F 9/50* (2006.01)
*G06F 12/0862* (2016.01)

(52) U.S. Cl.
CPC ........ *G06F 9/5061* (2013.01); *G06F 12/0862* (2013.01); *G06F 2212/27* (2013.01); *G06F 2212/602* (2013.01)

(58) Field of Classification Search
CPC .............. G06F 9/5061; G06F 12/0862; G06F 2212/27; G06F 2212/602; G06F 12/0842; G06F 12/0857; G06F 2212/6026; G06F 12/0846; G06F 12/0864; G06F 12/0895; G06F 2212/1041; G06F 2212/1044; G06F 2212/1056; G06F 12/0875; G06F 2212/454; G06N 3/045; G06N 3/063
See application file for complete search history.

(56) References Cited

U.S. PATENT DOCUMENTS

| | | | | |
|---|---|---|---|---|
| 5,801,670 | A * | 9/1998 | Greene | G06T 15/005 345/206 |
| 11,126,574 | B1 * | 9/2021 | Prabhakar | G06F 15/7871 |
| 11,556,757 | B1 * | 1/2023 | Matveev | G06N 3/0495 |
| 2015/0052286 | A1 * | 2/2015 | Svendsen | G06F 12/0864 711/3 |
| 2015/0370569 | A1 * | 12/2015 | Lin | G06F 9/32 712/214 |

(Continued)

OTHER PUBLICATIONS

CN-114819130-A, Jul. 29, 2022, CN, Yu Z, G06N3/0464 (Year: 2022).*

(Continued)

*Primary Examiner* — Farley Abad
(74) *Attorney, Agent, or Firm* — Paradice & Li LLP

(57) ABSTRACT

A method may include partitioning a tensor that includes a plurality of data values into a number (K) of subtensors, where each of the K subtensors may include a respective subset of the plurality of data values. The method may also include retrieving one or more first data values of the subset of data values included in a first subtensor of the K subtensors in accordance with an access pattern associated with a neural network processor. The method may include storing the one or more first data values of the subset of data values in one of K segments of cache memory, where each of the K segments may be associated with a respective one of the K subtensors. Further, the method may include processing, using the neural network processor, the one or more first data values of the subset of data values in accordance with the access pattern.

20 Claims, 31 Drawing Sheets

(56) References Cited

U.S. PATENT DOCUMENTS

2021/0373895 A1* 12/2021 Shahim ................. G06F 3/0679
2022/0156551 A1*  5/2022 Lin ....................... G06N 3/045
2023/0048845 A1*  2/2023 Yousefzadeh .......... G06N 3/045
2023/0289292 A1*  9/2023 Minkin ................... G06F 9/52

OTHER PUBLICATIONS

Jouppi et al., "Ten Lessons From Three Generations Shaped Google's TPUv4i : Industrial Product," 2021 ACM/IEEE 48th Annual International Symposium on Computer Architecture (ISCA), 2021, pp. 1-14, doi: 10.1109/ISCA52012.2021.00010.
Xu et al. DeepCache: Principled Cache for Mobile Deep Vision, arXiv:1712.01670v5 [cs.CV] Mar. 30, 2020, pp. 1-16.

* cited by examiner

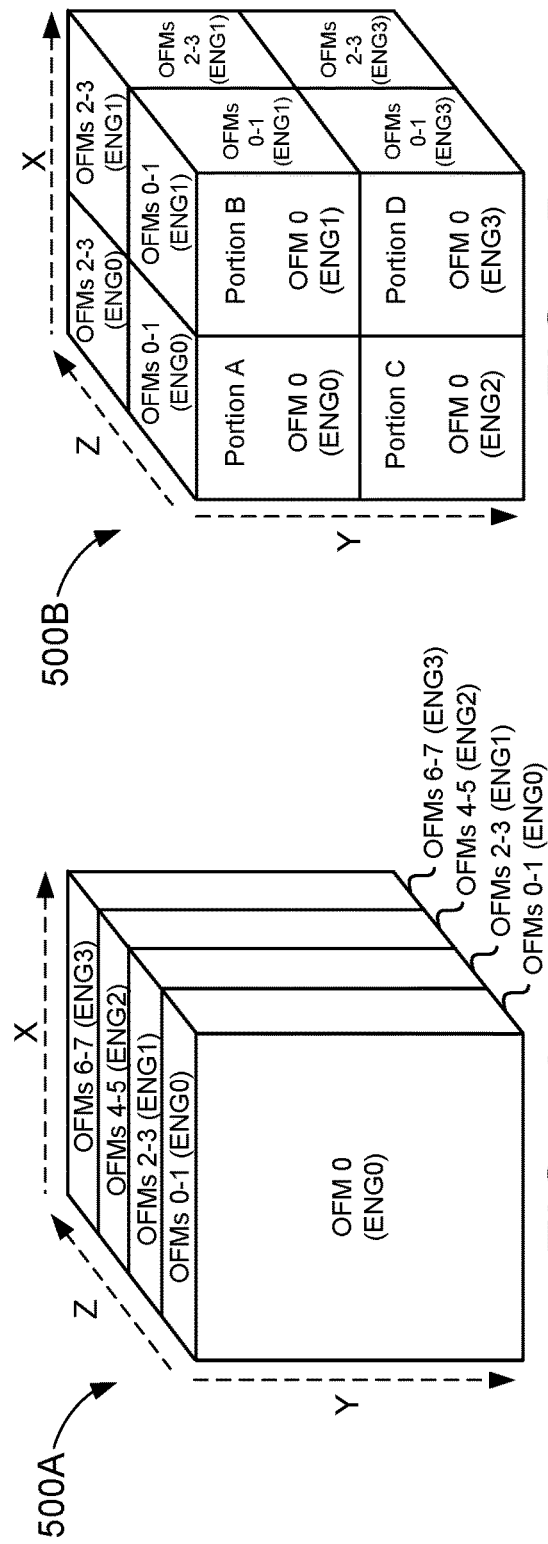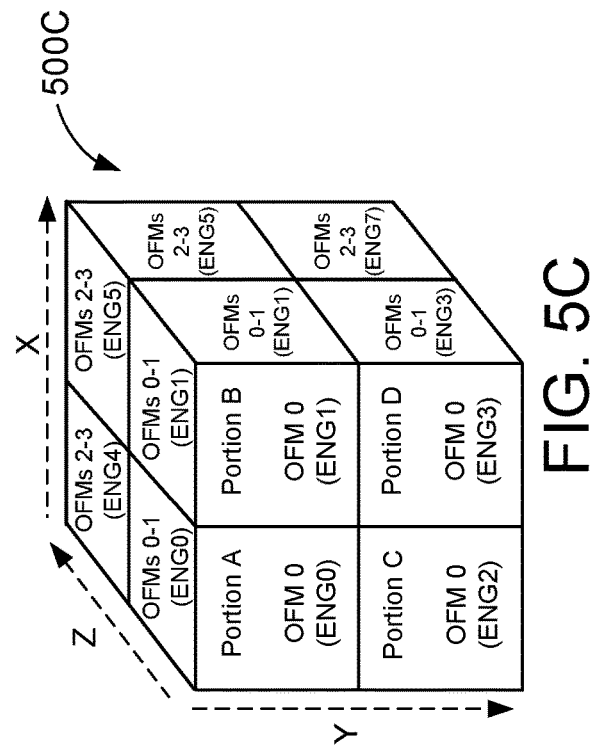
FIG. 5A
FIG. 5B
FIG. 5C

| Tag 1 | Valid Bit<sub>Segment 1</sub> | Valid Bit<sub>Segment 2</sub> | ... | Valid Bit<sub>Segment K</sub> |
|---|---|---|---|---|
| Tag 2 | Valid Bit<sub>Segment 1</sub> | Valid Bit<sub>Segment 2</sub> | ... | Valid Bit<sub>Segment K</sub> |
| ... | ... | ... | ... | ... |
| Tag L | Valid Bit<sub>Segment 1</sub> | Valid Bit<sub>Segment 2</sub> | ... | Valid Bit<sub>Segment K</sub> |

FIG. 19

MEMORY FOR A NEURAL NETWORK PROCESSING SYSTEM

TECHNICAL FIELD

The present embodiments relate generally to memory, and specifically to memory for a neural network processing system.

BACKGROUND OF RELATED ART

In many computing systems, a neural network processor (also referred to as a "neural processing unit" ("NPU") or "neural network accelerator") uses direct memory access ("DMA") to retrieve data from a main memory and store the data in local buffers from which the data can be processed by the NPU. For example, the retrieved data may include a first set of weights associated with a first layer of a neural network. While processing the first set of weights, the NPU may request (from the main memory) a second set of weights associated with a second layer of the neural network. However, the NPU may be idle while retrieving the second set of weights. As such, the NPU may not be fully utilized due to the latency associated with fetching data from main memory. To reduce this latency, the NPU may prefetch the second set of weights from the main memory before it would otherwise be needed for processing the second layer of the neural network. However, prefetching data may present several challenges. For example, allocating space in the local buffers to store the second set of weights may be complex, and additional local memory may be required to store the second set of data. Further, software associated with the DMA may need to be configured to synchronize the DMA with the NPU.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method. The method may include partitioning a tensor that includes a plurality of data values into a number (K) of subtensors. Each of the K subtensors may include a respective subset of the plurality of data values. The method may also include retrieving one or more first data values of the subset of data values included in a first subtensor of the K subtensors in accordance with an access pattern associated with a neural network processor. The method may include storing the one or more first data values of the subset of data values in one of K segments of cache memory. Each of the K segments may be associated with a respective one of the K subtensors. Further, the method may include processing, using the neural network processor, the one or more first data values of the subset of data values in accordance with the access pattern.

Another innovative aspect of the subject matter of this disclosure can be implemented in a system including a processing system and a memory. The memory may store instructions that, when executed by the processing system, cause the system to partition a tensor that includes a plurality of data values into a number (K) of subtensors. Each of the K subtensors includes a respective subset of the plurality of data values. Execution of the instructions may further cause the system to retrieve one or more first data values of the subset of data values included in a first subtensor of the K subtensors in accordance with an access pattern associated with a neural network processor. Execution of the instructions may cause the system to store the one or more first data values of the subset of data values in one of K segments of cache memory. Each of the K segments may be associated with a respective one of the K subtensors. Execution of the instructions may cause the system to process, using the neural network processor, the one or more first data values of the subset of data values in accordance with the access pattern.

BRIEF DESCRIPTION OF THE DRAWINGS

The present embodiments are illustrated by way of example and are not intended to be limited by the figures of the accompanying drawings.

FIGS. 5A-5C show examples of how a set of engines may be allocated, in accordance with some embodiments.

FIG. 19 shows an example tag array, in accordance with some embodiments.

DETAILED DESCRIPTION

Figure 1:
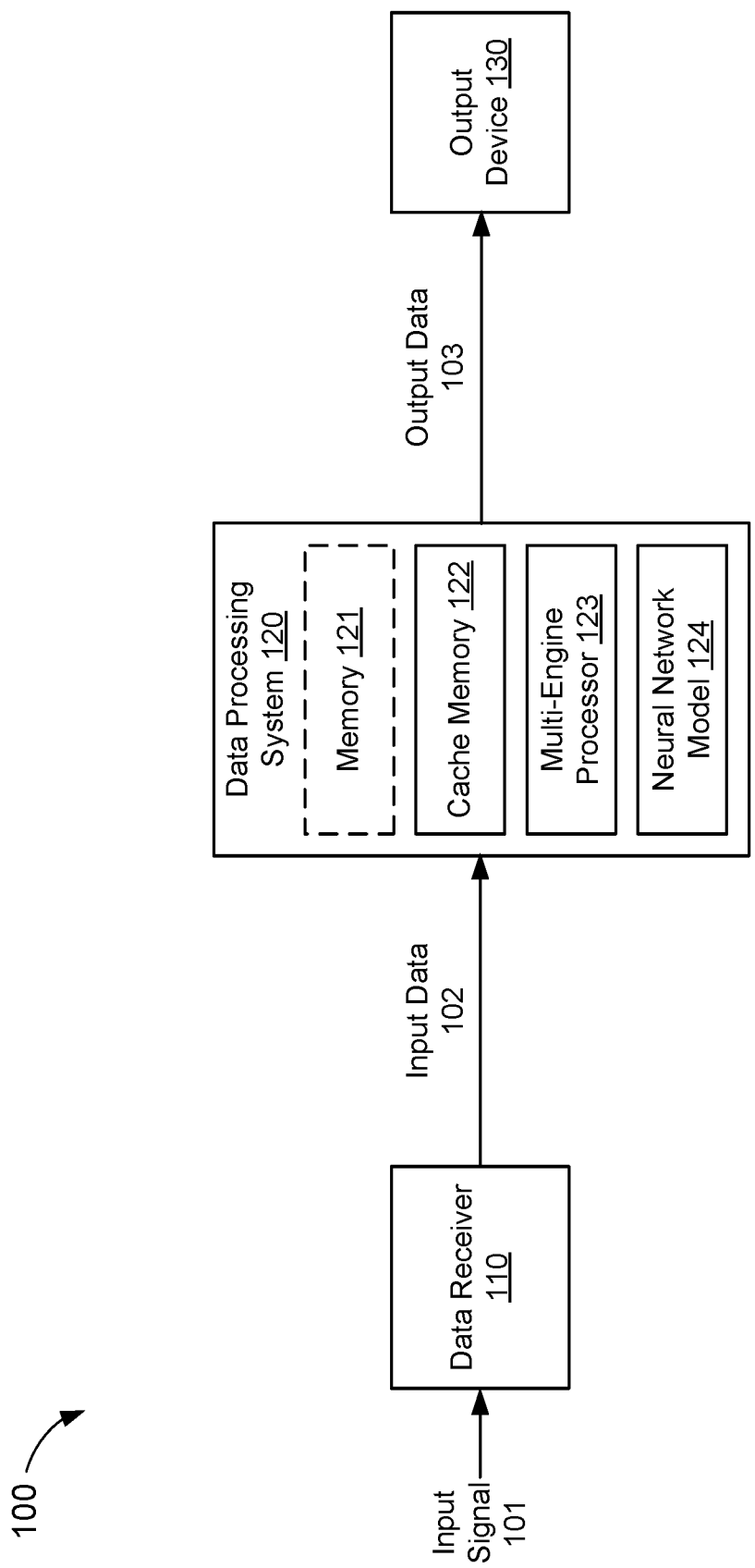
FIG. 1 shows a block diagram of an example system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure provide methods and systems for operating a neural network processor using cache memory. In some embodiments, a neural network processing system may partition a tensor that includes a plurality of data values into a number (K) of subtensors. Each of the K subtensors may include a respective subset of the plurality of data values. In some embodiments, the plurality of data values may collectively represent an input feature map ("IFM"), an output feature map ("OFM"), or a plurality of weights. The neural network processing system also may retrieve one or more first data values of the subset of data values included in a first subtensor of the K subtensors in accordance with an access pattern. More specifically, in some embodiments, the neural network processing system may prefetch the one or more first data values in accordance with the access pattern prior to receiving a request from a neural network processor for the one or more first data values. The neural network processing system also may store the one or more first data values in one of K segments of cache memory. Each of the K segments may be associated with a respective one of the K subtensors. Further, the neural network processor may process the one or more first data values in accordance with the access pattern.

Unlike existing neural network processing systems in which software associated with DMA must be substantially reconfigured to synchronize the DMA with a neural network processor, the neural network processing system of the present disclosure requires significantly less programming effort. Moreover, the neural network processing system of the present disclosure can be implemented using smaller local memory (e.g., cache memory) compared to the local memory (e.g., buffers) used by conventional neural network processors. Further, by prefetching data and storing the data in a cache memory according to an access pattern used by a neural network processor, aspects of the present disclosure can further eliminate cache miss latency.

FIG. 1 shows a block diagram of an example system 100, in accordance with some embodiments. The system 100 may include a data receiver 110, a data processing system 120, and an output device 130. The data receiver 110 may include one or more sensors (e.g., optical sensors or acoustic sensors). Further, the data receiver 110 may be configured to receive one or more signals such as the input signal 101. In some embodiments, the data receiver 110 may convert the received one or more signals (e.g., the input signal 101) into digital input data 102 (also referred to as "input data 102"), which may represent, for example, a tensor. In some aspects, a tensor may represent an array of data values, where the array may include any number of dimensions and be processed by a neural network processor using a neural network.

In some embodiments, the data processing system 120 may receive the input data 102 from the data receiver 110 and process the input data 102 to produce output data 103. As shown in FIG. 1, the data processing system 120 may include a memory 121, a cache memory 122, a multi-engine processor 123, and a neural network model 124. In some embodiments, the data processing system 120 may store the input data 102 in the memory 121. The memory 121 may represent a main memory, a shared memory, or an external memory (e.g., a memory that is separate from or external to the data processing system 120). In some embodiments, the data processing system 120 may retrieve one or more data values of the input data 102 from the memory 121, and store the retrieved one or more data values in the cache memory 122. Further, in some embodiments, the data processing system 120 may retrieve the one or more data values from the cache memory 122, and process the one or more data values retrieved from the cache memory 122 using the multi-engine processor 123 and the neural network model 124 to produce the output data 103. In some aspects, the cache memory 122, but not the memory 121, may have sufficient bandwidth for the one or more data values to be read by the multi-engine processor 123.

In some aspects, the neural network model 124 may be trained through machine learning. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that one or more final outputs of the neural network result in one or more desired inferences. The set of transformations associated with the various layers of the network is referred to as a "neural network model."

A convolutional neural network ("CNN") is a type of artificial neural network that includes at least one convolutional layer, among other layers such as pooling layers and a fully connected layer. A convolutional layer is a layer in which a mathematical operation called convolution is performed. In some aspects, each layer of a CNN may be associated with one or more processing elements ("PEs"), which are computational elements configured to perform a specific operation (e.g., convolution, downsampling, or calculating probabilities or neurons).

In some embodiments, the output device 130 (e.g., a headset, a smartphone, an IoT device, or other electronic device) may receive the output data 103. The output data 103 may represent an inference or prediction regarding the input signal 101. For example, where the input signal 101 represents an image, the output data 103 may represent a prediction that the image depicts a particular entity (e.g., a person, animal or car). In some embodiments, the output device 130 may further output the output data 103 using, for example, one or more speakers, display screens, and/or other electronic devices.

Figure 2:
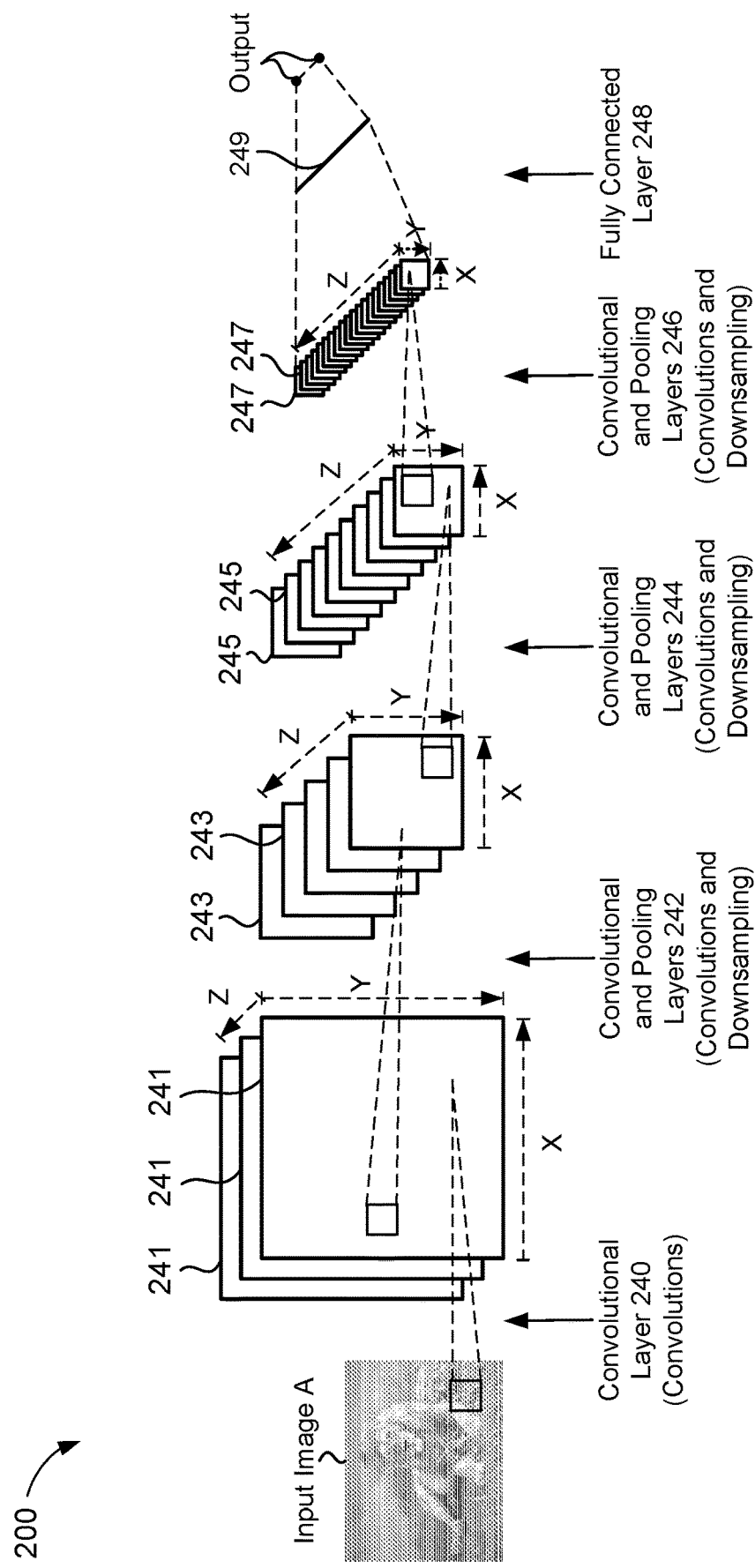
FIG. 2 shows an example convolutional neural network (CNN) that can be used to classify images, in accordance with some embodiments.

FIG. 2 shows an example CNN 200 that can be used to classify images, in accordance with some embodiments. In the example of FIG. 2, the CNN 200 includes convolutional layer 240, convolutional and pooling layers 242, 244, and 246, and a fully connected layer 248. In some aspects, the convolutional layer 240 may be associated with one or more PEs configured to perform convolution. The convolutional and pooling layers 242, 244, and 246 may be associated with one or more PEs configured to perform convolution and one or more PEs configured to perform downsampling. The fully connected layer 248 may be associated with one or more PEs configured to determine classification scores.

The convolutional layer 240 processes an input image A to produce, for example, three output feature maps (OFMs) 241. Each of the OFMs 241 is depicted as a two-dimensional (2D) map having a width (or an "X" dimension) and a height (or a "Y" dimension). Further, each of the OFMs 241 may form a respective channel of a three-dimensional (3D) output having a depth (or a "Z" dimension) equal to the total number of OFMs 241 (or channels).

The convolutional and pooling layers 242 process the OFMs 241 to produce, for example, five new OFMs 243.

Similar to the OFMs 241, each of the OFMs 243 has a width (or X dimension), and a height (or Y dimension), and can be stacked to form a 3D output having a depth (or Z dimension) equal to the total number of OFMs 243 (or channels).

The convolutional and pooling layers 244 process the OFMs 243 to produce, for example, 10 new OFMs 245. Like the OFMs 241 and 243, each of the OFMs 245 has a width (or X dimension), and a height (or Y dimension), and can be stacked to form a 3D output having a depth (or Z dimension) equal to the total number of OFMs 245 (or channels).

The convolutional and pooling layers 246 process the OFMs 245 to produce, for example, 20 OFMs 247. Each of the OFMs 247 has a width (or X dimension), a height (or Y dimension), and can be stacked to form a 3D output having a depth (or Z dimension) equal to the total number of OFMs 247 (or channels).

The fully connected layer 248 processes the OFMs 247 to produce classification scores 249. In some aspects, each of the classification scores 249 may represent a likelihood or probability that one or more features of the input image A correspond to a particular class or category (e.g., a particular type of animal). In some aspects, the CNN 200 may produce a final output based on the classification scores 249. For example, the final output may represent one or more predictions regarding the input image A (e.g., a prediction that the input image A depicts a lion).

As shown in FIG. 2, the output of the convolutional layer 240 (e.g., the OFMs 241) has a large spatial dimension (e.g., X and Y dimensions) and low number of channels relative to, for example, the output of the convolutional and pooling layers 246 (e.g., the OFMs 247). Conversely, the output of the convolutional and pooling layers 246 (e.g., the OFMs 247), has a small spatial dimension and large number of channels relative to, for example, the output of the convolutional layer 240 (e.g., the OFMs 241).

Figure 3A:
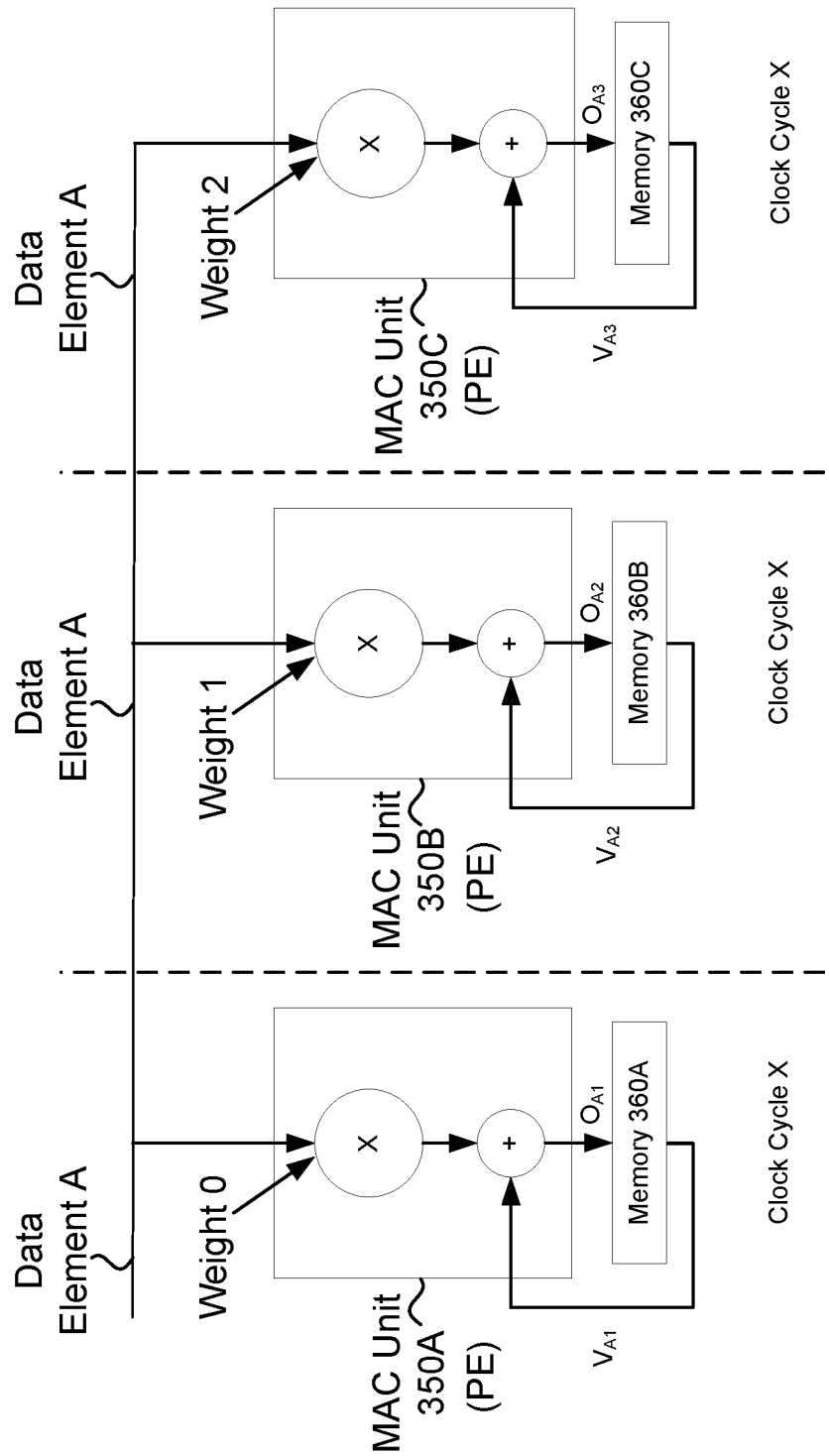
FIGS. 3A-3B show example operations that can be performed by processing elements (PEs), in accordance with some embodiments.
Figure 3B:
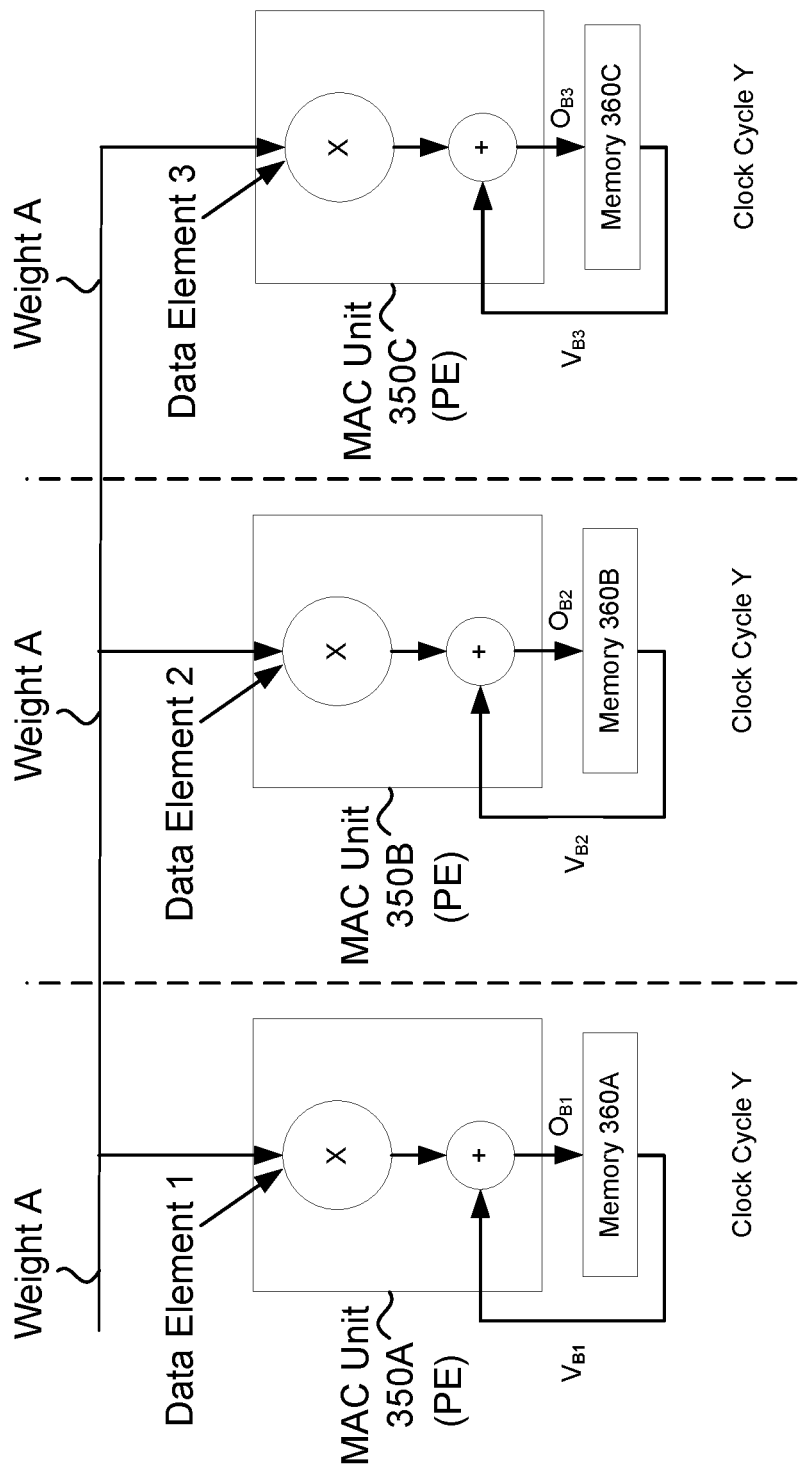

FIGS. 3A and 3B show example operations that can be performed by processing elements ("PEs"), in accordance with some embodiments. In the example of FIGS. 3A and 3B, each PE is depicted as a respective multiplier-accumulator ("MAC") unit 350 (e.g., MAC unit 350A, 350B, or 350C). In some aspects, each of the MAC units 350A-350C represents a hardware circuit that may be configured to perform multiplication and addition operations associated with a convolutional layer of a CNN. More specifically, each of the MAC units 350A-350C multiplies a data element (e.g., data element A) by a respective weight. As used herein, the term "data element" may refer to a data value (e.g., a numerical value associated with a pixel or other unit). Moreover, in some embodiments described herein, the term "data element" may refer to a data value of an IFM, an OFM, or a weight (e.g., of a neural network model). For example, as shown in FIG. 3A, the MAC unit 350A multiplies the data element A by a weight 0 and adds the resulting product to a value $V_{A1}$, retrieved from a memory 360A, to produce an output $O_{A1}$. The value $V_{A1}$ represents a previous output of the MAC unit 350A (such as from a previous convolution operation). The output $O_{A1}$ is stored in the memory 360A and may be retrieved when the MAC unit 350A performs a subsequent convolution operation.

In the example of FIG. 3A, each of the MAC units 350A-350C may perform a convolution operation based on a weight and data element during each of multiple clock cycles of a computing system, which may require significant processing power. Moreover, the convolutional layer may require a substantial amount of memory bandwidth to support the retrieval of weights and data elements by the MAC units 350A-350C. Aspects of the present disclosure recognize that reusing the data elements or weights may help conserve processing power and memory bandwidth.

With reference for example to FIG. 3A, during a given clock cycle (e.g., a clock cycle X), each of the MAC units 350A, 350B, and 350C may receive the same data element A but a different weight (e.g., weight 0, weight 1, and weight 2, respectively). In this manner, the data element A is "reused" among the MAC units 350A-350C. As a result, the MAC units 350A-350C may use less processing power and memory bandwidth than if each of the MAC units 350A-350C received a different data element and a different weight during the clock cycle X.

In the example of FIG. 3B, during a given clock cycle (e.g., a clock cycle Y), each of MAC units 350A, 350B, and 350C receives the same weight (weight A) but a different data element (e.g., data element 1, data element 2, and data element 3, respectively). In this manner, the weight A is "reused" among the MAC units 350A-350C. As a result, the MAC units 350A-350C may use less processing power and memory bandwidth than if each of the MAC units 350A-350C received both a different weight and different data element during the clock cycle Y. In some aspects, to facilitate the reuse of data elements or weights, each of the MAC units 350A-350C may be configured to process a respective portion of one or more OFMs, or a respective set of OFMs.

FIGS. 4A-4D show examples of how a set of PEs may be allocated, in accordance with some embodiments. More specifically, FIGS. 4A-4D show examples of how each PE of a set of PEs may be allocated to produce a respective portion of one or more OFMs, or a respective set of OFMs, within a layer (e.g., a convolutional layer) of a CNN. In some aspects, each of the PEs may be one example of any of the MAC units 350A-350C of FIGS. 3A and 3B. Further, each of the PEs may be synchronized to perform the same operations (e.g., convolution operations) during a given clock cycle. Aspects of the present disclosure recognize that the operations performed by each PE of a CNN are predictable or known (or determined) in advance of processing the layers of a CNN.

Figures 4A, 4B:
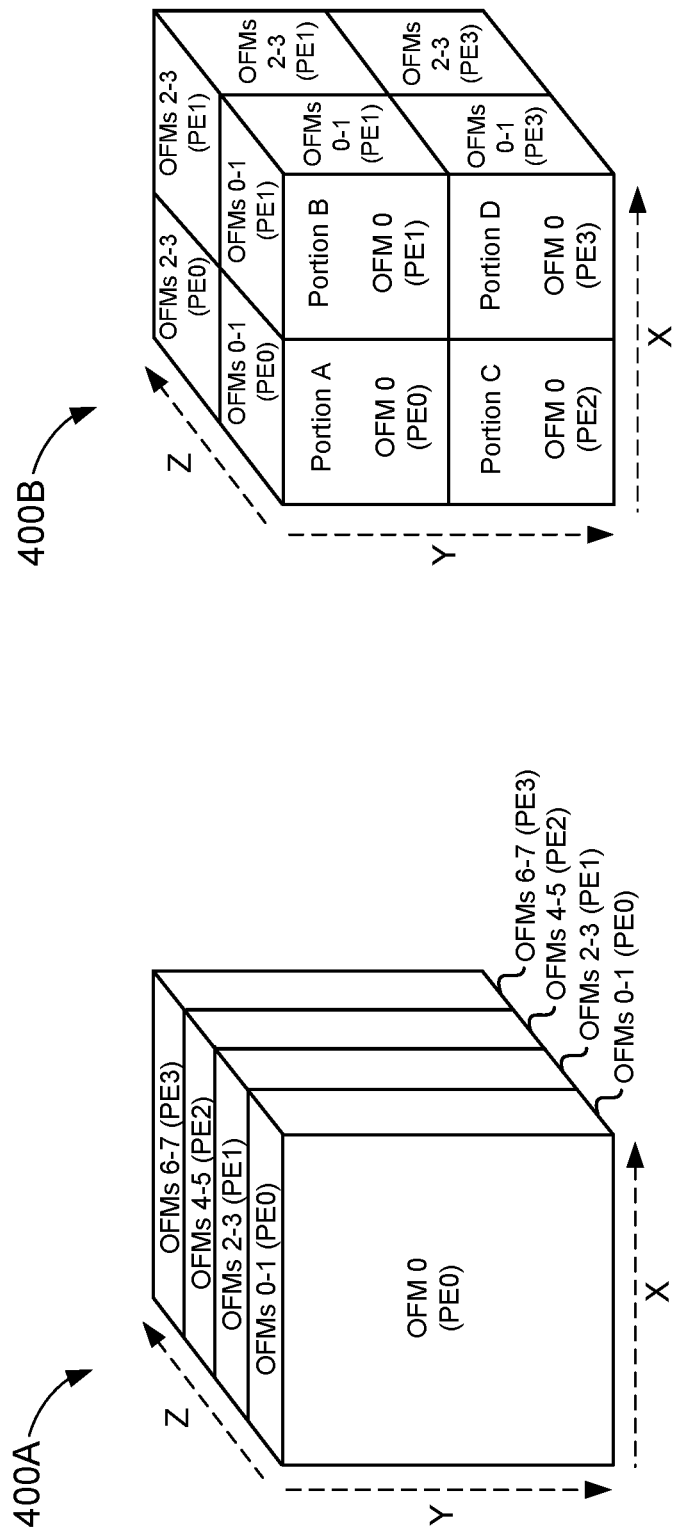
FIGS. 4A-4D show examples of how a set of PEs may be allocated, in accordance with some embodiments.

FIG. 4A shows an example 400A of how each PE of a set of PEs can be allocated to produce a respective set of OFMs. This allocation may be referred to as "OFM allocation" or "channel allocation." The example of FIG. 4A shows eight OFM allocations (OFM 0-OFM 7) for four PEs (PE0-PE3). However, in actual implementations, the example OFM allocation techniques of FIG. 4A can be applied to any number of PEs. As shown in FIG. 4A, PE0 produces each of OFM 0 and OFM 1 based on inputs (e.g., the weights and data elements described with reference to FIGS. 3A and 3B). Similarly, PE1 produces each of OFM 2 and OFM 3 based on inputs, PE2 produces each of OFM 4 and OFM 5 based on inputs, and PE3 produces each of OFM 6 and 7 based on inputs. In some aspects, each of PE0-PE3 may process the same data element using a different weight during a given clock cycle (such as described with reference to FIG. 3A). Thus, the example OFM allocations of FIG. 4A may be well suited for any layers of a CNN that produce outputs having a large number of channels (e.g., the OFMs 247 of FIG. 2).

FIG. 4B shows an example 400B of how each PE of a set of PEs can be allocated to produce a respective portion of the spatial dimension of each of OFMs 0-3. This allocation may be referred to as "spatial allocation." The example of FIG. 4B shows four spatial allocations (portions A, B, C, and D) for four PEs (PE0-PE3), respectively, and for each of the OFMs 0-3. However, in actual implementations, the example spatial allocation techniques of FIG. 4B can be applied to any number of PEs. As shown in FIG. 4B, PE0 produces the portion A of each of the OFMs 0-3 based on inputs (e.g., weights and data elements as described with reference to FIGS. 3A and 3B). Similarly, PE1 produces the portion B of each of the OFMs 0-3 based on inputs, PE2 produces the portion C of each of the OFMs 0-3 based on inputs, and PE3 produces the portion D of each of the OFMs 0-3 based on inputs. In some aspects, each of PE0-PE3 may process a different data element using the same weight during a given clock cycle (such as described with reference to FIG. 3B). Thus, the example spatial allocations of FIG. 4B may be well suited for layers of a CNN that produce outputs having a large spatial dimension and small number of channels (e.g., the OFMs 241 of FIG. 2).

Figure 4C:
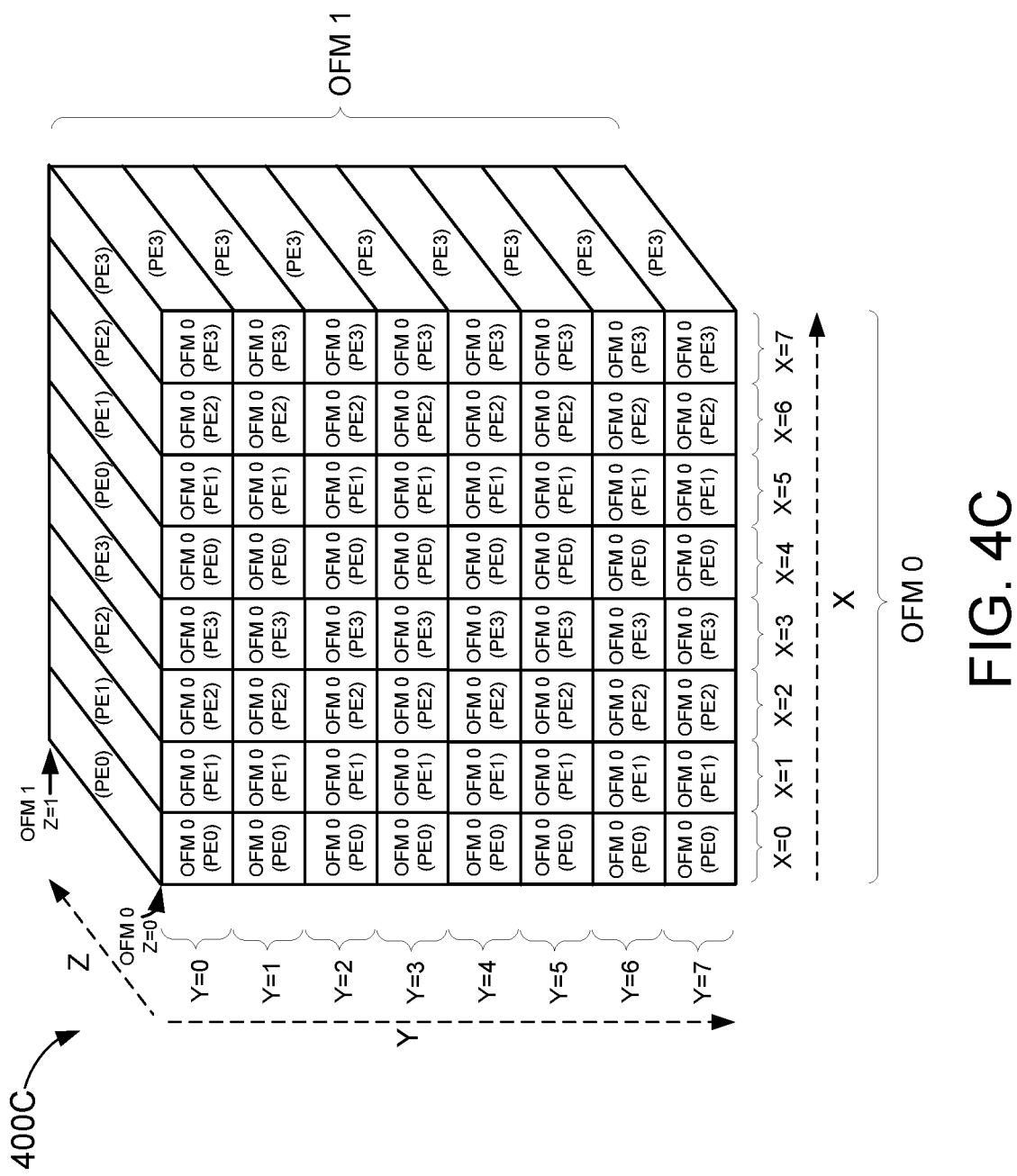

FIG. 4C shows an example 400C of how, during a given time period, each consecutive PE of a set of PEs can be allocated to produce a respective data element along the X dimension of an OFM, where each respective data element is positioned adjacent to one another. This allocation may be referred to as "stride allocation." The example of FIG. 4C shows 64 spatial allocations (at the intersections of X=0 to X=7 and Y=0 to Y=7) for four PEs (PE0-PE3), and for each of OFM 0 and OFM 1. However, in actual implementations, the example spatial allocation techniques of FIG. 4B can be performed by any number of PEs. As shown in FIG. 4C, during a first time period (e.g., multiple clock cycles) and for OFM 0 and Y=0, PE0 produces the data element at X=0, Z=0 based on inputs (e.g., a weight and data element as described with reference to FIGS. 3A and 3B). Similarly, during the first time period and for OFM 0 and Y=0, PE1 produces the data element at X=1, Z=0 based on inputs; PE2 produces the data element at X=2, Z=0 based on inputs; and PE3 produces the data element at X=3, Z=0 based on inputs. Further, during a second time period (e.g., multiple clock cycles) and for OFM 0 and Y=0, PE0 produces the data element at X=4, Z=0 based on inputs; PE1 produces the data element at X=5, Z=0 based on inputs; PE2 produces the data element at X=6, Z=0 based on inputs; and PE3 produces the data element at X=7, Z=0 based on inputs. During subsequent time periods, each of PE0-PE3 repeat this process until each data element of the OFMs 0 and 1 is produced for Y=0 through Y=7.

In some aspects, each of PE0-PE3 may process a different data element using the same weight, during a given clock cycle (such as described with reference to FIG. 3B). Further, where the weight has a dimension larger than 1×1 (e.g., one unit wide and one unit high), stride allocation may facilitate data reuse in subsequent clock cycles. For example, a first data element may be processed by PE3 at (X=3, Y=0, Z=0) during a first clock cycle, by PE2 at (X=2, Y=0, Z=0) during a second clock cycle, by PE1 at (X=1, Y=0, Z=0) during a third clock cycle, and by PE0 at (X=0, Y=0, Z=0) during a fourth clock cycle. Similarly, a second data element processed by PE3 at (X=3, Y=0, Z=0) during a second clock cycle may also be processed by PE2 at (X=2, Y=0, Z=0) during a third clock cycle, by PE1 at (X=1, Y=0, Z=0) during a fourth clock cycle, and by PE0 at (X=0, Y=0, Z=0) during a fifth clock cycle, and so forth. In some aspects, a multi-engine processor (e.g., the multi-engine processor 123 of FIG. 1) may include special hardware (e.g., connections between PE0-PE3) to facilitate such data reuse with stride allocation. In some aspects, the special hardware may define the number of PEs (or stride size) for a given engine of the multi-engine processor. Further, in some embodiments, the special hardware may not be configured to dynamically change while being used to process the layers of a CNN.

Figure 4D:
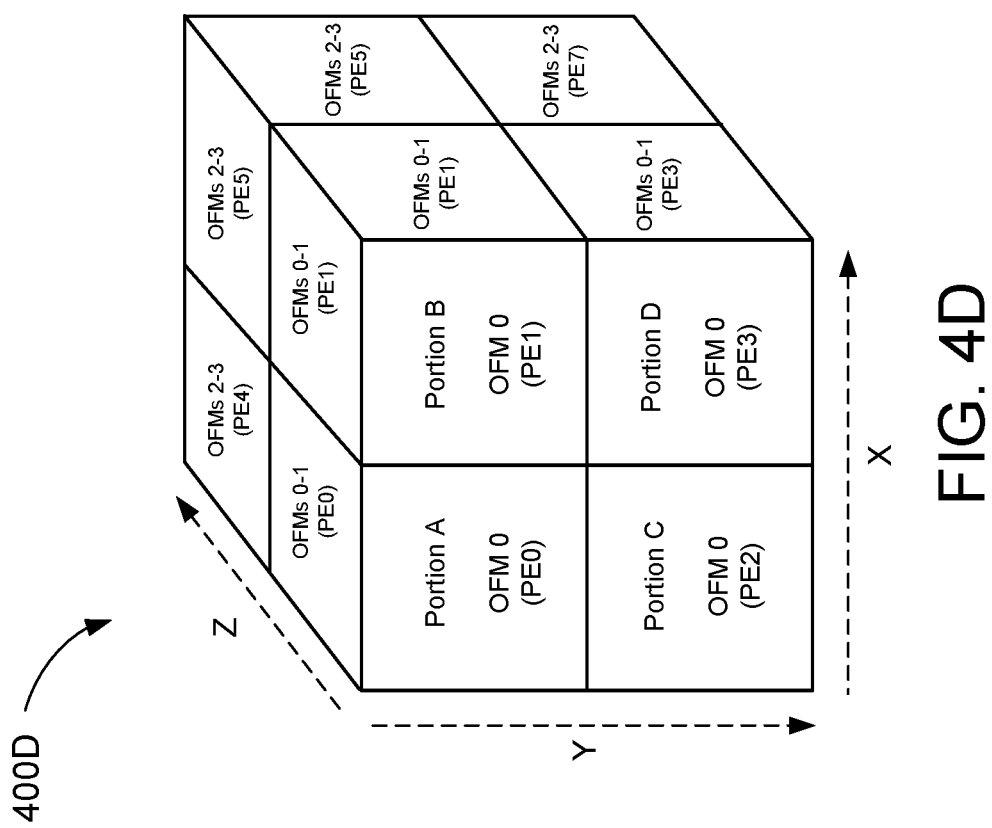

FIG. 4D shows an example 400D of how a set of PEs can be allocated to produce portions of the spatial dimension of each of OFMs 0-3. This allocation may be referred to as "combined allocation" because the allocation resembles a combination of the OFM allocation, the spatial allocation, and the stride allocation discussed above. The example of FIG. 4D shows four spatial allocations (portions A, B, C, and D) for eight PEs (PE0-PE7), and for each of the OFMs 0-3. However, in actual implementations, the example combined allocation techniques of FIG. 4D can be applied to any number of PEs. As shown in FIG. 4D, PE0 produces the portion A of each of the OFMs 0-1 based on inputs (e.g., weights and data elements as described with reference to FIGS. 3A and 3B). Similarly, PE1 produces the portion B of each of the OFMs 0-1 based on inputs, PE2 produces the portion C of each of the OFMs 0-1 based on inputs, and PE3 produces the portion D of each of the OFMs 0-1 based on inputs. Further, PE4 produces the portion A of each of the OFMs 2-3 based on inputs, PE5 produces the portion B of each of the OFMs 2-3 based on inputs, PE6 (not shown in FIG. 4D) produces the portion C of each of the OFMs 2-3 based on inputs, and PE7 produces the portion D of each of the OFMs 2-3 based on inputs. In some aspects, the example combined allocation of FIG. 4D may be well suited for layers of a CNN that produce outputs having a medium spatial dimension and medium number of channels (e.g., the OFMs 243 or the OFMs 245 of FIG. 2).

In some aspects, the PE allocations (e.g., OFM allocation, spatial allocation, stride allocation, or combined allocation) may be designed to lower memory bandwidth and maintain high PE utilization (such that few or no PEs are idle while the layers are being processed). Further, in some aspects, each group of multiple different groups of PEs may be allocated to process a respective portion of one or more OFMs, or a respective set of OFMs. Each group of PEs may include two or more PEs collectively referred to as an "engine."

FIGS. 5A-5C show examples of how a set of engines may be allocated, in accordance with some embodiments. More specifically, FIGS. 5A-5C show examples of how each engine of a set of engines may be allocated to produce a respective portion of one or more OFMs, or a respective set of OFMs, within a layer (e.g., a convolutional layer) of a CNN. As described above, each engine in the set of engines may include a respective group of two or more PEs, where each of the two or more PEs may be one example of any of the MAC units 350A-350C of FIGS. 3A and 3B. Further, each of the PEs of each engine may be synchronized to perform the same operations (e.g., convolution operations) during a given clock cycle. Aspects of the present disclosure recognize that the operations performed by each engine of a CNN are predictable or known (or determined) in advance of processing the layers of a CNN.

FIG. 5A shows an example 500A of how each engine of a set of engines can be allocated to produce a respective set of OFMs. This allocation may be referred to as "OFM allocation" or "channel allocation," like the allocation described with reference to FIG. 4A. The example of FIG. 5A shows eight OFM allocations (OFM0-OFM7) for four engines (ENG0-ENG3). However, in actual implementations, the example OFM allocation techniques of FIG. 5A can be applied to any number of engines. As shown in FIG. 5A, ENG0 produces each of OFM 0 and OFM 1 based on inputs (e.g., the weights and data elements described above with reference to FIGS. 3A and 3B). Similarly, ENG1 produces each of OFM 2 and OFM 3 based on inputs, ENG2 produces each of OFM 4 and OFM 5 based on inputs, and ENG3 produces each of OFM 6 and OFM 7 based on inputs. In some aspects, each PE of ENG0-ENG3 may process the same data element using a different weight during a given clock cycle (such as described with reference to FIG. 3A). Thus, the example OFM allocations of FIG. 5A may be well suited for any layers of a CNN that produce outputs having a large number of channels (e.g., the OFMs 247 of FIG. 2).

FIG. 5B shows an example 500B of how each engine of a set of engines can be allocated to produce a respective portion of the spatial dimension of each of OFMs 0-3. This allocation may be referred to as "spatial allocation," like the allocation described with reference to FIG. 4B. The example of FIG. 5B shows four spatial allocations (portions A, B, C, and D) for four engines (ENG0-ENG3), respectively, and for each of the OFMs 0-3. However, in actual implementations, the example spatial allocation techniques of FIG. 5B can be applied to any number of engines. As shown in FIG. 5B, ENG0 produces the portion A of each of the OFMs 0-3 based on inputs (e.g., weights and data elements as described with reference to FIGS. 3A and 3B). Similarly, ENG1 produces the portion B of each of the OFMs 0-3 based on inputs, ENG2 produces the portion C of each of the OFMs 0-3 based on inputs, and ENG3 produces the portion D of each of the OFMs 0-3 based on inputs. In some aspects, each PE of ENG0-ENG3 may process a different data element using the same weight during a given clock cycle (such as described with reference to FIG. 3B). Thus, the example spatial allocations of FIG. 5B may be well suited for layers of a CNN that produce outputs having a large spatial dimension and small number of channels (e.g., the OFMs 241 of FIG. 2).

FIG. 5C shows an example 500C of how a set of engines can be allocated to produce portions of the spatial dimension of each of OFMs 0-3. This allocation may be referred to as "combined allocation," like the allocation described with reference to FIG. 4D. The example of FIG. 5C shows four spatial allocations (portions A, B, C, and D) for eight engines (ENG0-ENG7), and for each of OFMs 0-3. However, in actual implementations, the example combined allocation techniques of FIG. 5C can be applied to any number of engines. As shown in FIG. 5C, ENG0 produces portion A of each of the OFMs 0-1 based on inputs (e.g., weights and data elements as described with reference to FIGS. 3A and 3B). Similarly, ENG1 produces the portion B of each of the OFMs 0-1 based on inputs, ENG2 produces the portion C of each of the OFMs 0-1 based on inputs, and ENG3 produces the portion D of each of the OFMs 0-1 based on inputs. Further, ENG4 produces the portion A of each of the OFMs 2-3 based on inputs, ENG5 produces the portion B of each of the OFMs 2-3 based on inputs, ENG6 (not shown in FIG. 5C) produces the portion C of each of the OFMs 2-3 based on inputs, and ENG7 produces the portion D of each of the OFMs 2-3 based on inputs. In some aspects, the example combined allocation of engines of FIG. 5C may be well suited for layers of a CNN that produce outputs having a medium spatial dimension and medium number of channels (e.g., the OFMs 243 or the OFMs 245 of FIG. 2).

In some aspects, the engine allocations (e.g., OFM allocation, spatial allocation, stride allocation, or combined allocation) may be designed to lower memory bandwidth and maintain high PE utilization (such that the PEs of few or no engines are idle while the layers are being processed). Further, in some aspects, each of one or more engines of a set of engines may dynamically change its PE allocation. For example, each engine of a set of engines may be assigned a spatial allocation for a first layer of a CNN, and assigned an OFM allocation for a subsequent layer (e.g., a third layer, a fourth layer, etc.) of the CNN.

In some aspects, an access pattern for a CNN refers to an order or sequence in which one or more engines of a neural network processor read (or receive) and write (or produce) data elements for a layer (e.g., a convolutional layer) of the CNN. Thus, an access pattern for a layer of a CNN may include both a read access pattern and a write access pattern. As used herein, the term "access pattern for a CNN" may also be referred to as a "CNN access pattern." In some aspects, a CNN access pattern may be determined based on the PE allocation assigned to one or more engines, as discussed above with reference to FIGS. 4A-5C. A CNN access pattern may also be determined based on the dimensions of a kernel (or filter or weight) sub-tensor associated with a convolutional layer. For example, a CNN access pattern may be determined based on one or more dimensions (e.g., width, height, depth, or index (or reference) number) of a kernel sub-tensor associated with a convolutional layer.

Figure 6A:
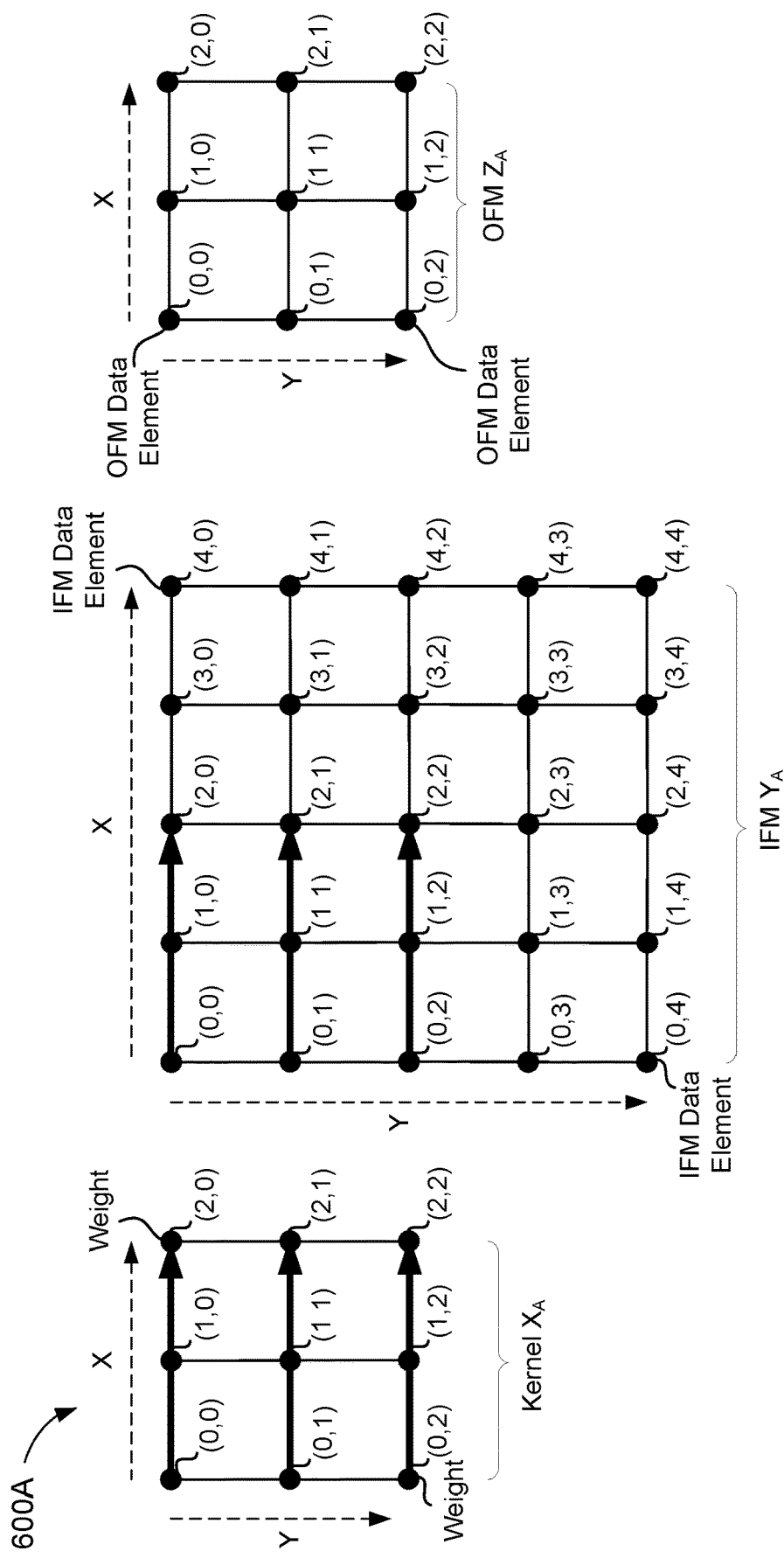
FIG. 6A shows an example read access pattern for a PE associated with a convolutional layer, in accordance with some embodiments.

FIG. 6A shows an example read access pattern 600A for a PE (e.g., $PE_A$) associated with a convolutional layer, in accordance with some embodiments. More specifically, the read access pattern 600A represents an order in which the $PE_A$ may read the weights of a kernel $X_A$ and a subset of data elements of an IFM $Y_A$ and produce one or more data elements of an OFM $Z_A$. In some embodiments, each of the kernel $X_A$, the IFM $Y_A$, and the OFM $Z_A$ may represent a respective two-dimensional subtensor. However, in actual implementations, each of the kernel $X_A$, the IFM $Y_A$, and the OFM $Z_A$ may have any number of dimensions.

In the example of FIG. 6A, the kernel $X_A$ is depicted as an array of weights, including 3 rows of weights (representing an X dimension of the kernel $X_A$) and 3 columns of weights (representing a Y dimension of the kernel $X_A$), for a total of 9 weights. Each of the 9 weights corresponds to a respective coordinate pair (e.g., (X coordinate, Y coordinate)). For example, the weight corresponding to position (2,0) represents a weight positioned at (X=2, Y=0) within the kernel $X_A$.

The IFM $Y_A$ is depicted as an array of data elements, including 5 rows of IFM data elements (representing an X dimension of the IFM $Y_A$) and 5 columns of IFM data elements (representing a Y dimension of the IFM $Y_A$), for a total of 25 IFM data elements. Like the weights of kernel $X_A$, each of the 25 IFM data elements corresponds to a respective coordinate pair. For example, the IFM data element corresponding to position (4,0) represents an IFM data element positioned at (X=4, Y=0) within the IFM $Y_A$.

As shown in FIG. 6A, the OFM $Z_A$ is depicted as an array of data elements, including 3 rows of OFM data elements (representing an X dimension of the OFM $Z_A$) and 3 columns of OFM data elements (representing a Y dimension of the OFM $Z_A$), for a total of 9 OFM data elements. Like the data elements of IFM $Y_A$, each of the 9 OFM data elements corresponds to a respective coordinate pair. For example, the OFM data element corresponding to position (0,0) represents an OFM data element positioned at (X=0, Y=0) within the OFM $Z_A$.

In some embodiments, the $PE_A$ may produce the OFM data element positioned at (0,0) of the OFM $Z_A$ based on the weights of the kernel $X_A$ and a subset of the IFM data elements of IFM $Y_A$, in accordance with the read access pattern 600A. The read access pattern 600A represents an access pattern in which the $PE_A$ reads weights and IFM data elements, first along the X dimension and then along the Y dimension, of each of the kernel $X_A$ and IFM $Y_A$ (also referred to as an "X-Y read access pattern").

According to the read access pattern 600A, during a first clock cycle, the $PE_A$ may read the weight at position (0,0) of the kernel $X_A$ and the IFM data element at position (0,0) of the IFM $Y_A$; during a second clock cycle, the $PE_A$ may read the weight at position (1,0) of the kernel $X_A$ and the IFM data element at position (1,0) of the IFM $Y_A$; and during a third clock cycle, the $PE_A$ may read the weight at position (2,0) of the kernel $X_A$ and the IFM data element at position (2,0) of the IFM $Y_A$. Thus, during the first, second, and third clock cycles, the $PE_A$ reads weights along the X dimension (for Y=0) of the kernel $X_A$, and reads the IFM data elements along the X dimension (for Y=0) of the IFM $Y_A$.

Next, the $PE_A$ may proceed to read weights and IFM data elements along the Y dimension of each of the kernel $X_A$ and the IFM $Y_A$ according to the read access pattern 600A. That is, during a fourth clock cycle, the $PE_A$ may read the weight at position (0,1) of the kernel $X_A$ and the IFM data element at position (0,1) of the IFM $Y_A$; during a fifth clock cycle, the $PE_A$ may read the weight at position (1,1) of the kernel $X_A$ and the IFM data element at position (1,1) of the IFM $Y_A$; and during a sixth clock cycle, the $PE_A$ may read the weight at position (2,1) of the kernel $X_A$ and the IFM data element at position (2,1) of the IFM $Y_A$.

Next, the $PE_A$ may read the remaining weights of the kernel $X_A$ and corresponding IFM data elements of the IFM $Y_A$ according to the read access pattern 600A. That is, during a seventh clock cycle, the $PE_A$ may read the weight at position (0,2) of the kernel $X_A$ and the IFM data element at position (0,2) of the IFM $Y_A$; during an eighth clock cycle, the $PE_A$ may read the weight at position (1,2) of the kernel $X_A$ and the IFM data element at position (1,2) of the IFM $Y_A$; and during a ninth clock cycle, the $PE_A$ may read the weight at position (2,2) of the kernel $X_A$ and the IFM data element at position (2,2) of the IFM $Y_A$. In some embodiments, the $PE_A$ or one or more other PEs may be used to produce the remaining OFM data elements of the OFM $Z_A$ by, for example, sliding the kernel $X_A$ over the IFM $Y_A$, in accordance with the read access pattern 600A and a write access pattern (e.g., an order in which the OFM data elements of the OFM $Z_A$ are produced).

Figure 6B:
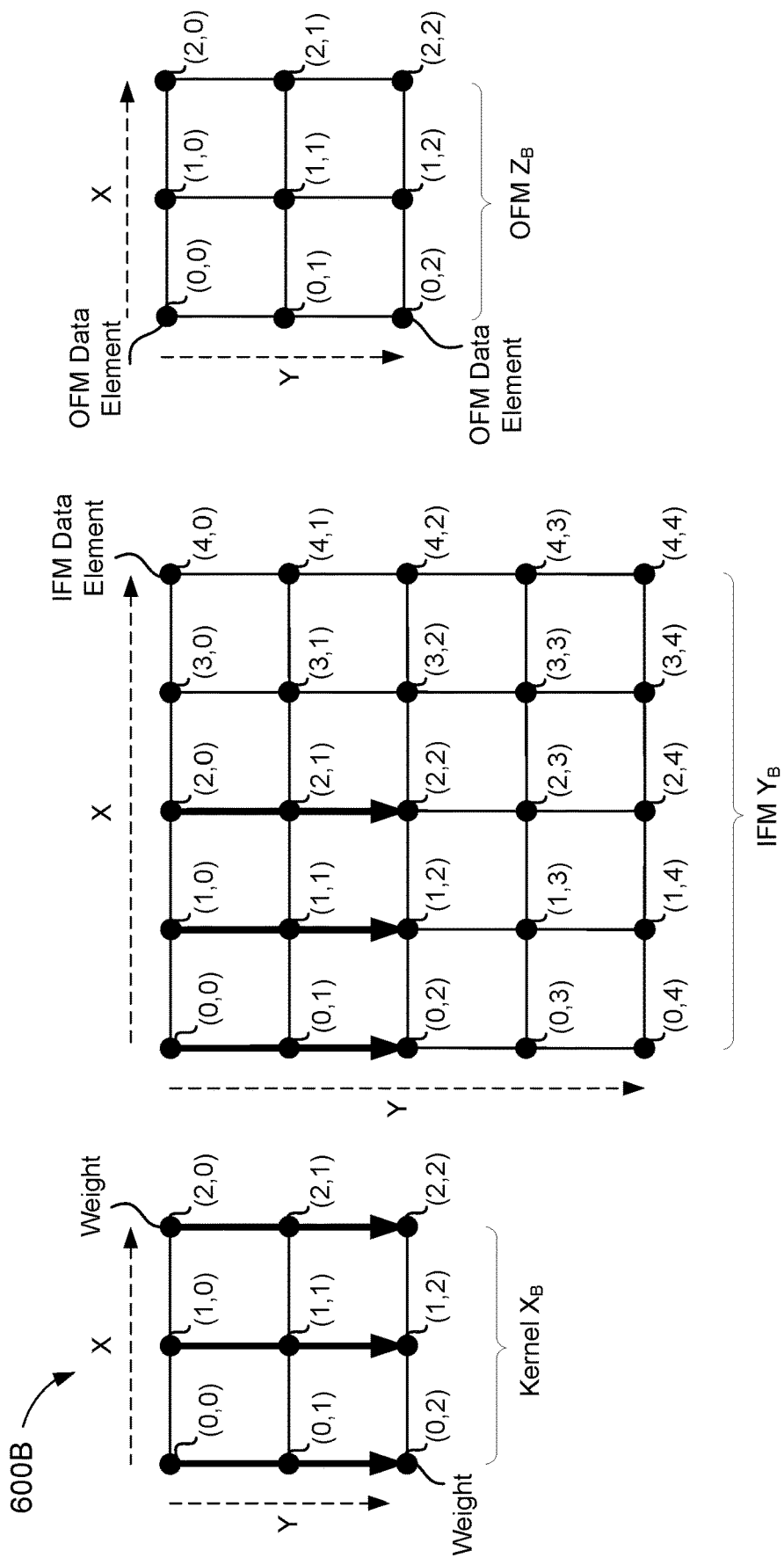
FIG. 6B shows an example read access pattern for a PE associated with a convolutional layer, in accordance with some embodiments.

FIG. 6B shows an example read access pattern 600B for a PE (e.g., $PE_B$) associated with a convolutional layer, in accordance with some embodiments. More specifically, the read access pattern 600B represents an order in which the $PE_B$ may read the weights of a kernel $X_B$ and a subset of data elements of an IFM $Y_B$ and produce one or more data elements of an OFM $Z_B$. The $PE_B$, the kernel $X_B$, the IFM $Y_B$, and the OFM $Z_B$ may be embodiments of the $PE_A$, the kernel $X_A$, the IFM $Y_A$, the OFM $Z_A$ of FIG. 6A, respectively.

In some embodiments, the $PE_B$ may produce the OFM data element positioned at (0,0) of the OFM $Z_B$ based on the weights of the kernel $X_B$ and a subset of the IFM data elements of IFM $Y_B$, in accordance with the read access pattern 600B. The read access pattern 600B represents an access pattern in which the $PE_B$ reads weights and IFM data elements, first along the Y dimension and then along the X dimension, of each of the kernel $X_B$ and IFM $Y_B$, respectively (also referred to as a "Y-X read access pattern").

According to the read access pattern 600B, during a first clock cycle, the $PE_B$ may read the weight at position (0,0) of the kernel $X_B$ and the IFM data element at position (0,0) of the IFM $Y_B$; during a second clock cycle, the $PE_B$ may read the weight at position (0,1) of the kernel $X_B$ and the IFM data element at position (0,1) of the IFM $Y_B$; and during a third clock cycle, the $PE_B$ may read the weight at position (0,2) of the kernel $X_B$ and the IFM data element at position (0,2) of the IFM $Y_B$. Thus, during the first, second and third clock cycles, the $PE_B$ reads weights along the Y dimension (for X=0) of the kernel $X_B$, and reads the IFM data elements along the Y dimension (for X=0) of the IFM $Y_B$.

Next, the $PE_B$ may proceed to read weights and IFM data elements along the X dimension of each of the kernel $X_B$ and the IFM $Y_B$ according to the read access pattern 600B. That is, during a fourth clock cycle, the $PE_B$ may read the weight at position (1,0) of the kernel $X_B$ and the IFM data element at position (1,0) of the IFM $Y_B$; during a fifth clock cycle, the $PE_B$ may read the weight at position (1,1) of the kernel $X_B$ and the IFM data element at position (1,1) of the IFM $Y_B$; and during a sixth clock cycle, the $PE_B$ may read the weight at position (1,2) of kernel $X_B$ and the IFM data element at position (1,2) of the IFM $Y_B$.

Next, the $PE_B$ may read the remaining weights of the kernel $X_B$ and corresponding IFM data elements of the IFM $Y_B$ according to the read access pattern 600B. That is, during a seventh clock cycle, the $PE_B$ may read the weight at position (2,0) of the kernel $X_B$ and the IFM data element at position (2,0) of the IFM $Y_B$; during an eighth clock cycle, the $PE_B$ may read the weight at position (2,1) of the kernel $X_B$ and the IFM data element at position (2,1) of the IFM $Y_B$; and during a ninth clock cycle, the $PE_B$ may read the weight at position (2,2) of the kernel $X_B$ and the IFM data element at position (2,2) of the IFM $Y_B$. In some embodiments, the $PE_B$ or one or more other PEs may be used to produce the remaining OFM data elements of the OFM $Z_B$ by, for example, sliding the kernel $X_B$ across the IFM $Y_B$, in accordance with the read access pattern 600B and a write access pattern.

Figure 6C:
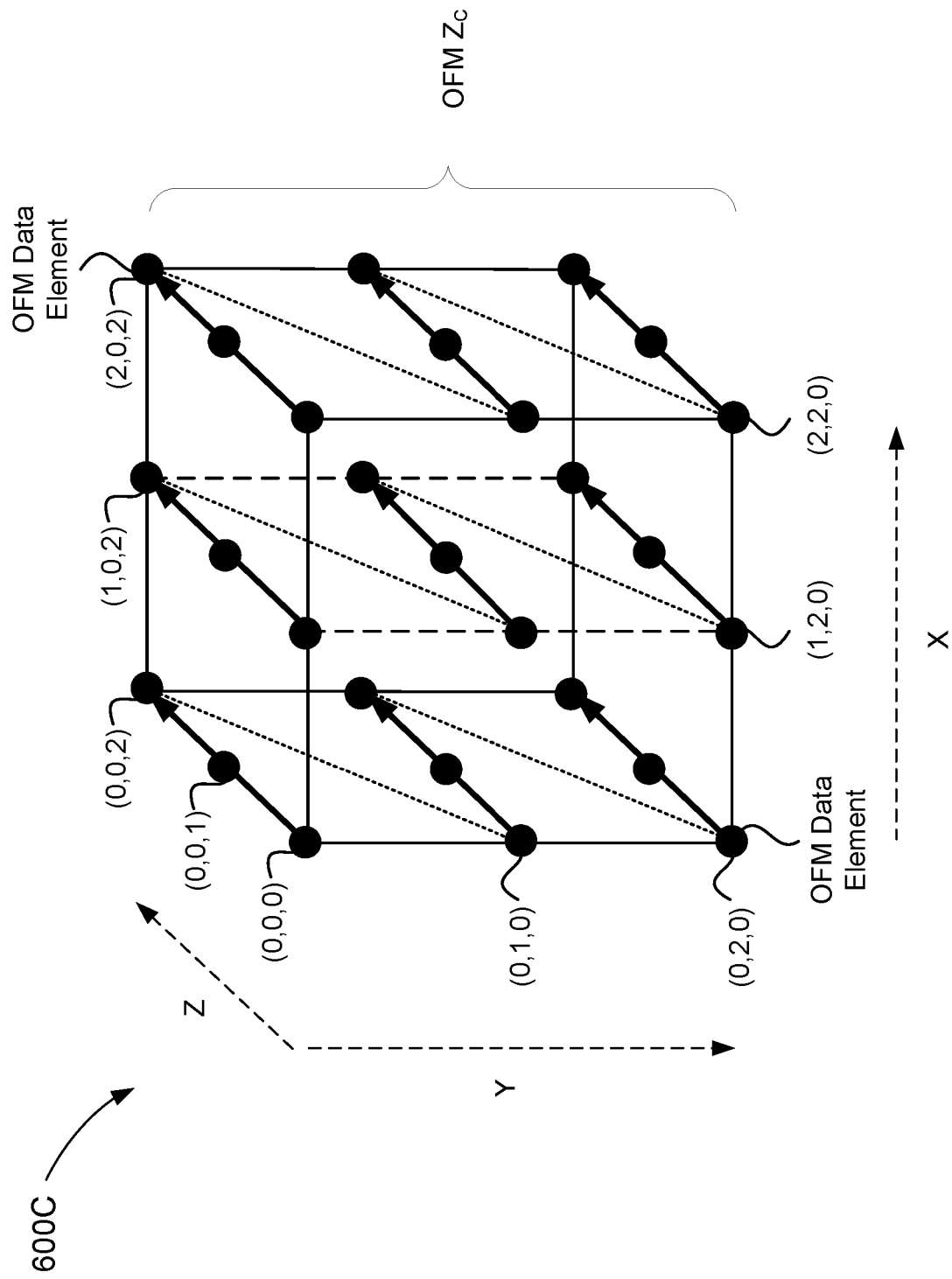
FIG. 6C shows an example write access pattern for one or more PEs associated with a convolutional layer, in accordance with some embodiments.

FIG. 6C shows an example write access pattern 600C for one or more PEs associated with a convolutional layer, in accordance with some embodiments. More specifically, the write access pattern 600C represents an order in which one or more PEs (e.g., of one or more engines) may produce OFM data elements of an OFM $Z_C$. In some embodiments, the one or more PEs may be embodiments of the $PE_A$ and/or $PE_B$ of FIGS. 6A and 6B, respectively. The OFM $Z_C$ may be an embodiment of the OFM $Z_A$ and/or OFM $Z_B$ of FIGS. 6A and 6B, respectively. Further, in some embodiments, the OFM $Z_C$ may represent a three-dimensional subtensor.

In the example of FIG. 6C, the OFM $Z_C$ is depicted as an array of data elements, including 3 rows of data elements (representing an X dimension of the OFM $Z_C$), 3 columns of OFM data elements (representing a Y dimension of the OFM $Z_C$), and 3 channels of OFM data elements (representing a Z dimension of the OFM $Z_C$), for a total of 27 OFM data elements. Like the data elements of the OFM $Z_B$ of FIG. 6B, each of the OFM data elements of the OFM $Z_C$ corresponds to a respective coordinate triple. For example, the OFM data element corresponding to position (0,0,0) represents an OFM data element positioned at (X=0, Y=0, Z=0) within the OFM $Z_C$.

In some embodiments, the one or more PEs may produce the OFM data elements of the OFM $Z_C$ based on weights and IFM data elements (such as described with reference to FIGS. 6A and 6B). The write access pattern 600C represents an access pattern in which the one or more PEs write (or produce) the OFM data elements, first along the Z dimension, then along the Y dimension, and then along the X dimension, of the OFM $Z_C$ (also referred to as a "Z-Y-X write access pattern").

According to the write access pattern 600C, the one or more PEs may first produce (sequentially or simultaneously) the OFM data elements at positions (0,0,0), (0,0,1), and (0,0,2) of the OFM $Z_C$. Thus, the one or more PEs first produce the OFM data elements along the Z dimension (for X=0, Y=0) of the OFM $Z_C$. The one or more PEs may then produce (sequentially or simultaneously) the OFM data elements along the Y dimension of the OFM $Z_C$ at positions (0,1,0), (0,1,1), and (0,1,2), and then positions (0,2,0), (0,2,1), and (0,2,2). Subsequently, the one or more PEs may produce (sequentially or simultaneously) the OFM data elements along the X dimension of the OFM $Z_C$ at positions (1,0,0), (1,0,1), and (1,0,2), and then positions (1,1,0), (1,1,1), and (1,1,2). In some embodiments, the one or more PEs may produce the remaining OFM data elements of the OFM $Z_C$ in accordance with the write access pattern 600C.

Figure 6D:
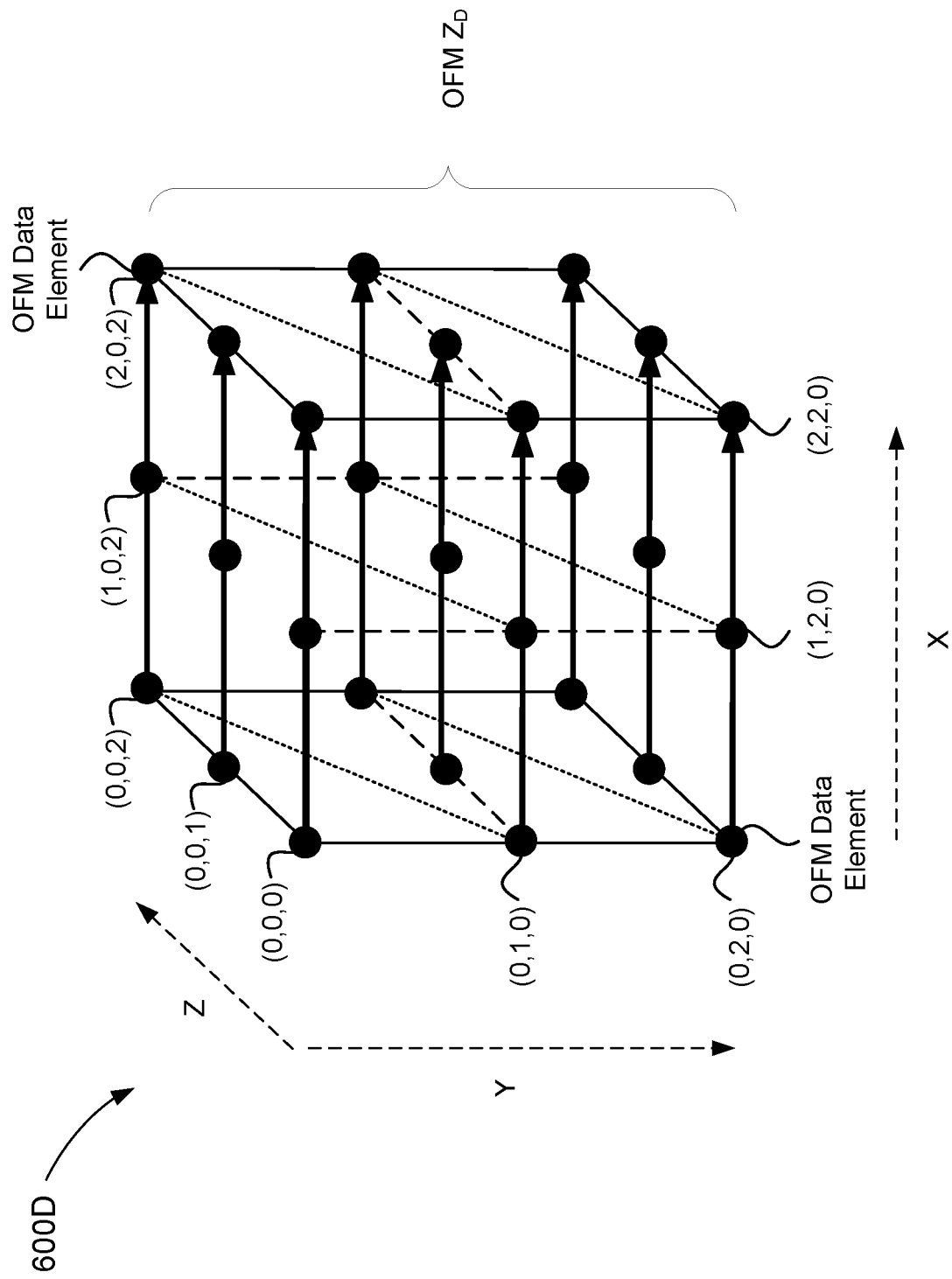
FIG. 6D shows an example write access pattern for one or more PEs associated with a convolutional layer, in accordance with some embodiments.

FIG. 6D shows an example write access pattern 600D for one or more PEs associated with a convolutional layer, in accordance with some embodiments. More specifically, the write access pattern 600D represents an order in which one or more PEs (e.g., of one or more engines) may produce OFM data elements of an OFM $Z_D$. In some embodiments, the one or more PEs may be embodiments of the $PE_A$ and/or $PE_B$ of FIGS. 6A and 6B, respectively. The OFM $Z_D$ may be an embodiment of the OFM $Z_A$ and/or the OFM $Z_B$ of FIGS. 6A and 6B, respectively. In some embodiments, the OFM $Z_D$ may represent a three-dimensional subtensor.

In some embodiments, the one or more PEs may produce the OFM data elements of OFM $Z_D$ based on weights and IFM data elements (such as described with reference to FIGS. 6A and 6B). The write access pattern 600D represents an access pattern in which the one or more PEs write (or produce) the OFM data elements, first along the X dimension, then along the Z dimension, and then along the Y dimension, of the OFM $Z_D$ (also referred to as an "X-Z-Y write access pattern").

According to the write access pattern 600D, the one or more PEs may first produce (sequentially or simultaneously) the OFM data elements at positions (0,0,0), (1,0,0), and (2,0,0) of the OFM $Z_D$. Thus, the one or more PEs first produce the OFM data elements along the X dimension (for Y=0, Z=0) of the OFM $Z_D$. The one or more PEs may then produce (sequentially or simultaneously) the OFM data elements along the Z dimension of OFM $Z_D$ at positions (0,0,1), (1,0,1), and (2,0,1), and then positions (0,0,2), (1,0,2), and (2,0,2). Subsequently the one or more PEs may produce (sequentially or simultaneously) the OFM data elements along the Y dimension of OFM $Z_D$ at positions (0,1,0), (1,1,0), and (2,1,0), and positions (0,1,1), (1,1,1), and (2,1,1). In some embodiments, the one or more PEs may produce the remaining OFM data elements of the OFM $Z_D$ in accordance with the write access pattern 600D.

Figure 7A:
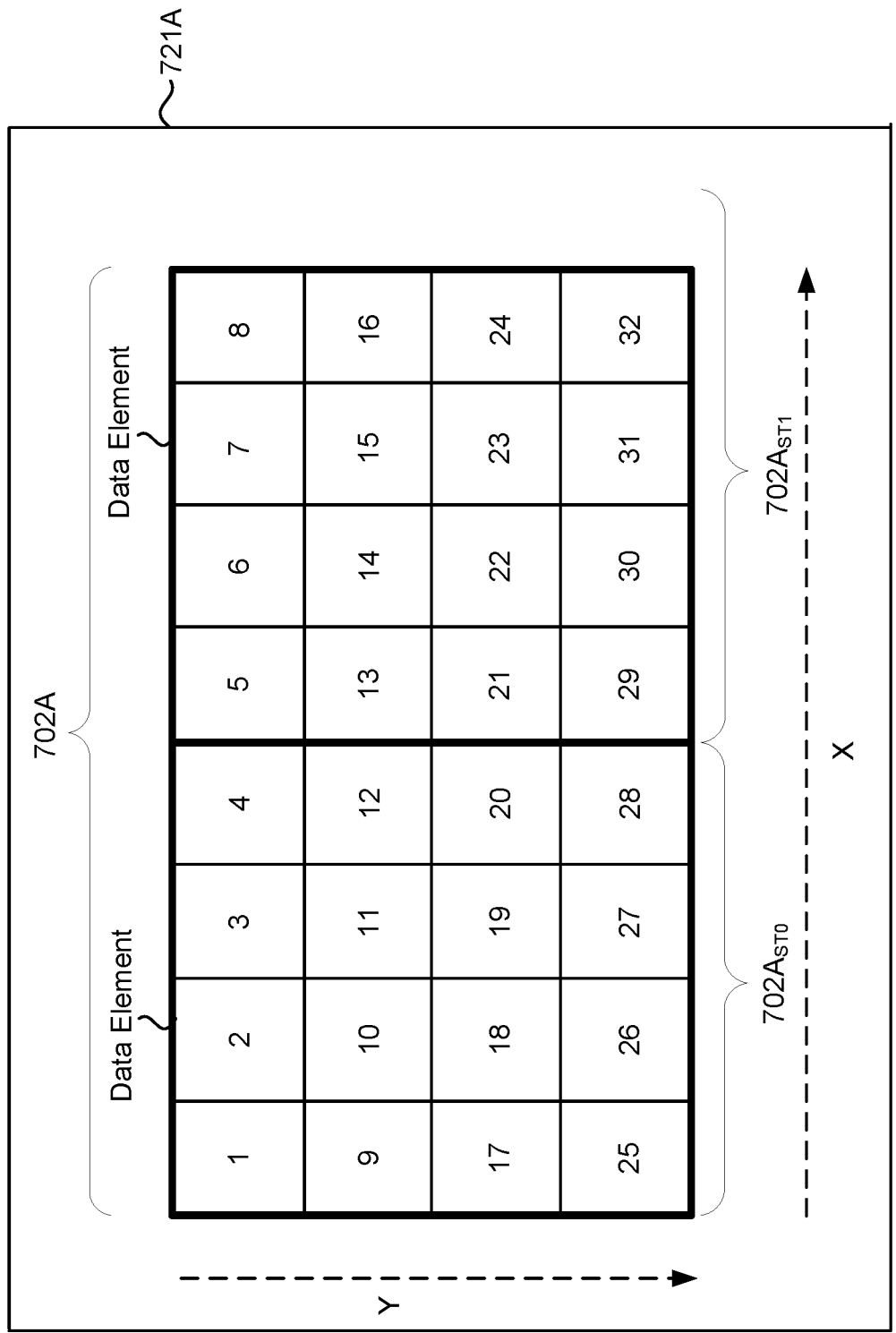
FIG. 7A shows a memory in which an example tensor is stored, in accordance with some embodiments.

FIG. 7A shows a memory 721A in which an example tensor 702A is stored, in accordance with some embodiments. The memory 721A may be, for example, a main memory, a shared memory, or an external memory. In some embodiments, the memory 721A may be one example of the memory 121 of FIG. 1.

The tensor 702A is depicted as a two-dimensional array having a width and height (representing X and Y dimensions, respectively). In the example of FIG. 7A, the tensor 702A is depicted to be 8 data elements wide and 4 data elements high. However, in actual implementations, the tensor 702A may have any dimensions. In some embodiments, where the tensor 702A includes one or more weights (or kernels), the tensor 702A may have a width, height, depth, and/or index (or reference) number. In some embodiments, the memory 721A may store multiple tensors.

As shown in FIG. 7A, each data element is labeled with a respective number ranging from 1 to 32. In some embodiments, each of the numbers 1-32 may represent a tag of a tag array. In some embodiments, each of the 32 data elements may be one example of a data element of an IFM, an OFM, or a kernel (as noted above). Further, in some embodiments, each of the 32 data elements may be stored in the memory 721A in an arrangement (or configuration) different than that shown in FIG. 7A.

In some embodiments, the tensor 702A may be virtually partitioned (or fragmented) into a number (K) of subtensors. For example, as shown in FIG. 7A, the tensor 702A may be virtually partitioned into K=2 subtensors (e.g., subtensor $702A_{ST0}$ and subtensor $702A_{ST1}$). Each of subtensors $702A_{ST0}$ and $702A_{ST1}$ has the same width and height dimensions. In some embodiments, the number (K) of subtensors associated with the tensor 702A may be preconfigured. For example, the number of subtensors (e.g., K=2) may be preconfigured to be equal the number of engines (e.g., 2 engines) in an associated multi-engine processor (e.g., the multi-engine processor 123 of FIG. 1). Further, the dimensions of each of the K subtensors may be predetermined based on a CNN access pattern and an allocation of engines (e.g., OFM allocation, spatial allocation, stride allocation, or combined allocation) used in a multi-engine processor (e.g., the multi-engine processor 122 of FIG. 1) associated with the memory 721A.

Figure 7B:
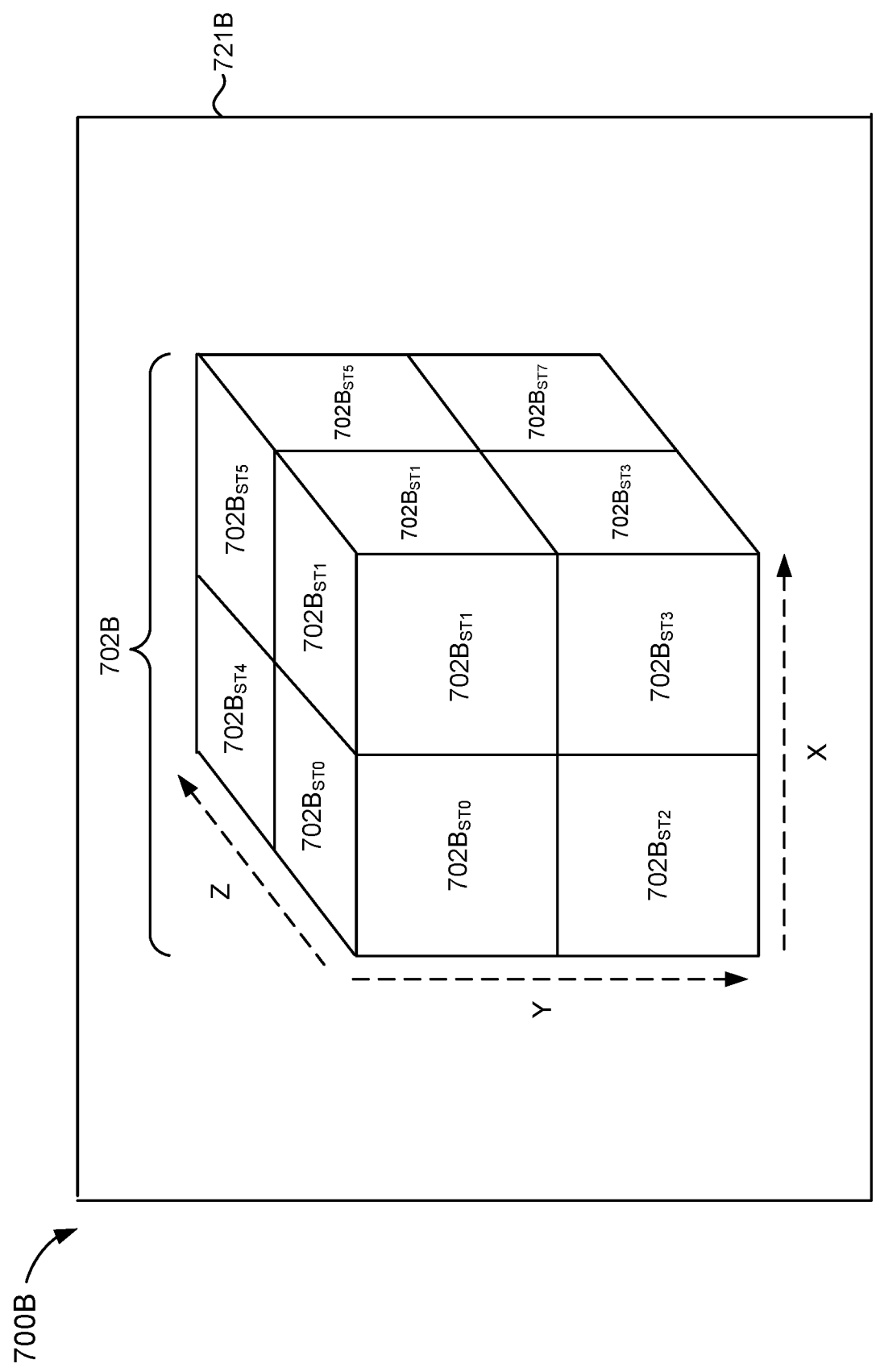
FIG. 7B shows a memory in which an example tensor is stored, in accordance with some embodiments.

FIG. 7B shows a memory 721B in which an example tensor 702B is stored, in accordance with some embodiments. The memory 721B and the tensor 702B may be examples of the memory 721A and the tensor 702A, respectively, of FIG. 7A. As shown in FIG. 7B, the tensor 702B is partitioned into the following eight subtensors: $702B_{ST0}$, $702B_{ST1}$, $702B_{ST2}$, $702B_{ST3}$, $702B_{ST4}$, $702B_{ST5}$, $702B_{ST6}$ (not shown), and $702B_{ST7}$. In some embodiments, each of the subtensors $702B_{ST0}$-$702B_{ST7}$ may be retrieved from the memory 721B and stored in a respective segment of a cache memory (e.g., the cache memory 123 of FIG. 1).

Figure 8:
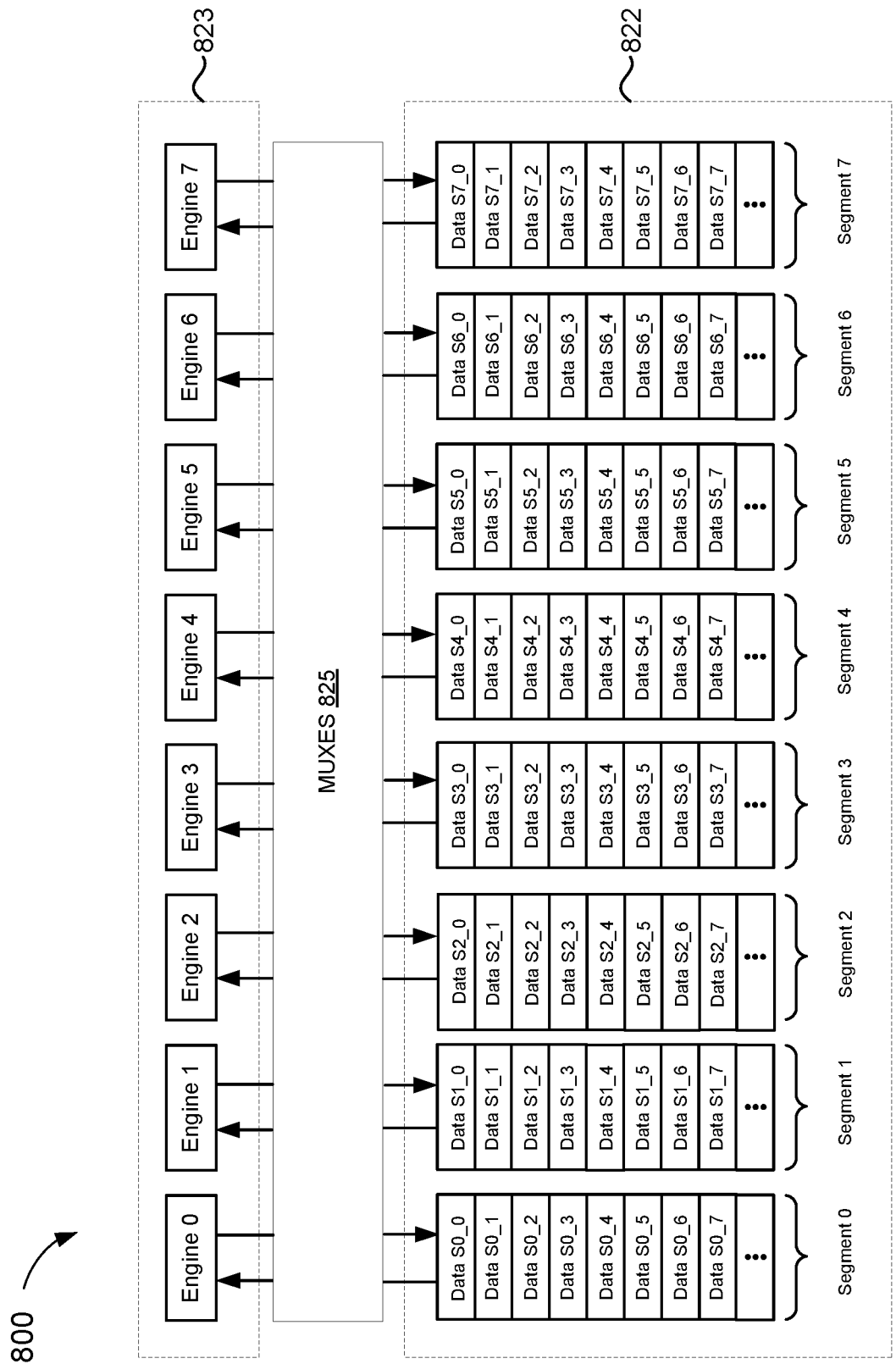
FIG. 8 shows an example block diagram of a system that includes a cache memory coupled to a multi-engine processor, in accordance with some embodiments.

FIG. 8 shows an example block diagram of a system 800 that includes a cache memory 822 coupled to a multi-engine processor 823, in accordance with some embodiments. The cache memory 822 and the multi-engine processor 823 may be embodiments of the cache memory 122 and the multi-engine processor 123, respectively, of FIG. 1. As shown in FIG. 8, the cache memory 822 may be communicatively coupled to the multi-engine processor 823 via one or more multiplexors 825 (also referred to as the "muxes 825").

In some embodiments, the cache memory 822 may represent L1 cache memory. Further, the cache memory 822 may be configured to store only one or more data elements of a particular tensor at a given time. For example, the cache memory 822 may be configured to store data elements (e.g., data elements of an IFM or OFM, or weights) of the tensor 702B of FIG. 7B, at a given time. While FIG. 8 depicts only one cache memory 822 coupled to the multi-engine processor 823 via the muxes 825, in some other embodiments, multiple cache memories 822 may be coupled to the multi-engine processor 823 via the muxes 825, where each of the cache memories 822 stores one or more data elements of a respective tensor.

In some embodiments, the cache memory 822 may include, or be partitioned into, a number (K) of segments (or regions) of memory, where each of the K segments is configured to store one or more data elements of a respective subtensor. For example, as shown in FIG. 8, the cache memory 822 includes eight segments of cache memory (segments 0-7). In some embodiments, segment 0 of the cache memory 822 may include one or more data elements (e.g., S0_0, . . . , S0_7, . . . ) of a subtensor (e.g., the subtensor $702B_{ST0}$ of FIG. 7B); and segment 1 of the cache memory 822 may include one or more data elements (e.g., S1_0, . . . , S1_7, . . . ) of a subtensor (e.g., the subtensor 702B$_{ST1}$ of FIG. 7B). Segment 2 of the cache memory 822 may include one or more data elements (e.g., S2_0, . . . , S2_7, . . . ) of a subtensor (e.g., the subtensor 702B$_{ST2}$ of FIG. 7B); and segment 3 of the cache memory 822 may include one or more data elements (e.g., S3_0, . . . , S3_7, . . . ) of a subtensor (e.g., the subtensor 702B$_{ST3}$ of FIG. 7B). Continuing with the example, segment 4 of the cache memory 822 may include one or more data elements (e.g., S4_0, . . . , S4_7, . . . ) of a subtensor (e.g., the subtensor 702B$_{ST4}$ of FIG. 7B); and segment 5 of the cache memory 822 may include one or more data elements (e.g., S5_0, . . . , S5_7, . . . ) of a subtensor (e.g., the subtensor 702B$_{ST5}$ of FIG. 7B). Further, segment 6 of the cache memory 822 may include one or more data elements (e.g., S6_0, . . . , S6_7, . . . ) of a subtensor (e.g., the subtensor 702B$_{ST6}$ of FIG. 7B); and segment 7 of the cache memory 822 may include one or more data elements (e.g., S7_0, . . . , S7_7, . . . ) of a subtensor (e.g., the subtensor 702B$_{ST7}$ of FIG. 7B). In some embodiments, each of the one or more data elements stored in each of segments 0-7 may be fetched from a memory (e.g., the memory 721B of FIG. 7B).

In some embodiments, the multi-engine processor 823 may include a number (K) of engines, where the number (K) also corresponds to the number of segments included in the cache memory 822, and the number of subtensors into which a tensor may be partitioned in a memory (as described above with reference to FIGS. 7A and 7B). As shown in FIG. 8, the multi-engine processor 823 includes K=8 engines (e.g., engines 0-7). In some embodiments, each of the engines 0-7 may be configured to read from and write to the cache memory 822. For example, in some embodiments, each of the engines 0-7 may be configured to concurrently read from the same segment (e.g., segment 0) of cache memory 822, with no contentions, and/or each of the engines 0-7 may be configured to concurrently read from a different segment of the cache memory 822, with no contentions. Further, in some embodiments, when each of the engines 0-7 of the multi-engine processor 823 finishes reading one or more data elements of a particular segment of the cache memory 822, each of the engines 0-7 may proceed to read data from a different segment of the cache memory 822, with no contentions.

Further, in some embodiments, each of the engines 0-7 of the multi-engine processor 823 may be configured to write to a respective segment of the cache memory 822, with no contentions. For example, where each of the engines 0-7 of the multi-engine processor 823 produces a respective subtensor of an OFM, each of the engines 0-7 may store the respective subtensor in a different segment of the cache memory 822.

As discussed above with reference to FIG. 7B, the dimensions of the K subtensors into which a tensor is partitioned may be preconfigured based on an allocation of engines (e.g., channel allocation, spatial allocation, stride allocation, or combined allocation) in a multi-engine processor (e.g., the multi-engine processor 823 of FIG. 8), for a given layer of a CNN. Put differently, the dimensions of the K subtensors into which a tensor is partitioned may be preconfigured to support (or enable) an engine allocation, and in turn, an access pattern used by each of the engines in the multi-engine processor 823, for a particular layer of a CNN.

Figure 9:
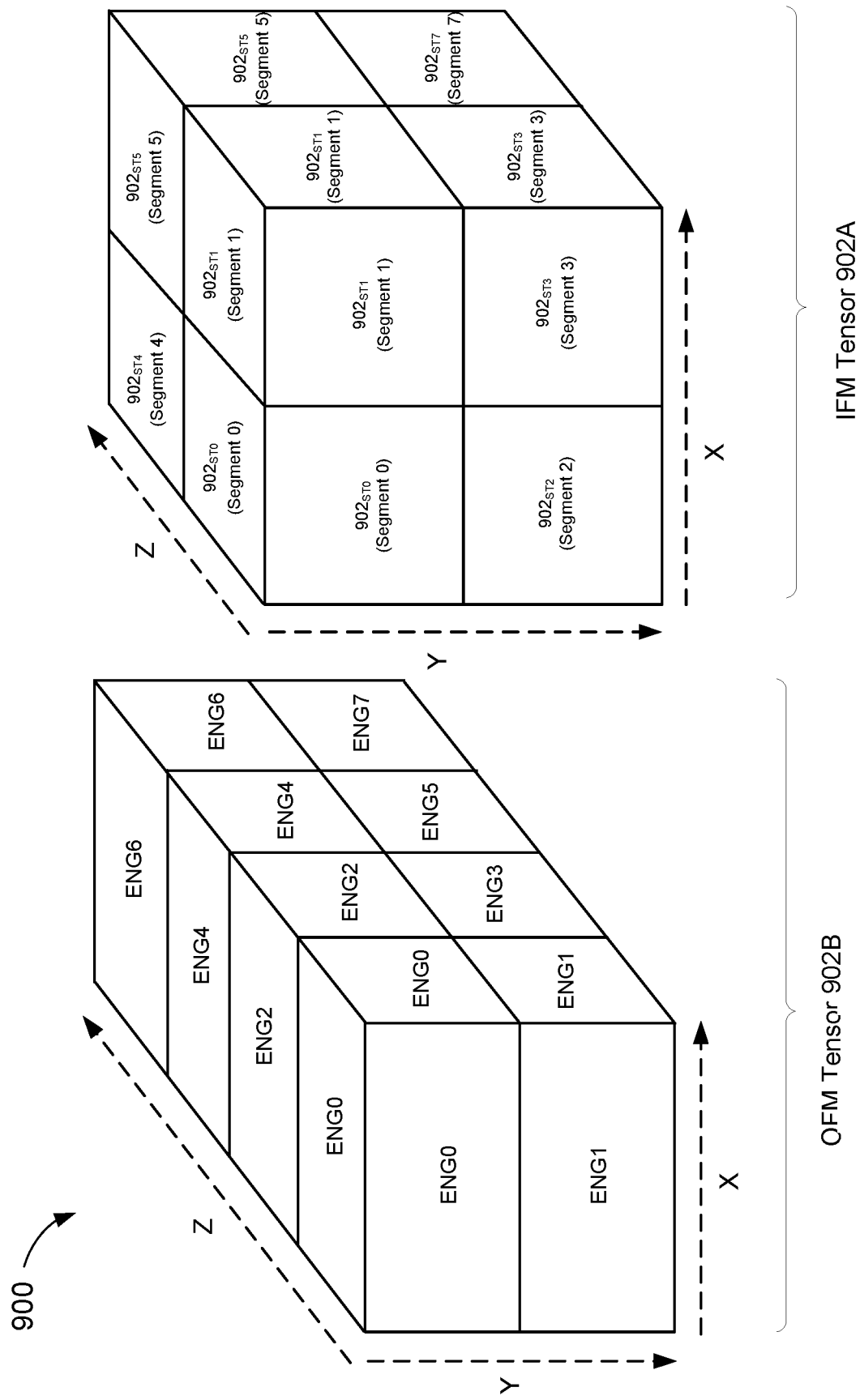
FIG. 9 shows examples of three-dimensional tensors, in accordance with some embodiments.

With reference for example to FIG. 9, a three-dimensional tensor 902A that includes data elements of an IFM (also referred to as the "IFM tensor 902A") may be partitioned into eight subtensors (e.g., 902$_{ST0}$-902$_{ST7}$). More specifically, the IFM tensor 902A may be partitioned into the subtensors 902$_{ST0}$-902$_{ST7}$, in a memory (e.g., the memory 721B of FIG. 7B) based on a combined allocation. Further, each of the eight subtensors (e.g., 902$_{ST0}$-902$_{ST7}$) may include a respective set of the data elements of the IFM tensor 902A. Further, during a period of time, one or more data elements of each of the eight subtensors (e.g., 902$_{ST0}$-902$_{ST7}$) may be stored in a respective segment of cache memory (e.g., segments 0-7), as shown in FIG. 9. Such a partitioning may facilitate a set of eight engines (e.g., ENG0-ENG7) of a multi-engine processor allocated using a form of combined allocation, as shown in FIG. 9. That is, each of engines ENG0-ENG7 may produce a respective subtensor (or portion) of an OFM tensor 902B based on the data elements of the subtensors 902$_{ST0}$-902$_{ST7}$, without contentions.

Figure 10:
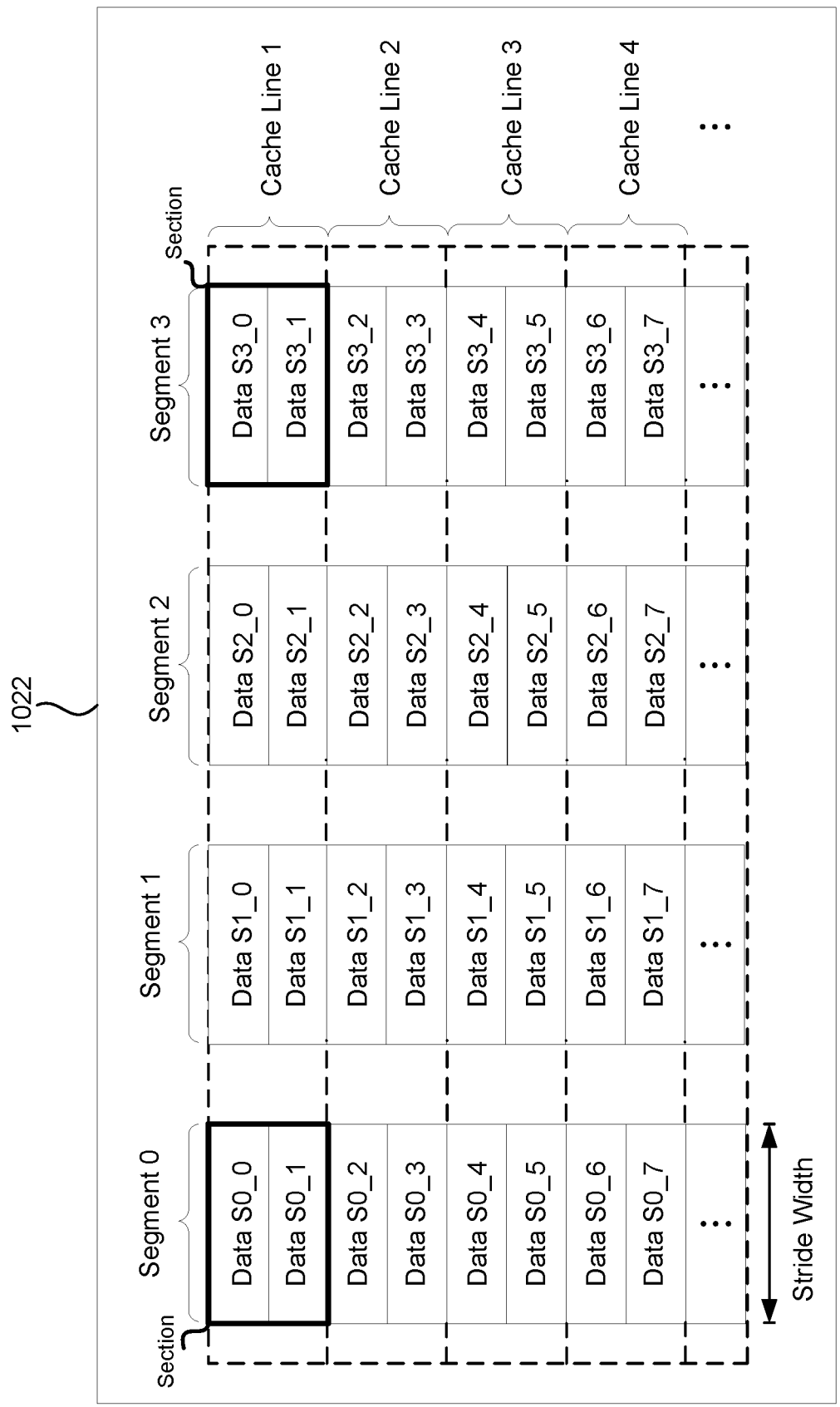
FIG. 10 shows a block diagram of an example cache memory, in accordance with some embodiments.

FIG. 10 shows a block diagram of an example cache memory 1022, in accordance with some embodiments. The cache memory 1022 may be an embodiment of the cache memory 122 and/or 822 of FIGS. 1 and 8, respectively. In some embodiments, the cache memory 1022 may include, or be virtually partitioned into, K segments of memory, as described above with reference to FIG. 8. More specifically, as shown in FIG. 10, the cache memory 1022 may include K=4 segments (e.g., segments 0-3), where each of the segments 0-3 may store one or more data elements of a respective subtensor (e.g., the subtensor 702B$_{ST0}$ of FIG. 7B). For example, the segment 0 may store data elements S0_0, . . . , S0_7, . . . of a first subtensor, and the segment 1 may store data elements S1_0, . . . , S1_7, . . . of a second subtensor. Further, the segment 2 may store data elements S2_0, . . . , S2_7, . . . of a third subtensor, and the segment 3 may store data elements S3_0, . . . , S3_7, . . . of a fourth subtensor. However, in some embodiments, the size (or storage capacity) of each of segments 0-3 may be smaller than the size of (or amount of data in) the first through fourth subtensors, respectively. Further, in some embodiments, each data element (e.g., data S0_0 or data S3_7) stored in the cache memory 1022 may represent one or more bytes (or words) of data.

As shown in FIG. 10, the cache memory 1022 is partitioned into not only segments 0-3, but also at least cache lines 1-4. In some embodiments, each of the cache lines 1-4 may include a number (N) of data elements from each of the segments 0-3. More specifically, as shown in FIG. 10, each of cache lines 1-4 includes N=2 data elements from each of the segments 0-3. For example, the cache line 1 includes (i) data S0_0 and (ii) S0_1 of segment 0; (i) data S1_0 and (ii) data S1_1 of segment 1; (i) data S2_0 and (ii) S2_1 of segment 2; and (i) data S3_0 and (ii) data S3_1 of segment 3. In some embodiments, N may equal an integer greater than or equal to 1 (e.g., N=1, 2, 3, . . . ). Further, in some embodiments, N may equal a power of 2.

FIG. 10 further shows that each data element (e.g., S0_0) of the cache memory 1022 may be associated with a stride width. In some embodiments, the stride width may represent a number of bytes (or words) within a data element (e.g., S0_0) (also referred to as a "data element size") that an engine of a multi-engine processor may read during one clock cycle. Put differently, the stride width may represent the product of the number of PEs in an engine (also referred to as a "stride size") and data element size (e.g., stride width=stride size*data element size).

FIG. 10 also shows that, for each segment of the cache memory 1022, the N data elements of each segment (e.g., the N=2 data elements of segment 0) for a given cache line (e.g., cache line 1) forms a section. For simplicity, only two sections are annotated in FIG. 10. In some embodiments, each section may represent (or determine) a spatial locality of the cache memory 1022. For example, when a PE of an engine reads the data element data S0_0 of a particular section of the segment 0, both the data S0_0 and the data S0_1 may be fetched for the PE. In other words, both the data element that the PE requested (in a particular section of a segment), and all other data elements in the section, may be supplied to the PE based on the principle of spatial locality. In some embodiments, the section size may represent the product of N and the stride width (e.g., section size=N*stride width). While FIG. 10 shows that the cache memory 1022 includes K=4 segments and N=2 data elements per section, in actual implementations, the cache memory 1022 may include any number of segments and any number of data elements per section.

Figure 11:
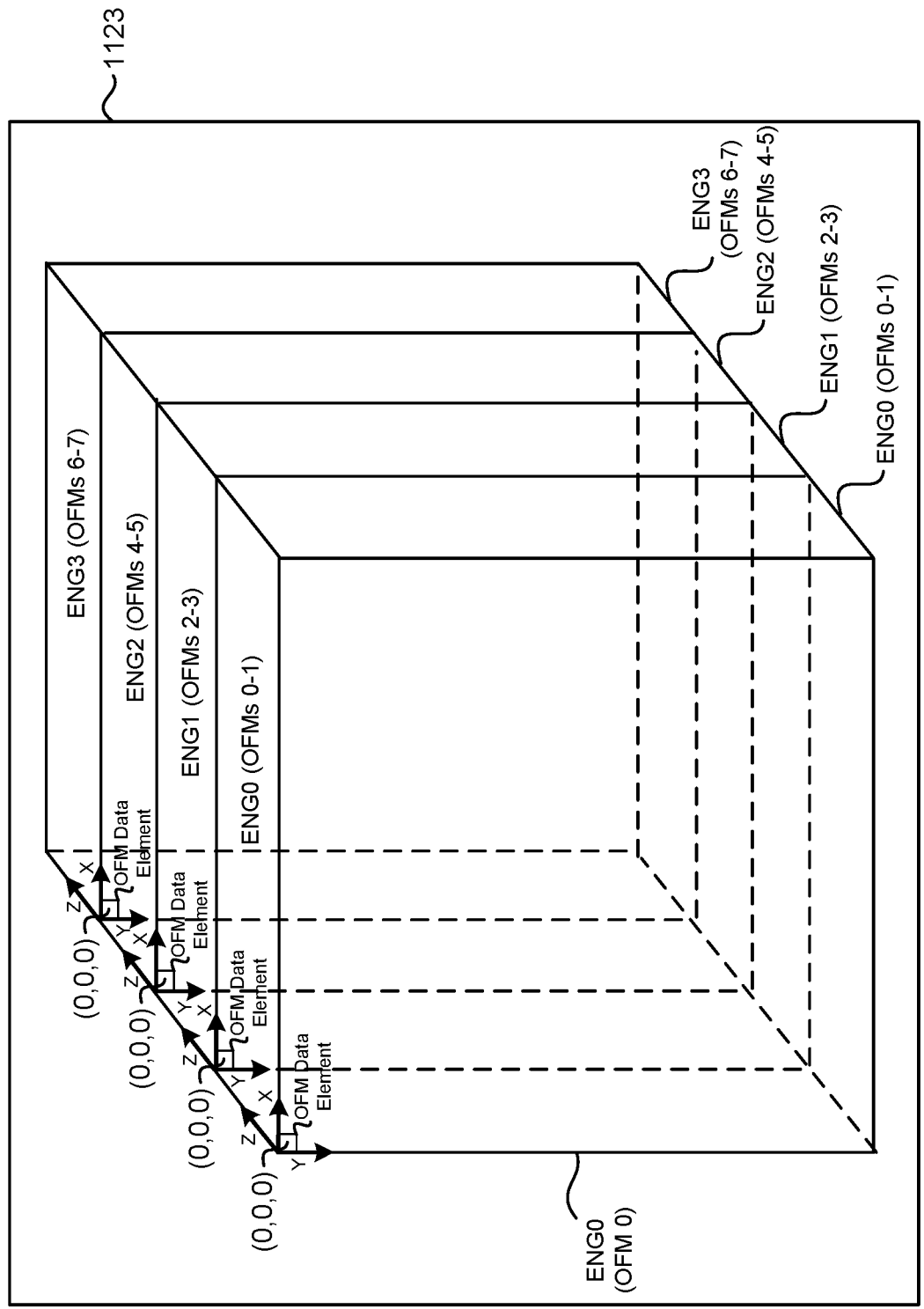
FIG. 11 shows an example multi-engine processor that includes a set of four engines, in accordance with some embodiments.

FIG. 11 shows an example multi-engine processor 1123 that includes a set of four engines (e.g., ENG0-ENG3), in accordance with some embodiments. The multi-engine processor 1123 may be an embodiment of the multi-engine processor 123 and/or 823 of FIGS. 1 and 8, respectively. In some aspects, the four engines ENG0-ENG3 may be allocated in accordance with OFM allocation such that ENG0 produces each of OFM 0 and OFM 1 based on inputs, ENG1 produces each of OFM 2 and OFM 3 based on inputs, ENG2 produces each of OFM 4 and OFM 5 based on inputs, and ENG3 produces each of OFM 6 and OFM 7 based on inputs.

In some embodiments, each of ENG0-ENG3 may use an identical coordinate system. For example, as shown in FIG. 11, each of ENG0-ENG3 may use a respective three-dimensional coordinate system composed of X, Y, and Z axes (also referred to as the "X, Y, Z coordinate system"). In some embodiments, the origin (e.g., where X=0, Y=0, and Z=0) of each of the X, Y, and Z coordinate systems may coincide with an OFM data element positioned at the front, top left corner of various OFMs (e.g., the OFMs 0, 2, 4, and 6), as shown in FIG. 11. While the origin of each of the X, Y, Z coordinate systems in FIG. 11 is represented by a rectangle, in some embodiments, the origin (or other positions) of each of the X, Y, Z coordinate systems may be represented by a different shape.

Further, when the engines ENG0-ENG3 produce the OFMs 0-7, each of the engines ENG0-ENG3 may operate in lock step. That is, when ENG0 produces a data element of OFM 0 positioned at (0,0,0) of the X, Y, Z, coordinate system for ENG0, ENG1 may simultaneously produce a data element of OFM 2 positioned at (0,0,0) of the X, Y, Z coordinate system for ENG1; ENG2 may simultaneously produce a data element of OFM 4 positioned at (0,0,0) of the X, Y, Z coordinate system for ENG2; and ENG3 may simultaneously produce a data element of OFM 6 positioned at (0,0,0) of the X, Y, Z coordinate system for ENG3. Put differently, during any given time period, ENG0-ENG3 may produce data elements of OFM 0, 2, 4, and 6, respectively, and each of the produced data elements may have the same coordinates within a respective X, Y, Z coordinate system. In some embodiments, the coordinates of a particular position within an X, Y, Z, coordinate system may be referred to as "engine coordinates" or an "engine address." While FIG. 11 shows that the multi-engine processor 1123 includes four engines, in actual implementations, the multi-engine processor 1123 may include any number of engines.

In some aspects, each of ENG0-ENG3 may use a CNN access pattern (as discussed above with respect to FIGS. 6A-6D) in order to produce the OFM0-OFM7. More specifically, each of ENG0-ENG3 may retrieve (or read), in accordance with the CNN access pattern, IFM (or OFM) data elements and/or weights from a local memory (e.g., the cache memory 122 of FIG. 1). In some embodiments, before ENG0-ENG3 request IFM data elements and/or weights used to produce OFM0-OFM7, the IFM data elements and/or weights may be prefetched (or retrieved) from a memory (e.g., the memory 121 of FIG. 1), in accordance with the CNN access pattern, and stored in the local memory (e.g., the cache memory 122 of FIG. 1). To facilitate the prefetching of the IFM data elements and/or weights from a memory (e.g., the memory 121 of FIG. 1), the IFM data elements and/or weights may be mapped from the memory (e.g., the memory 121 of FIG. 1), to the local memory (e.g., the cache memory 122 of FIG. 1) in accordance with the CNN access pattern.

Figure 12A:
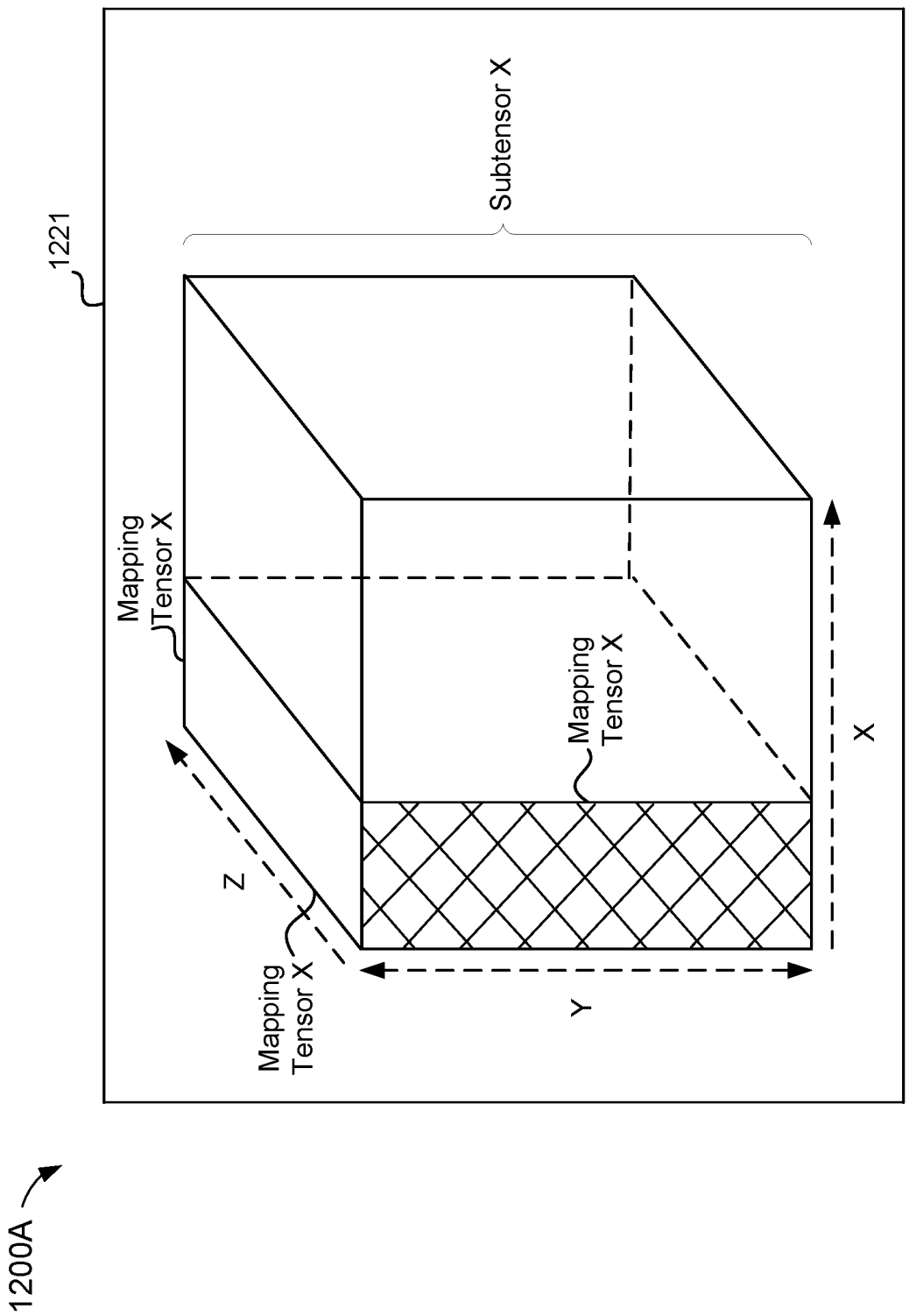
FIGS. 12A-12C show a memory that stores a mapping tensor, in accordance with some embodiments.
Figure 12C:
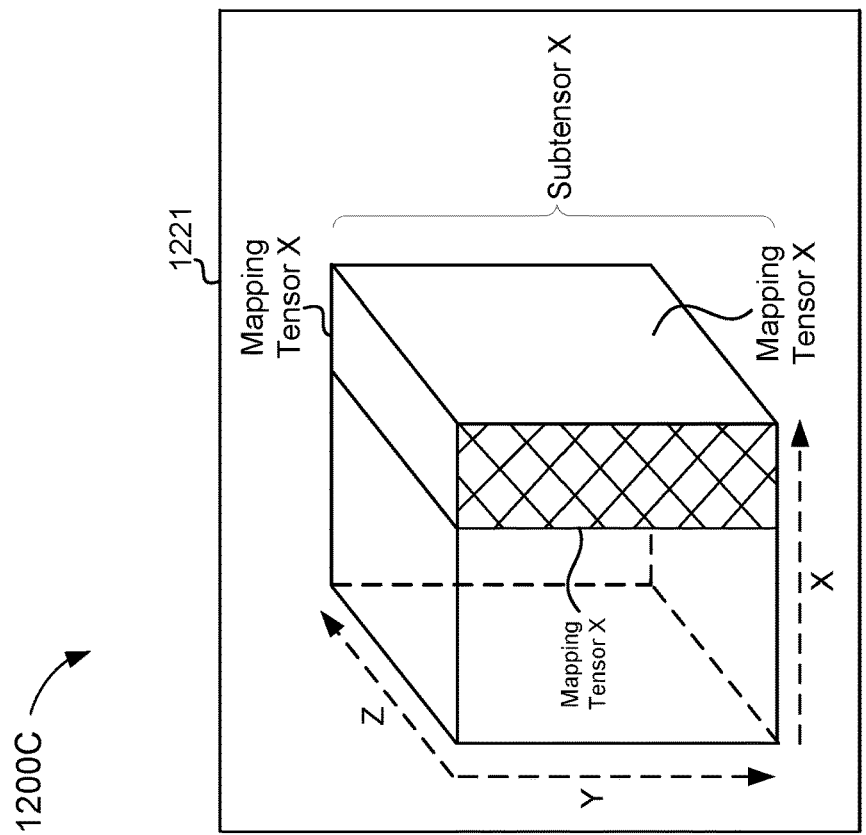
Figure 12B:
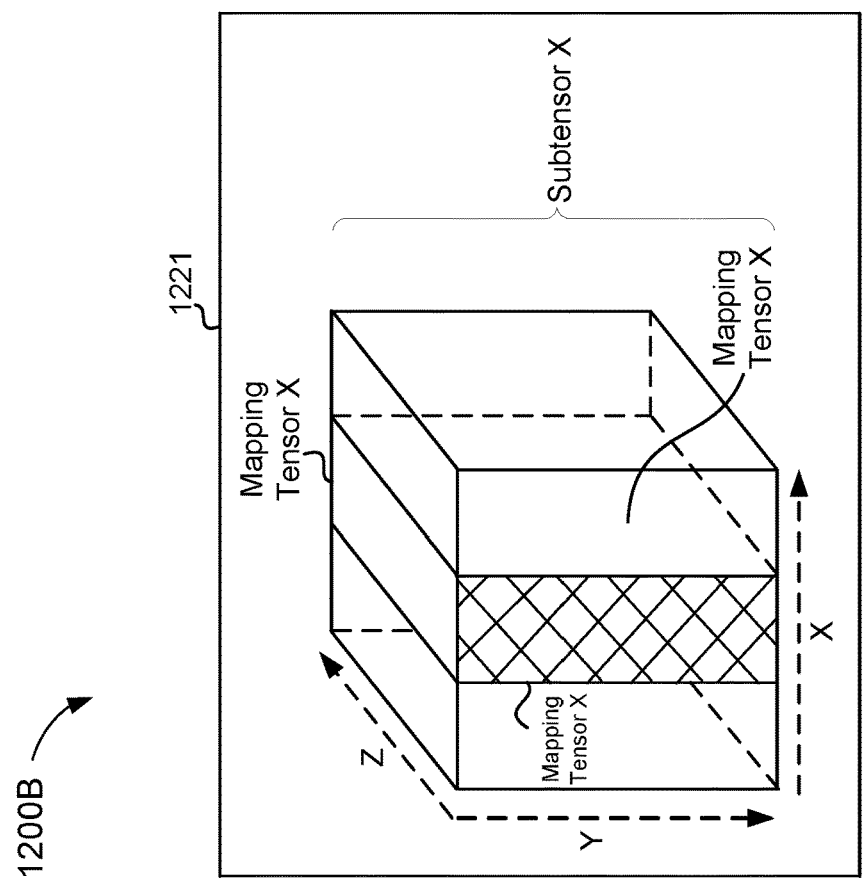

FIGS. 12A-12C show a memory 1221 that stores a mapping tensor X, in accordance with some embodiments. The mapping tensor X represents a virtually defined tensor that includes one or more data elements stored in the memory 1221, and that is configured to map the one or more data elements to a local memory in accordance with a CNN access pattern. For simplicity, the one or more data elements and the local memory are not shown in FIGS. 12A-12C. In some aspects, mapping the one or more data elements from the memory 1221 to the local memory in accordance with the CNN access pattern may refer to associating each of the one or more data elements in the memory 1221 with a particular location in the local memory, such that if the one or more data elements are transferred or copied from the memory 1221 to the local memory, the one or more data elements may be stored in the local memory in the sequence of the CNN access pattern. Further, the one or more data elements may be stored in the local memory such that the one or more data elements replace existing data elements stored in the local memory that are not needed by, for example, a multi-engine processor (e.g., the multi-engine processor 123 of FIG. 1).

With reference to FIG. 12A, the mapping tensor X may include one or more data elements of a subtensor X stored in the memory 1221. Further, the mapping tensor X may be used to map the one or more data elements of the subtensor X to a segment of cache memory (e.g., a segment 0 of the cache memory 822 of FIG. 8), in accordance with a CNN access pattern. The subtensor X may be an embodiment of the subtensor $902_{STO}$ of FIG. 9, and the memory 1221 may be an embodiment of the memory 721A and/or 721B of FIGS. 7A and 7B, respectively. Further, the CNN access pattern may be an embodiment of the CNN access patterns discussed above with reference to FIGS. 6A-6D. In some embodiments, each of the one or more data elements of the subtensor X may represent an IFM (or OFM) data element or a weight.

As shown in FIGS. 12A-12C, each of the mapping tensor X and the subtensor X may represent a three-dimensional tensor having a width, height, and depth along X, Y, and Z axes, respectively; however, in actual implementations, each of the mapping tensor X and the subtensor X may have any number of dimensions. Further, as shown in FIGS. 12A-12C, a spatial dimension of the mapping tensor X is shown with hash marks. While FIG. 12A shows that the mapping tensor X includes one or more data elements along only the left part of the X axis of the subtensor X, and all along the Y and Z axes of the subtensor X, in some embodiments, the mapping tensor X may include one or more other data elements of the subtensor X. For example, as shown in FIG. 12B, the mapping tensor X may include one or more data elements along the mid part of the X axis of the subtensor X, and all along the Y and Z axes of the subtensor X. Further, FIG. 12C shows that the mapping tensor X may include one or more data elements along only the right part of the X axis, and all along the Y and Z axes.

Figure 13:
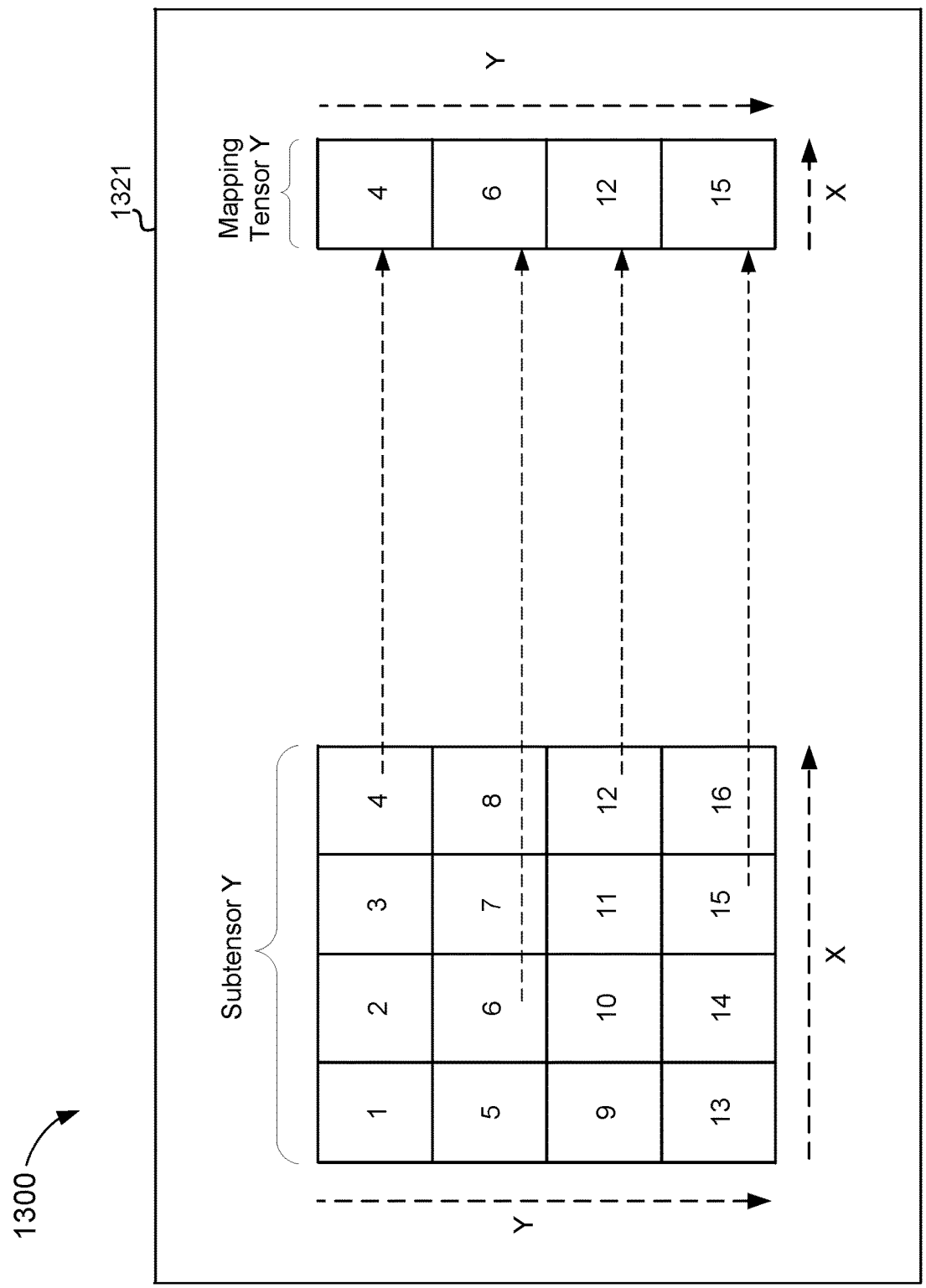
FIG. 13 shows a memory that stores a mapping tensor, in accordance with some embodiments.

FIG. 13 shows a memory 1321 that stores a mapping tensor Y, in accordance with some embodiments. More specifically, FIG. 13 shows that the mapping tensor Y may include data elements of a subtensor Y, which is stored in a memory 1321. The mapping tensor Y, the subtensor Y, and the memory 1321 may be embodiments of the mapping tensor X, the subtensor X, and the memory 1221, respectively, of FIGS. 12A-12C. As shown in FIG. 13, each of the mapping tensor Y and the subtensor Y has a width and a height along X and Y axes, respectively. Further, FIG. 13 shows that the subtensor Y includes 16 data elements, where each of the 16 data elements is labeled with a respective number ranging from 1 to 16. However, in actual implementations, the subtensor Y may include any number of data elements. In some embodiments, each of the numbers 1-16 may represent a tag of a tag array. Further, FIG. 13 shows that the mapping tensor Y may include four data elements of the subtensor Y—that is, data elements 4, 6, 12, and 15. However, in actual implementations, the mapping tensor Y may include any number of data elements of the subtensor Y. In some embodiments, the data elements 4, 6, 12, and 15 of the mapping tensor Y may be positioned (or ordered) within the mapping tensor Y in accordance with a CNN access pattern.

Figure 14:
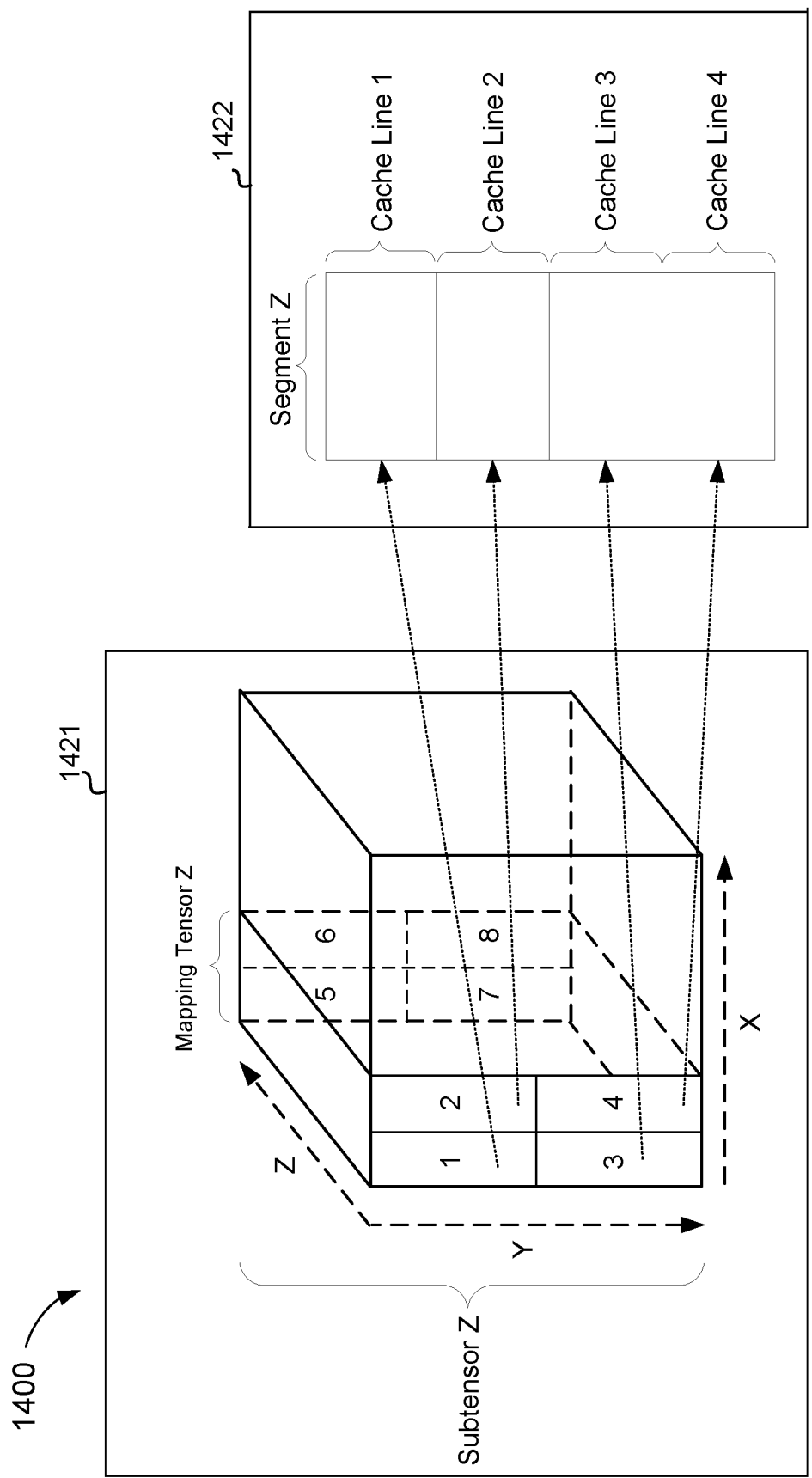
FIG. 14 shows an example system including a memory and a cache memory, in accordance with some embodiments.

FIG. 14 shows an example system 1400 including a memory 1421 and a cache memory 1422, in accordance with some embodiments. More specifically, the memory 1421 stores a mapping tensor Z which includes data elements of a subtensor Z. The mapping tensor Z, the subtensor Z, and the memory 1421 may be embodiments of the mapping tensor Y, the subtensor Y, and the memory 1321, respectively, of FIG. 13. Further, the cache memory 1422 may be an embodiment of the cache memory 822 and/or 1022 of FIGS. 8 and 10, respectively.

As shown in FIG. 14, each of the mapping tensor Z and the subtensor Z has a width, height, and depth along X, Y, and Z axes, respectively. However, in actual implementations, each of the mapping tensor Z and the subtensor Z may have any dimensions. FIG. 14 further shows that the mapping tensor Z includes 8 data elements of the subtensor Z. However, in actual implementations, the mapping tensor Z may include any number of data elements of the subtensor Z. As shown in FIG. 14, each of the eight data elements is labeled with a respective number ranging from 1 to 8. In some embodiments, each of the numbers 1-8 may represent a tag of a tag array.

FIG. 14 further shows that, in some embodiments, the data elements 1-4 of the mapping tensor Z may be mapped to the cache memory 1422 in accordance with a CNN access pattern. More specifically, FIG. 14 shows that, at a given time, the data elements 1-4 of the mapping tensor Z may be mapped to a segment Z of the cache memory 1422, in accordance with the CNN access pattern. That is, the data element 1 may be mapped to a cache line 1 of the segment Z, the data element 2 may be mapped to a cache line 2 of the segment Z, the data element 3 may be mapped to a cache line 3 of the segment Z, and the data element 4 may be mapped to a cache line 4 of the segment Z. In some embodiments, the data elements 5-8 of the mapping tensor Z may be similarly mapped to the cache lines 1-4, respectively, of the segment Z.

In some aspects, the data elements 1-4 of the mapping tensor Z may be transferred (or copied) to, and stored in, the cache lines 1-4, respectively, of the segment Z. When the data elements 1-4 of the mapping tensor Z are stored in the cache lines 1-4, respectively, of the segment Z, each of data elements 1-4 may replace existing data elements stored in the cache lines 1-4 of segment Z. Further, the data elements 1-4 stored in the cache lines 1-4, respectively, of segment Z, may subsequently be transferred (or copied) to a multi-engine processor (e.g., the multi-engine processor 123 of FIG. 1) for processing in accordance with a CNN access pattern. In some embodiments, once the data elements 1-4 stored in the cache lines 1-4, respectively, of the segment Z are transferred to (or read by) the multi-engine processor, the data elements 5-8 of the mapping tensor Z may be transferred (or copied) to the cache lines 1-4, respectively, of the segment Z. That is, the data elements 5-8 may overwrite the data elements 1-4 stored in the cache lines 1-4, respectively, of the segment Z. The data elements 5-8 stored in the cache lines 1-4, respectively, of the segment Z may subsequently be transferred to (or read by) to the multi-engine processor for processing in accordance with the CNN access pattern. While FIG. 14 shows that the segment Z includes 4 cache lines, in actual embodiments, the segment Z may include any number of cache lines.

As discussed above with reference to FIGS. 7A and 7B, the number of subtensors associated with a tensor, and the dimensions of each of the partitioned subtensors, may be preconfigured (e.g., prior to the processing of one or more layers of a CNN) based on a CNN access pattern. Similarly, the dimensions of a mapping tensor (e.g., the mapping tensor Z) may be preconfigured (e.g., prior to the processing of one or more layers of a CNN) based on the CNN access pattern. In some embodiments, preconfiguring (i) the number of subtensors into which a tensor is partitioned, (ii) the dimensions of each of the partitioned subtensors, and (iii) the dimensions of a mapping tensor associated with each of the partitioned subtensors, may facilitate the mapping of each of one or more data elements from a memory (e.g., the memory 1421 of FIG. 14) to a cache memory (e.g., the cache memory 1422 of FIG. 14).

Figure 15:
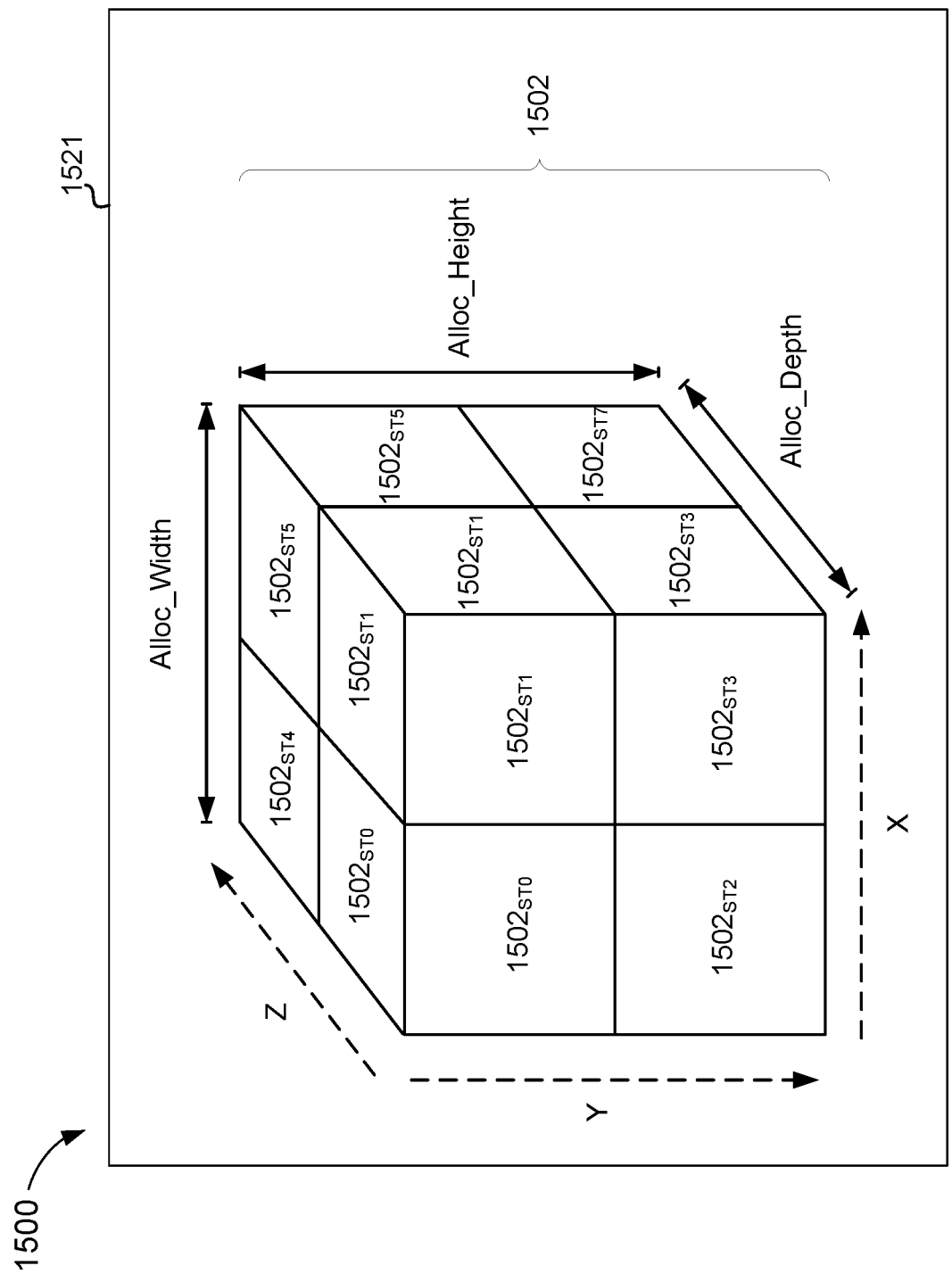
FIG. 15 shows a memory storing an example tensor that is virtually partitioned into a number (K) of subtensors, in accordance with some embodiments.

FIG. 15 shows a memory 1521 storing an example tensor 1502 that is virtually partitioned into a number (K) of subtensors, in accordance with some embodiments. The tensor 1502 and the memory 1521 may be embodiments of the tensor 702B and the memory 721B, respectively, of FIG. 7B. Further, FIG. 15 shows that the tensor 1502 may be a three-dimensional tensor having a width, height, and depth, along X, Y, and Z axes, respectively. Further, in some embodiments, the tensor 1502 may be virtually partitioned into K=8 subtensors (e.g., $1502_{ST0}$-$1502_{ST7}$). In actual implementations, the tensor 1502 may have any number of dimensions, and be partitioned into any number of subtensors.

As shown in FIG. 15, the tensor 1502 may be associated with parameters Alloc_Width, Alloc_Height, and Alloc_Depth (where "Alloc" refers to allocation). The parameters Alloc_Width, Alloc_Height, and Alloc_Depth may be referred to collectively as "tensor parameters." Alloc_Width may represent the number of subtensors along the X axis into which the tensor 1502 is partitioned. For example, Alloc_Width=2 subtensors (e.g. $1502_{ST2}$ and $1502_{ST3}$), as shown in FIG. 15. Alloc_Height may represent the number of subtensors along the Y axis into which the tensor 1502 is partitioned. For example, Alloc_Height=2 subtensors (e.g. $1502_{ST5}$ and $1502_{ST7}$), as shown in FIG. 15. Further, Alloc_Depth may represent the number of subtensors along the Z axis into which the tensor 1502 is partitioned. For example, Alloc_Depth=2 subtensors (e.g. $1502_{ST3}$ and $1502_{ST7}$), as shown in FIG. 15. In some embodiments, each of the tensor parameters for the tensor 1502 may be preconfigured prior to the processing of one or more layers of a CNN.

Figure 16:
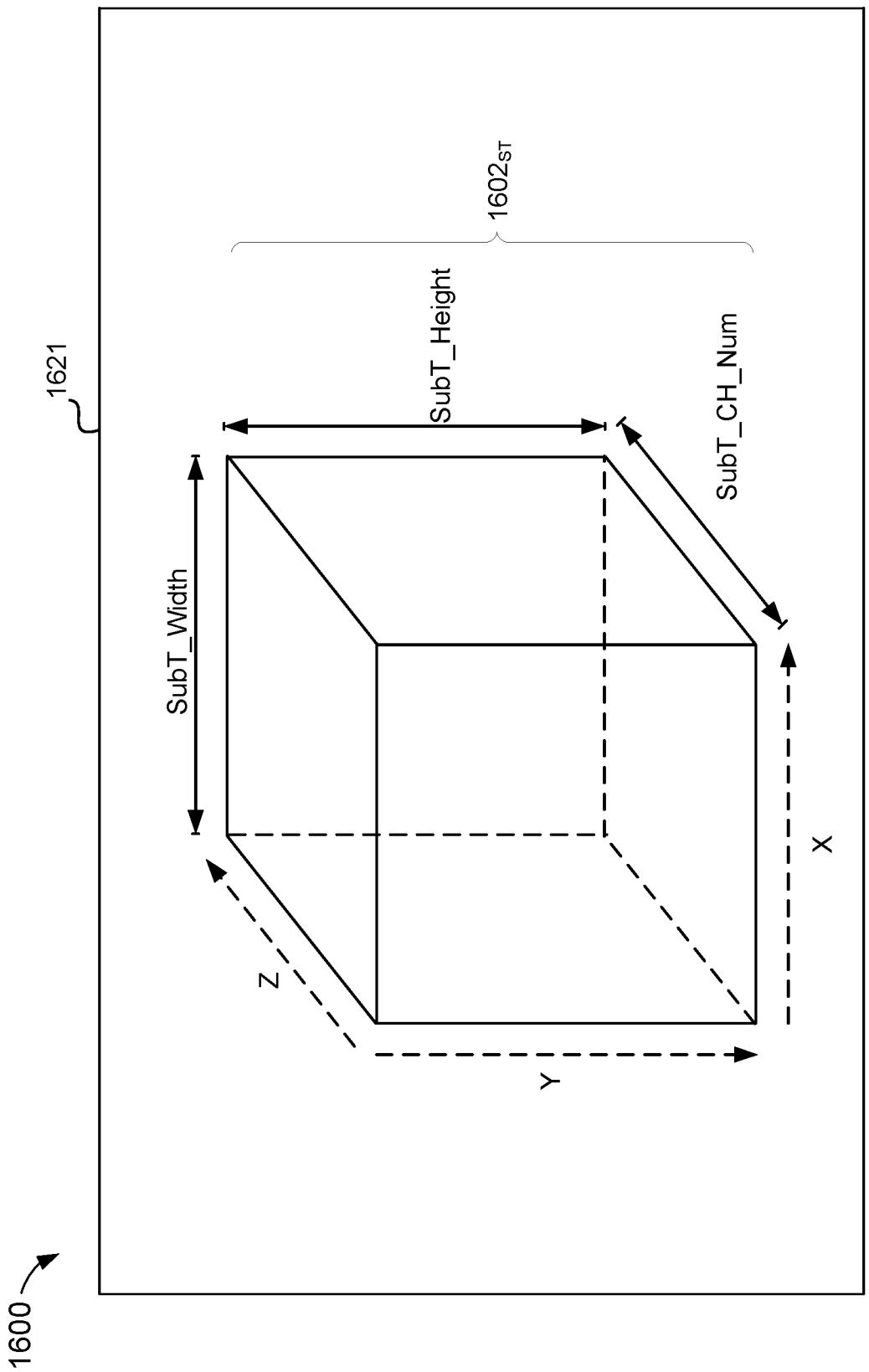
FIG. 16 shows a memory storing an example subtensor, in accordance with some embodiments.

FIG. 16 shows a memory 1621 storing an example subtensor 1602$_{ST}$, in accordance with some embodiments. The subtensor 1602$_{ST}$ may be an embodiment of one of the subtensors of FIG. 15 (e.g., the subtensor 1502$_{ST0}$), and the memory 1621 may be an embodiment of the memory 1521 of FIG. 15. Further, FIG. 16 shows that the subtensor 1602$_{ST}$ may be a three-dimensional subtensor having a width, height, and depth, along X, Y, and Z axes, respectively. However, in actual implementations, the subtensor 1602$_{ST}$ may have any number of dimensions.

As shown in FIG. 16, the subtensor 1602$_{ST}$ may be associated with parameters SubT_Width, SubT_Height, and SubT_CH_Num (collectively referred to as "subtensor parameters"). SubT_Width may represent the width of the subtensor 1602$_{ST}$ along the X axis. SubT_Height may represent the height of the subtensor 1602$_{ST}$ along the Y axis. Further, SubT_CH_Num may represent the number of channels (or the depth) of the subtensor 1602$_{ST}$ along the Z axis. In some embodiments, each of the subtensor parameters for the subtensor 1602$_{ST}$ may be preconfigured prior to the processing of one or more layers of a CNN.

Figure 17:
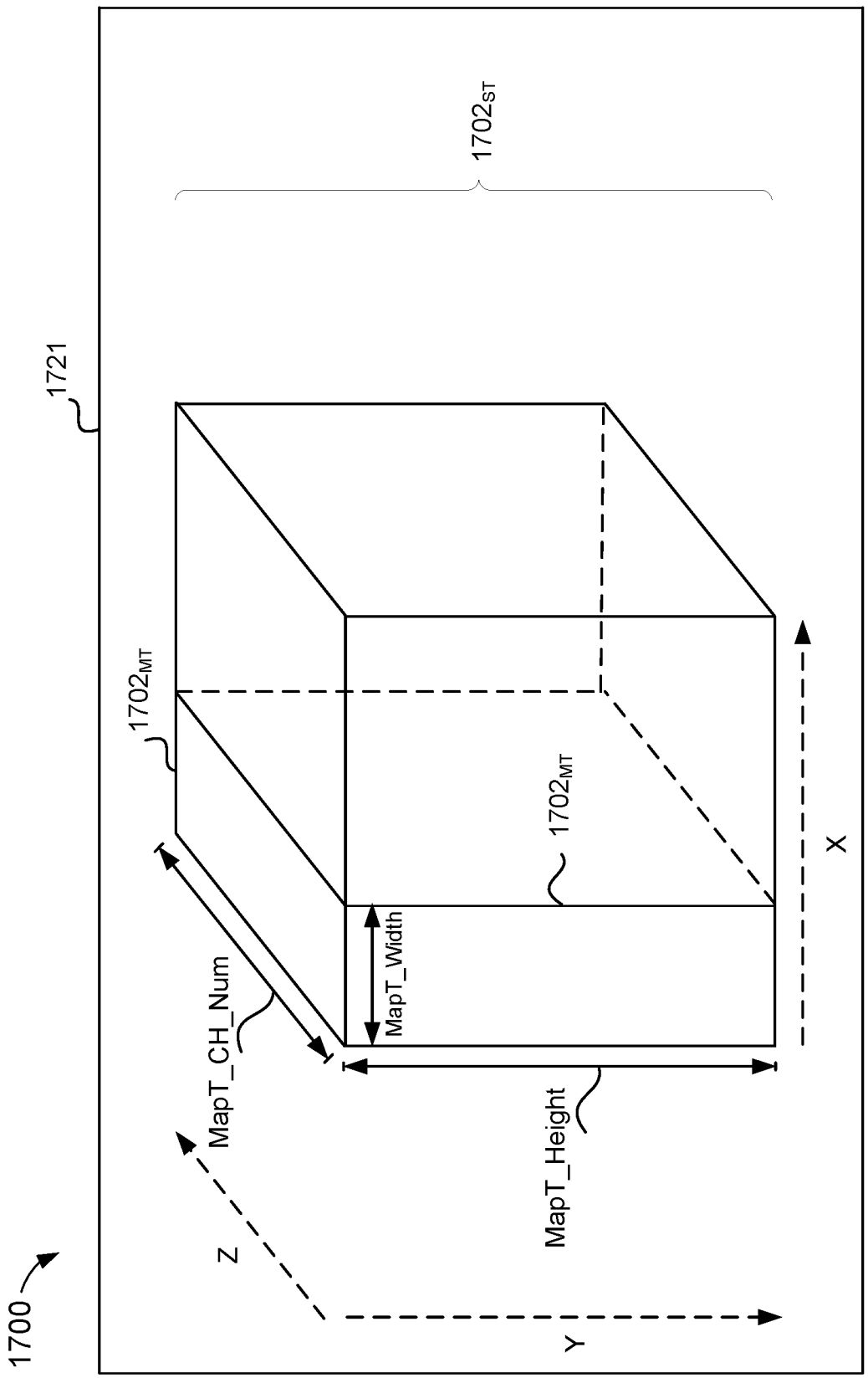
FIG. 17 shows a memory storing an example mapping tensor, in accordance with some embodiments.

FIG. 17 shows a memory 1721 storing an example mapping tensor 1702MT, in accordance with some embodiments. As shown in FIG. 17, the mapping tensor 1702MT may include one or more data values of a subtensor 1702ST, where the mapping tensor 1702MT and the subtensor 1702ST are stored in the memory 1721. The mapping tensor 1702MT may be an embodiment of the mapping tensor Z of FIG. 14. Further, the subtensor 1702ST and the memory 1721 may be embodiments of the subtensor 1602ST and the memory 1621, respectively, of FIG. 16. In some embodiments, each of the mapping tensor 1702MT and the subtensor 1702ST may be a three-dimensional array (or matrix) having a width, height, and depth, along X, Y, and Z axes, respectively. However, in actual implementations, each of the mapping tensor 1702MT and the subtensor 1702ST may have any number of dimensions.

As shown in FIG. 17, the mapping tensor 1702$_{MT}$ may be associated with parameters MapT_Width, MapT_Height, and MapT_CH_Num (collectively referred to as "mapping tensor parameters"). MapT_Width may represent the width of the mapping tensor 1702$_{MT}$ along the X axis. MapT_Height may represent the height of the mapping tensor 1702$_{MT}$ along the Y axis. Further, MapT_CH_Num may represent the number of channels (or the depth) of the mapping tensor 1702$_{MT}$ along the Z axis. In some embodiments, each of the mapping tensor parameters for the mapping tensor 1702$_{MT}$ may be preconfigured prior to the processing of one or more layers of a CNN.

In some embodiments, the tensor parameters, subtensor parameters, and mapping tensor parameters (discussed above with reference to FIGS. 15-17) associated with a given data element of a tensor may facilitate the mapping of the data element from a memory (e.g., the memory 121 of FIG. 1) to a local memory (e.g., the cache memory 122 of FIG. 1). That is, the tensor parameters, subtensor parameters, and mapping tensor parameters associated with a given data element may be used to determine where the data element may be mapped to (or stored in) a local memory. Similarly, an engine address (e.g., (X, Y, Z)) associated with the data element (e.g., an engine address at which the data element may be processed by an engine) may also be used to determine where the data element may be stored in a local memory.

Figure 18:
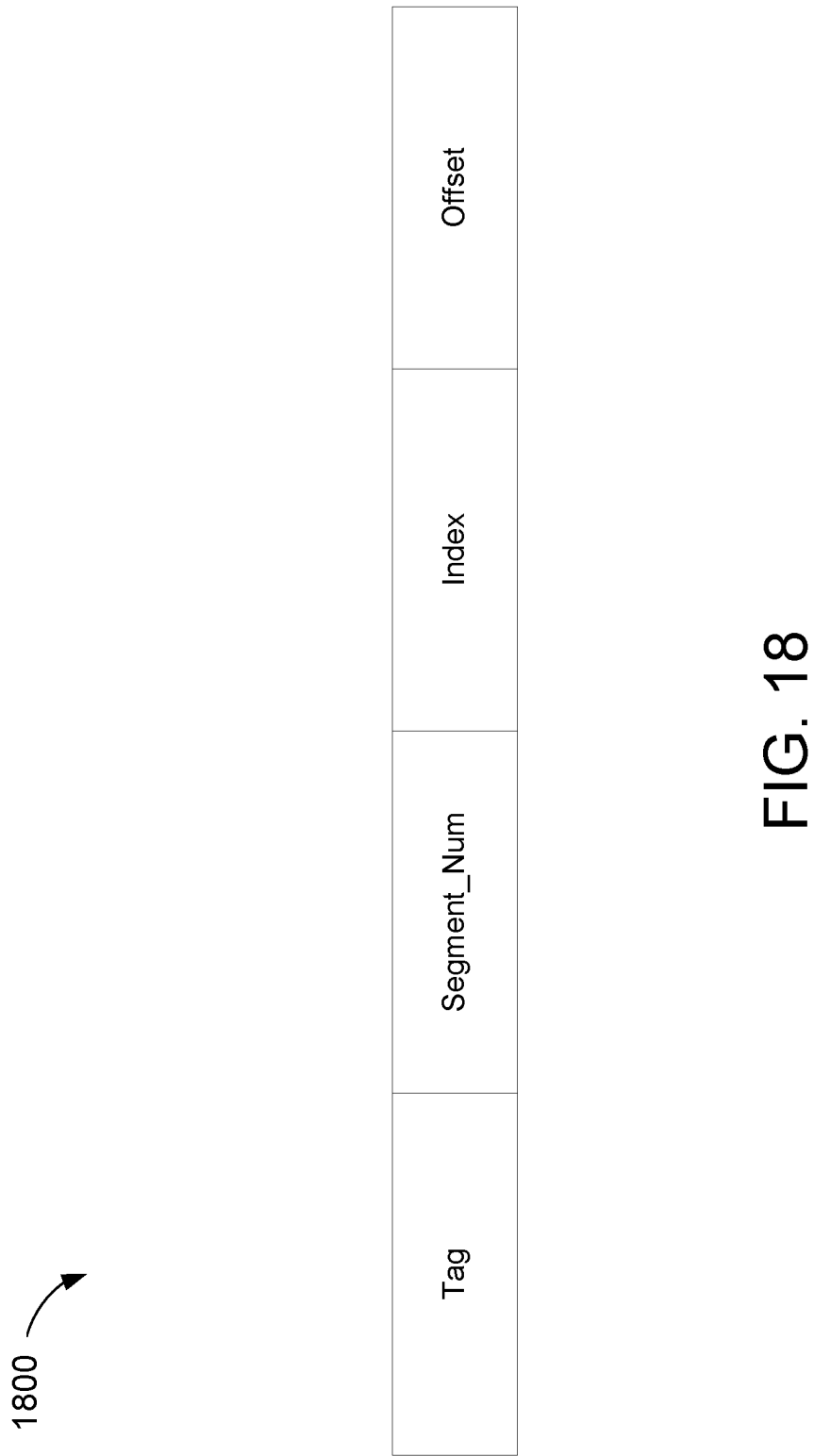
FIG. 18 shows an example cache address, in accordance with some embodiments.

FIG. 18 shows an example cache address 1800, in accordance with some embodiments. The cache address 1800 may represent a virtual address or location of a data element stored in a cache memory (e.g., the cache memory 1022 of FIG. 10). As shown in FIG. 18, the cache address 1800 may include a tag, a segment number (also referred to as the "segment_num"), an index, and an offset. In some embodiments, the tensor parameters, subtensor parameters, mapping tensor parameters, and engine address associated with a given data element may be used to determine a cache address (e.g. an index, a segment number, an offset, and a tag) for the data element. The index of the cache address 1800 refers to a particular cache line (e.g., the cache line 1 of FIG. 14) of the cache memory in which the data element may be stored. To determine the index for the data element, a map address (also referred to as a "map_address") is first calculated based on the engine address (e.g., (X, Y, Z)), subtensor parameters, and mapping tensor parameters associated with the data element, as follows in Equation 1:

$$\text{Map\_Address} = (X \% \text{SubT\_Width})\% \text{MapT\_Width} +$$
$$\text{MapT\_Width} * ((Y \% \text{SubT\_Height})\% \text{MapT\_Height}) + \text{MapT\_Width} *$$
$$\text{MapT\_Height} * ((Z \% \text{SubT\_CH\_Num})\% \text{MapT\_Ch\_Num})$$

In Equation 1, the symbol, %, represents a modulus operator. In some aspects, the subtensor parameters of Equation 1 may be associated with a subtensor of at least three dimensions, and a tensor of at least three dimensions, where the tensor includes the subtensor. Similarly, the mapping tensor parameters of Equation 1 may be associated with a mapping tensor of at least three dimensions.

In some embodiments, after determining the map address for the data element, the index may be calculated as follows in Equation 2:

$$\text{Index} = \text{Floor}\left(\frac{\text{Map\_Address}}{\text{Section\_Size}}\right)$$

In Equation 2, the section_size represents the size of a section (as described above with reference to FIG. 10) in the cache memory. The term "floor" represents a floor function.

In some embodiments, the segment number of the cache address 1800 for the data element refers to a number that reflects the particular segment in which the data element is stored (e.g., the segment numbered "1" in FIG. 10). The segment number (also referred to as Segment$_{Num}$) may be determined based on the engine coordinates, the subtensor parameters, and the tensor parameters associated with the data element, as follows in Equation 3:

$$\text{Segment}_{Num} = \text{Floor}\left(\frac{X}{\text{SubT}_{Width}}\right) + \text{Floor}\left(\frac{Y}{\text{SubT}_{Height}}\right) * \text{Alloc}_{Width} +$$
$$\left(\frac{Z}{\text{SubT\_CH\_Num}}\right) * \text{Alloc\_Height} * \text{Alloc\_Width}$$

In Equation 3, the term "floor" represents a floor function, as explained above with reference to Equation 2.

In some embodiments, the offset of the cache address 1800 refers to a location of the data element within a section of a segment of the cache memory. The offset may be determined based on the map address of Equation 1 and the section size (also referred to as the "section_size," as follows in Equation 4:

$$Offset = Ma\_Address \% Section\_Size$$

In Equation 4, the symbol, %, represents a modulus operator, as explained above.

To determine the tag of the cache address 1800 for the data element, a segment address (also referred to as a "segment_address") may first be calculated based on the engine address and subtensor parameters associated with the data element, as follows in Equation 5:

$$Segment\ Address = X \% SubT_{Width} + (Y \% SubT_{Height}) * SubT_{Width} + (Z \% SubT\_CH\_Num) * SubT\_Width * SubT\_Height$$

In Equation 5, the symbol, %, represents a modulus operator, as explained above.

In some aspects, the tag of the cache address 1800 represents a unique identification of the data element stored in the cache memory. In some embodiments, the tag may be determined based on the segment address of Equation 5 and the section size, as follows in Equation 6:

$$Tag = Floor\left(\frac{Segment\ Address}{Section\_Size}\right)$$

In Equation 6, the term "floor" represents a floor function, as discussed above.

FIG. 19 shows an example tag array 1900, in accordance with some embodiments. In some aspects, the tag array 1900 may be used by a data processing system (e.g., the data processing system 120 of FIG. 1) to manage the data elements stored in a cache memory (e.g., the cache memory 122 of FIG. 1). Where a cache memory stores L data elements, a tag for each respective data element of the L data elements (e.g., Tag 1, Tag 2, . . . , Tag L) may be stored in the tag array 1900. In some aspects, each tag of the tag array 1900 may be associated with (or correspond to) a respective cache line in a cache memory (e.g., the cache memory 122 of FIG. 1). The tag array 1900 may also store, for each of Tag 1, Tag, 2, . . . . Tag L, a corresponding valid bit for each segment of the cache memory. For example, with respect to Tag 1 shown in FIG. 19, the tag array 1900 includes the following valid bits: valid bit$_{segment\ 1}$, valid bit$_{segment\ 2}$, . . . , valid bit$_{segment\ K}$. In some embodiments, each valid bit for a respective segment may represent whether the data element of a corresponding tag is currently stored in the respective segment. For example, with reference to Tag 1 of FIG. 19, the valid bit$_{segment\ 1}$ may represent whether a data element identified by Tag 1 is currently stored in a segment 1 of a cache memory. In some embodiments, a valid bit (for a respective segment) may be set to a value of 1 when a data element of a tag corresponding to the valid bit is currently stored in the respective segment; otherwise, the valid bit may be set to a value of 0. In some aspects, one or more tags of the tag array 1900 may identify one or more data elements, respectively, that are stored in a particular (or the same) segment of a cache memory (e.g., the segment 1 of the cache memory 1022 of FIG. 10).

As described above with reference to FIG. 11, when multiple engines process a layer of a CNN, the engines may operate in lock step. In some embodiments, to facilitate this operation, and to ensure that the engines do not suffer contentions when reading data elements stored in one or more segments, the engines may be subject to various restrictions.

Figure 20:
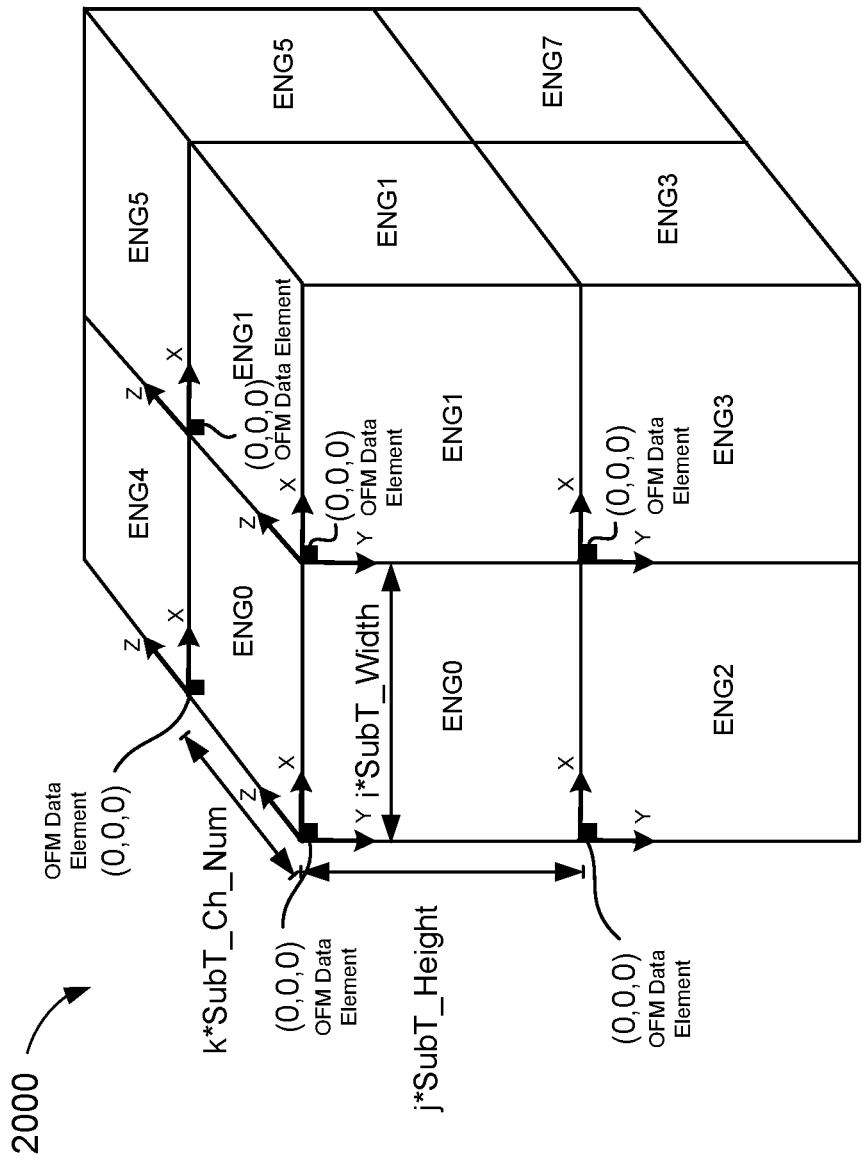
FIG. 20 shows a set of engines subject to various restrictions while processing a layer of a CNN, in accordance with some embodiments.

FIG. 20 shows a set of engines (e.g., ENG0-ENG7) subject to various restrictions while processing a layer of a CNN, in accordance with some embodiments. More specifically, FIG. 20 shows that ENG0-ENG7 are allocated according to combined allocation, and that during a given time period, each of ENG0-ENG7 may produce an OFM data element located at, for example, the origin of a respective X, Y, Z coordinate system (e.g., an OFM data element with engine coordinates of (0,0,0)). Put differently, during a given time period, each of ENG0-ENG7 may convolve an IFM data element from a cache memory in order to produce a respective OFM data element with engine coordinates of (0,0,0).

In some embodiments, to ensure that there are no read contentions among each of ENG0-ENG7, the distance between each of the OFM data elements with engine coordinates of (0,0,0) may be limited. For example, with reference to ENG0 and ENG1 of FIG. 20, the distance between the OFM data element produced by ENG0 at (0,0,0) and the OFM data element produced by ENG1 at (0,0,0) may be limited, along the X axis, to i*SubT_Width, where i represents an integer (e.g., i= . . . −3, −2, −1, 0, 1, 2, 3 . . . ). The SubT_Width may represent a subtensor parameter of a subtensor that includes the IFM data element(s) used to produce the OFM data elements at (0,0,0) for each of ENG0 and ENG1. Similarly, the distance between the OFM data element produced by ENG0 at (0,0,0) and the OFM data element produced by ENG2 at (0,0,0) may be limited, along the Y axis, to j*SubT_Height, where j represents an integer (e.g., j= . . . 3, −2, −1, 0, 1, 2, 3 . . . ). The SubT_Height may represent a subtensor parameter of a subtensor that includes the IFM data element(s) used to produce the OFM data elements at (0,0,0) for each of ENG0 and ENG2. Likewise, the distance between the OFM data element produced by ENG0 at (0,0,0) and the OFM data element produced by ENG4 at (0,0,0) may be limited, along the Z axis, to k*SubT_CH_Num, where k represents an integer (e.g., k= . . . 3, −2, −1, 0, 1, 2, 3 . . . ). The SubT_CH_Num may represent a subtensor parameter of a subtensor that includes the IFM data element(s) used to produce the OFM data elements at (0,0,0) for each of ENG0 and ENG4.

Figure 21:
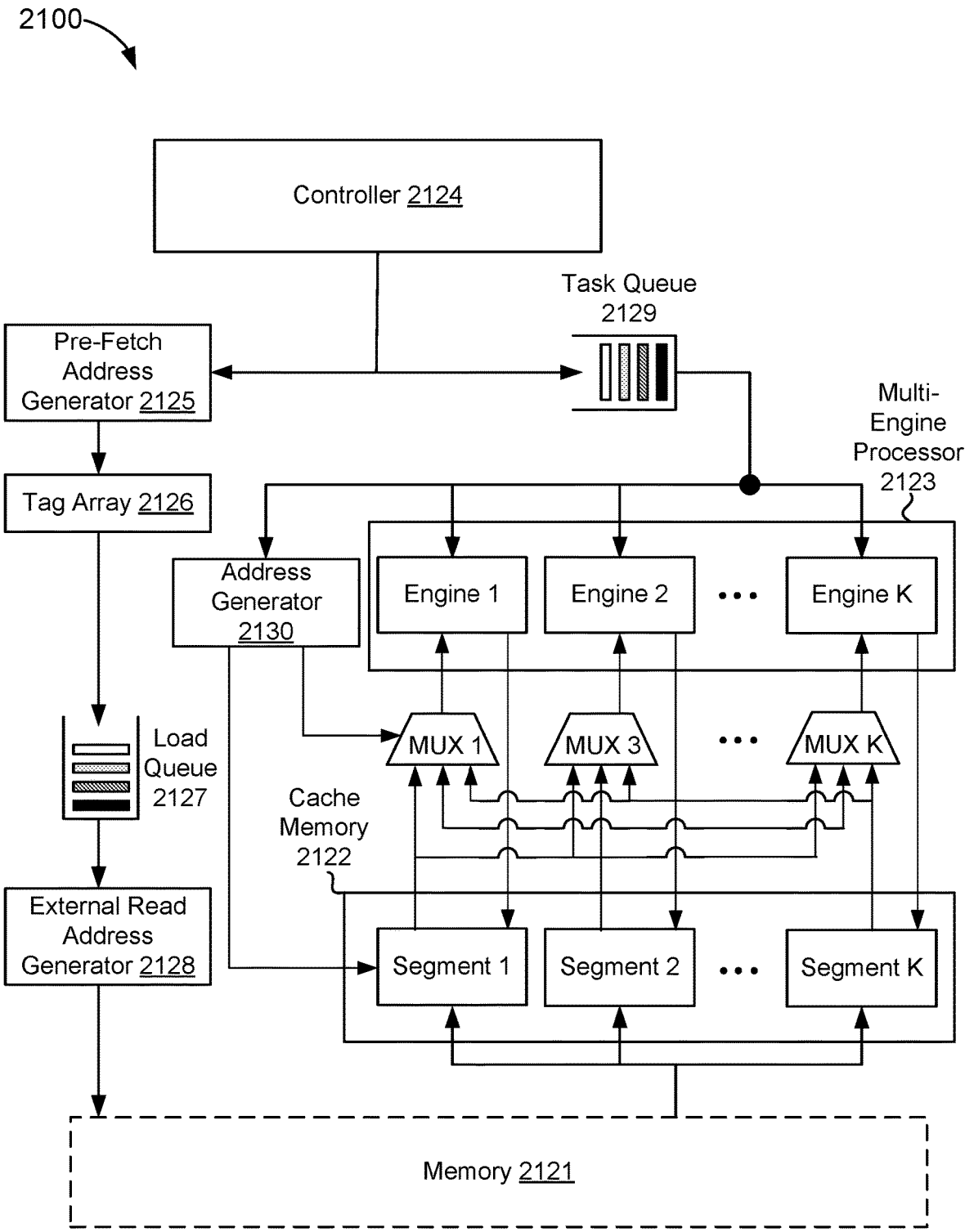
FIG. 21 shows a block diagram of a data processing system, in accordance with some embodiments.

FIG. 21 shows a block diagram of a data processing system 2100, in accordance with some embodiments. The data processing system 2100 may be an embodiment of the data processing system 120 of FIG. 1. In some embodiments, the data processing system 2100 may represent a neural network processing system (e.g., a convolutional neural network processing system). As shown in FIG. 21, in some embodiments, the data processing system 2100 may include a memory 2121, a cache memory 2122, a multi-engine processor 2123, and a number (K) of multiplexors (e.g., MUX 1, MUX 2, . . . , MUX K). The data processing system 2100 may also include a pre-fetch address generator 2125, a tag array 2126, a load queue 2127, an external read address generator 2128, a task queue 2129, and an address generator 2130. The memory 2121, the cache memory 2122, and the multi-engine processor 2123 may be embodiments of the memory 121, the cache memory 122, and the multi-engine processor 123, respectively, of FIG. 1. In some embodiments, the data processing system 2100 may be configured to execute, for example, a CNN using the multi-engine processor 2123 and the cache memory 2122.

In some embodiments, the memory 2121 may represent a main memory, a shared memory, or an external memory. In embodiments where the memory 2121 represents an external memory, the memory 2121 may be separate from (or external to) the data processing system 2100. Further, in some embodiments, the memory 2121 may store one or more tensors of data elements (e.g., the tensors 702A and/or 702B of FIGS. 7A and 7B, respectively). For example, the memory 2121 may store one or more tensors of weights, one or more tensors of IFM data elements, and/or one or more tensors of OFM data elements. In some embodiments, each of the one or more tensors stored in the memory 2121 may be virtually partitioned into a number (K) of subtensors. Further, in some embodiments, the memory 2121 may be configured to receive one or more commands from the external read address generator 2128. The memory 2121 may also be configured to output one or more data elements to the cache memory 2122 using, for example, a mapping tensor (e.g., the mapping tensor Z of FIG. 14).

As shown in FIG. 21, the cache memory 2122 may include a number (K) of segments. Each of the K segments may be configured to store one or more data elements of a tensor that is partitioned into K subtensors and stored in the memory 2121. More specifically, each of the K segments may be configured to store one or more data elements of a respective one of the K partitioned subtensors (of the tensor) stored in the memory 2121. Further, in some embodiments, the cache memory 2122 may be configured to store only one type of data element (at least at a given time). For example, the cache memory 2122 may be configured to store only IFM data elements, only weights, or only OFM data elements.

While FIG. 21 shows only one cache memory 2122, in some embodiments, the data processing system 2100 may include multiple cache memories 2122. For example, the data processing system 2100 may include one or more cache memories 2122 configured to store IFM data elements, and/or one or more cache memories 2122 configured to store weights, and/or one or more cache memories 2122 configured to store OFM data elements. In some embodiments, the cache memory 2122 may represent Level 1 (also referred to as "L1") cache memory. Further, the cache memory 2122 may be configured to output one or more data elements, and to receive one or more data elements from the multi-engine processor 2123. The cache memory 2122 may also be configured to receive one or more commands from the address generator 2130.

In some embodiments, each of the K multiplexors (e.g., MUX 1, MUX 2, . . . , MUX K) may be configured to select, based on a segment number determined using Equation 3, a respective segment of the cache memory 2122. Further, each of the K multiplexors may be configured to receive one or more data elements from the respective selected segment, and to output the one or more data elements to a respective engine of the multi-engine processor 2123. In some embodiments, each of the K multiplexors may also be configured to receive one or more commands from the address generator 2130.

As shown in FIG. 21, the multi-engine processor 2123 may include a number (K) of engines (e.g., engine, 1, engine 2, . . . , engine K). In some aspects, each of the K engines may represent a respective processor or core, and be an embodiment of one of ENG0-ENG7 of FIG. 20. In some embodiments, the multi-engine processor 2123 may represent a neural network processor (e.g., a convolutional neural network processor) configured to execute, for example, a CNN, and to output one or more inferences or predictions, using the K engines. In such embodiments, each of the K engines may operate in lock step to process a given layer of the CNN in accordance with a CNN access pattern. Further, the operations of the K engines (e.g., loading, multiplying, and/or accumulating operations) may be determined (or predicted) in advance of executing the CNN. In some other embodiments, the multi-engine processor 2123 may represent a neural network processor configured to train, and output, a neural network model using the K engines. As shown in FIG. 21, in some embodiments, the multi-engine processor 2123 may be configured to receive one or more commands from the task queue 2129. Further, the multi-engine processor 2123 may be configured to generate one or more requests for data elements (e.g., IFM or OFM data elements or weights) needed to execute, for example, the CNN.

The controller 2124 may represent a sequencer, and/or or a central processing unit, configured to manage the data processing system 2100. In some embodiments, prior to execution of, for example, a CNN, the controller 2124 may determine the operations (e.g., loading, multiplying, and/or accumulating operations) that the multi-engine processor 2123 will perform during execution of the CNN. Further, the controller 2124 may output commands related to the operation of the multi-engine processor 2123. In some embodiments, the controller 2124 may include the pre-fetch address generator 2125 and/or the address generator 2130.

In some embodiments, the pre-fetch address generator 2125 may be configured to receive commands from the controller 2124. The pre-fetch address generator 2125 may also be configured to use the received commands to generate engine coordinates (e.g., (X, Y, Z)) for each of one or more data elements (e.g., IFM data elements, OFM data elements, and/or weights) that each of engine 1-engine K will need to produce one or more output data elements (e.g., OFM data elements). For example, in some embodiments, the pre-fetch address generator 2125 may generate the engine coordinates (0,0,0), which may refer to the origin of an X, Y, Z coordinate system for engine 1 of the multi-engine processor 2123. The engine coordinates (0,0,0) may also correspond to an IFM data element that the engine 1 will need to process in order to produce an OFM data element positioned at (0,0,0) of the X, Y, Z, coordinate system for the engine 1.

In some embodiments, the pre-fetch address generator 2125 may generate one or more engine coordinates (or engine addresses) of one or more data elements many clock cycles in advance of when engine 1-engine K may request the one or more data elements. Accordingly, the pre-fetch address generator may generate the engine coordinates of the one or more data elements in order to pre-fetch the one or more data elements from the memory 2121 for storage in the cache memory 2122 (prior to engine 1-engine K requesting the one or more data elements). Further, in some embodiments, the pre-fetch address generator 2125 may translate each of the one or more engine coordinates to a respective cache address (including, for example, a tag, a segment number, an index, and an offset, as discussed above with respect to FIG. 18). The pre-fetch address generator 2125 may also generate and output one or more commands, where each of the commands may include the translated cache addresses of the one or more data elements.

The tag array 2126 may be an embodiment of the tag array 1900 of FIG. 19 and may be configured to receive the one or more commands from the pre-fetch address generator 2125. In some embodiments, for a given command received from the pre-fetch address generator 2125, the tag array 2126 may be configured to compare the cache address (for a particular data element) included in the command with the contents (e.g., tags and valid bits) of the tag array 2126 to determine whether the data element is currently stored in the cache memory 2122. In some instances, the tag array 2126 may determine that the data element corresponding to the cache address is not currently stored in the cache memory 2122 because the data element has not yet been requested by the multi-engine processor 2123 or the address generator 2130 and is thus being pre-fetched. Such a determination may be referred to as a "cache miss." When there is a cache miss, the tag array 2126 may generate a request (or command) for the data element to be fetched from the memory 2121, where the request may include the engine coordinates of the data element.

In some embodiments, the request may also include the engine coordinates of one or more other data elements that are to be stored near the data element in the cache memory 2122 based on the principle of spatial locality (and in accordance with a CNN access pattern). For example, the request may include not only the engine coordinates of the data element, but also the engine coordinates of all data elements that are be stored in the same cache line as the data element in the cache memory 2122 based on a CNN access pattern. In cases where the tag array 2126 determines that the data element corresponding to the cache address is currently stored in the cache memory 2122, the tag array 2126 may not generate a request for the data element. Further, such a determination may be referred to as a "cache hit."

In some embodiments, the load queue 2127 may represent a buffer (e.g., a first-in first-out buffer) configured to store one or more requests received from the tag array 2126. In some other embodiments, the load queue 2127 may represent a linked list that includes one or more requests received from the tag array 2126. The load queue 2127 may be configured to output the one or more requests.

The external read address generator 2128 may be configured to receive the one or more requests from the load queue 2127, in some embodiments. The external read address generator 2128 may also be configured to translate each of the engine coordinates included in the one or more requests into a respective address within the memory 2121. For example, the external read address generator 2128 may be configured to translate the engine coordinates for a data element into an address of the data element in the memory 2121.

In some embodiments, the address in the memory 2121 for the data element may be determined based on an address in the memory 2121 of the tensor (e.g., the tensor 702A of FIG. 7A) in which the data element is included (also referred to as the "MainT_Base_Address." The address in the memory 2121 for the data element may also be determined based on various dimensions of the tensor, including the width of the tensor (also referred to as the "MainT_Width"), the height of the tensor (also referred to as the "MainT_Height"), and the depth of the tensor (also referred to as the "MainT_CH_Num"). In some embodiments, the MainT_Width, the MainT_Height, and the MainT_CH_Num may be represented in units of bytes or words. Accordingly, the external read address generator 2128 may translate the engine coordinates of the data element into an address in the memory 2121 as follows in Equation 7:

$$\text{Memory Address} = MainT_{Base_{Address}} + X + Y * MainT_{Width} + Z * \text{MainT\_Width} * \text{MainT\_Height}$$

Once the external read address generator 2128 has translated the engine coordinates for each data element in the one or more requests to a respective address in the memory 2121, the external read address generator 2128 may proceed to generate one or more read requests for the data elements. Each read request may include, for example, the address in the memory 2121 for at least one data element. In some embodiments, the memory 2121 may receive the one or more read requests, and use the one or more addresses in the one or more read requests to pre-fetch (or fetch) the corresponding one or more data elements. The one or more data elements may subsequently be transmitted (or copied) from the memory 2121 to the cache memory 2122 using a mapping tensor (e.g., the mapping tensor Z of FIG. 14), and stored in the cache memory 2122. Because the one or more data elements may be pre-fetched from the memory 2121 and then stored in the cache memory 2122 in accordance with a CNN access pattern, the data elements may be readily available for processing by the multi-engine processor 2123. As a result, the multi-engine processor 2123 may not experience idle cycles (or latency) resulting from cache misses.

In some embodiments, the task queue 2129 may be a buffer (e.g., a first-in first-out buffer) configured to store one or more commands received from the controller 2124. In some other embodiments, the task queue 2129 may be a linked list that includes one or more commands received from the controller 2124. The task queue 2129 may be configured to output the one or more commands to the address generator 2130 and/or the multi-engine processor 2123. In some embodiments, where the multi-engine processor 2123 has generated a request for a data element that is not currently stored in the cache memory 2122, the task queue 2129 may not output (or may hold) the one or more commands to the multi-engine processor 2123 until the multi-engine processor 2123 receives the requested data element.

The address generator 2130 may be configured to receive one or more commands from the task queue 2129. The address generator 2130 may also be configured to use the received commands to generate engine coordinates (e.g., (X, Y, Z)) for each of one or more data elements that each of engine 1-engine K currently needs in order to produce one or more OFM data elements. Further, in some embodiments, the address generator 2130 may receive one or more requests from the multi-engine processor 2123 for one or more data elements, where each of the one or more requests includes the engine coordinates of the requested one or more data elements.

The address generator 2130 may be further configured to translate the engine coordinates received from the multi-engine processor 2123 and/or generated by the address generator 2130 to one or more cache addresses, where each cache address corresponds to a respective data element. Further, each cache address may include, for example a tag, a segment number, an index, and an offset, as discussed above with respect to FIG. 18. In some embodiments, the address generator 2130 may also generate and output one or more commands, where each of the commands may include one or more cache addresses. The address generator 2130 may further output the one or more commands to the multiplexors (e.g., MUX 1, MUX 2, . . . , MUX K) and/or the cache memory 2122. In some embodiments, the multiplexors (e.g., MUX 1, MUX 2, . . . , MUX K) and/or the cache memory 2122 may use the cache addresses in the one or more commands to fetch the corresponding data elements and output the data elements to the multi-engine processor 2123.

Figure 22:
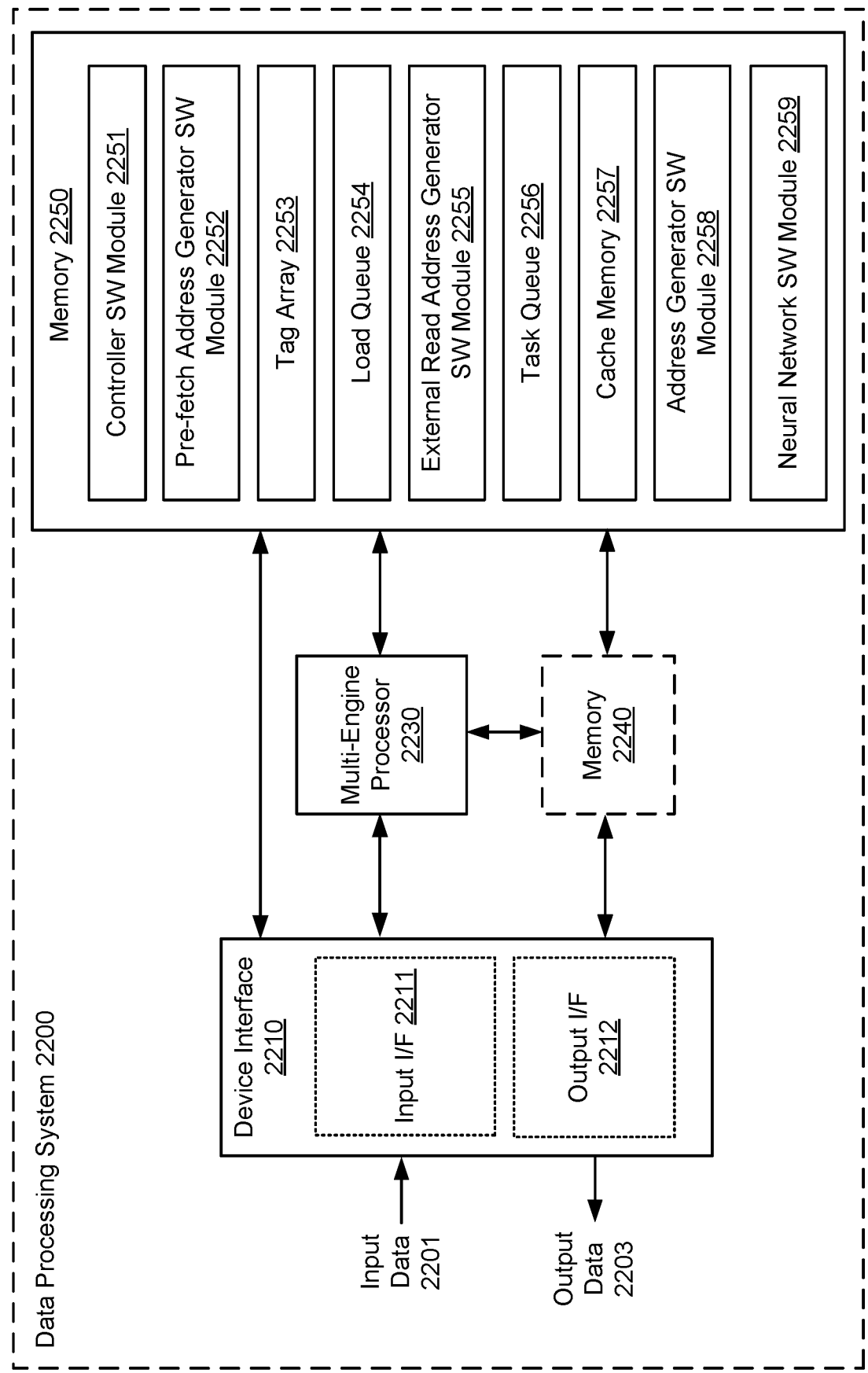
FIG. 22 shows a block diagram of a data processing system, according to some embodiments.

FIG. 22 shows a block diagram of a data processing system 2200, according to some embodiments. The data processing system 2200 may be one example of the data processing system 2100 of FIG. 21. In some embodiments, the data processing system 2200 may be configured to execute a neural network (e.g., a CNN) using a multi-engine processor 2230 and a cache memory 2257. As shown in FIG. 22, the data processing system 2200 may include a device interface ("I/F") 2210, the multi-engine processor 2230, a memory 2240, and a memory 2250. In some embodiments, the device I/F 2210 may include an input I/F 2211 configured to receive input data 2201 (e.g., the input signal 101 and/or the input data 102 of FIG. 1) and transmit the input data 2201 to the memory 2240 for storage. The input I/F 2211 may also be configured to communicate with the memory 2240, the multi-engine processor 2230, and/or the memory 2250. As shown in FIG. 22, the device I/F 2210 may also include an output I/F 2212 configured to output (or transmit) output data 2203 (e.g., the output data 103 of FIG. 1). The output I/F 2212 may be configured to communicate with the memory 2240, the multi-engine processor 2230, and/or the memory 2250.

In some embodiments, the multi-engine processor 2230 may be an embodiment of the multi-engine processor 2123 of FIG. 21. In some embodiments, the multi-engine processor 2230 may include a number (K) of engines. Further, the multi-engine processor 2230 may represent a neural network processor (e.g., a convolutional neural network processor) configured to execute a neural network (e.g., a CNN) of a neural network SW module 2259 of the memory 2250. The operations performed by the K engines of the multi-engine processor 2230 may be known (or determined) in advance of executing the neural network. In some embodiments, the multi-engine processor 2230 may be configured to receive one or more commands from a task queue 2256 of the memory 2250. The multi-engine processor 2230 may also be configured to generate one or more requests for data elements needed to execute the neural network.

In some embodiments, the memory 2240 may include a non-transitory computer-readable medium (including one or more nonvolatile memory elements, such as EPROM, EEPROM, Flash memory, a hard drive, and the like) that may store the input data 2201. The memory 2240 may represent a main memory, a shared memory, or an external memory. Further, in some aspects, the memory 2240 may represent plain linear memory. In embodiments where the memory 2240 represents an external memory, the memory 2240 may be separate from (or external to) the data processing system 2200. In some embodiments, the memory 2240 may be configured to receive configuration data (e.g., tensor parameters, subtensor parameters, and/or mapping tensor parameters) from the memory 2250. The memory 2240 may also be configured to use the configuration data to virtually partition at least one tensor stored in the memory 2240 into a number (K) of subtensors. Further, the memory 2240 may be configured to receive one or more commands from an external read address generator SW module 2255 of the memory 2250. In some embodiments, the memory 2240 may also be configured to use a mapping tensor defined by the configuration data to output one or more data elements to the cache memory 2257 of the memory 2250.

The memory 2250 may include a non-transitory computer-readable medium (including one or more nonvolatile memory elements, such as EPROM, EEPROM, Flash memory, a hard drive, and the like) that may store at least the following:

a controller SW module 2251 configured to (i) manage the data processing system 2200, (ii) determine, prior to the execution of a neural network (e.g., a CNN), the operations that will be performed by the multi-engine processor 2230 during the execution of the neural network; and (iii) output commands relating to the determined operations;

a pre-fetch address generator SW module 2252 configured to receive the commands from the controller SW module 2251, generate engine coordinates corresponding to one or more data elements associated with the commands, translate the engine coordinates into one or more cache addresses, and output commands that include at least the engine coordinates and one or more cache addresses;

a tag array 2253 configured to receive the one or more commands (including the engine coordinates and the one or more cache addresses) from the pre-fetch address generator SW module 2252, determine whether one or more data elements corresponding to the one or more cache addresses are currently stored in the cache memory 2257, and output one or more requests that include at least the cache addresses and engine coordinates of one or more data elements not currently stored in the cache memory 2257;

a load queue 2254 configured to store one or more requests received from the tag array 2253, and to output the one or more requests;

an external read address generator SW module 2255 configured to receive the one or more requests from the load queue 2254, translate each of the engine coordinates included in the one or more requests into a respective address within the memory 2240, and output one or more read requests including at least the translated addresses;

the task queue 2256 configured to store one or more commands received from the controller SW module 2251, and to output the one or more commands;

the cache memory 2257 configured to (i) receive and store one or more data elements from the memory 2240, (ii) receive one or more commands from an address generator SW module 2258, (iii) receive and store one or more data elements from the multi-engine processor 2230, and (iv) output one or more data elements;

an address generator SW module 2258 configured to receive one or more commands from the task queue 2256 and/or one or more requests from the multi-engine processor 2230, and output one or more commands requesting one or more data elements; and a neural network SW module 2259 that includes a neural network model (e.g., a CNN) configured to be executed by the multi-engine processor 2230.

Each software module includes instructions that, when executed by the data processing system 2200, cause the data processing system 2200 to perform the corresponding functions.

The data processing system 2200 may include any suitable one or more processors capable of executing scripts or instructions of one or more software programs stored in the data processing system 2200 (such as in the memory 2250). For example, the data processing system 2200 may execute the controller SW module 2251 to (i) manage the data processing system 2200; (ii) determine, prior to the execution of the neural network (e.g., a CNN), the operations that will be performed by the multi-engine processor 2230 during the execution of the neural network; and (iii) output at least one command relating to the determined operations.

In some embodiments, the data processing system 2200 may further execute the pre-fetch address generator SW module 2252 to receive a command from the controller SW module 2251, generate engine coordinates for a data element associated with the received command, translate the engine coordinates into a cache address for the data element, and output a command that includes at least the engine coordinates and the cache address for the data element. The data processing system 2200 may further use the tag array 2253 to (i) receive the command from the pre-fetch address generator SW module 2252, (ii) determine whether the data element corresponding to the cache address in the command is currently stored in the cache memory 2257, and (iii) if the data element is not currently stored in the cache memory 2257, output a request that includes at least the engine coordinates and cache address of the data element.

In some embodiments, the data processing system 2200 may use the load queue 2254 to store the request received from the tag array 2253, and to output the request. The data processing system 2200 may further execute the external read address generator SW module 2255 to receive the request, translate the engine coordinates (for the data element) in the request to an address in the memory 2240, and output a read request that includes the translated address in the main memory 2240. In some embodiments, the data processing system 2200 may use the memory 2240 to receive the request from the external read address generator SW module 2252, pre-fetch (or fetch) the data element stored at the translated address in the memory 2240 using a mapping tensor (e.g., the mapping tensor Z of FIG. 14). In some embodiments, prior to pre-fetching (or fetching) the data element from the memory 2240, the data element may have been input to the input I/F 2211 (e.g., as input data 2201) and transmitted from the input I/F 2211 to the memory 2240 for storage. The data processing system 2200 may further use the cache memory 2257 to receive the data element from the memory 2240, store the data element, and output the data element to the multi-engine processor 2230. In some embodiments, the data processing system 2200 may execute the neural network model of the neural network SW module 2259 using the multi-engine processor 2230 and the data element output to the multi-engine processor 2230. The data processing system 2200 may subsequently produce an OFM data element based at least in part on the data element and the neural network model. In some embodiments, the data processing system 2200 may store the OFM data element in the cache memory 2257 and/or the memory 2240. The data processing system 2200 may further transmit the OFM data element to the output I/F 2212, and in some embodiments, the output I/F 2212 may transmit (or output) the OFM data element as the output data 2203, as shown in FIG. 22.

Further, in some embodiments, the data processing system 2200 may use the task queue 2256 to receive a command from the controller SW module 2251, and to output the command to an address generator SW module 2258 and/or the multi-engine processor 2230. The data processing system 2200 may execute the address generator SW module 2258 to receive the command from the task queue 2256. In some embodiments, the data processing system 2200 may further execute the address generator SW module 2258 to output a command (e.g., requesting one or more data elements) to the cache memory 2257.

Figure 23:
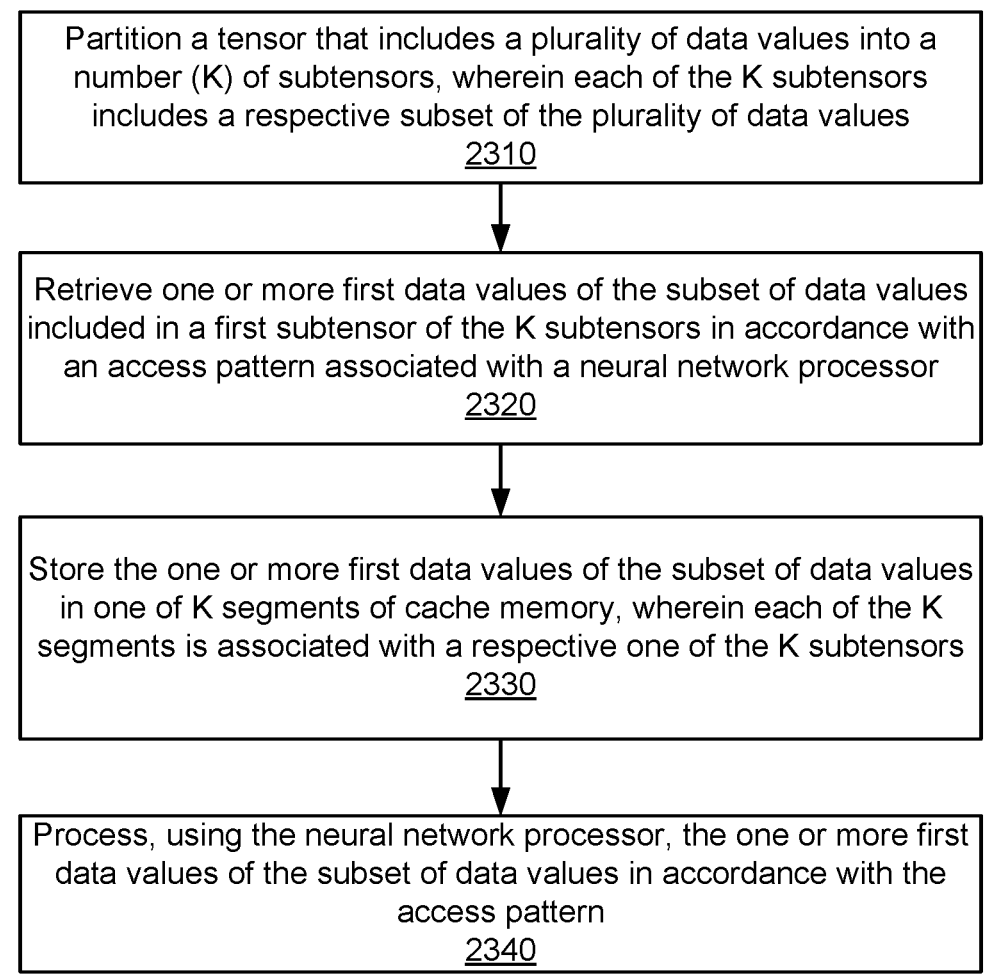
FIG. 23 shows an illustrative flowchart depicting an example operation 2300, according to some embodiments.

FIG. 23 shows an illustrative flowchart depicting an example operation 2300, according to some embodiments. The example operation 2300 may be performed by a data processing system (e.g., the data processing system 2100 and/or 2200 of FIGS. 21 and 22, respectively) to execute a neural network (e.g., a CNN) using a neural network processor (e.g., the multi-engine processor 2123 of FIG. 21) and a cache memory (the cache memory 2122 of FIG. 21). In some embodiments, the data processing system may include at least the neural network processor and the cache memory. Further, in some embodiments, the data processing system may include a memory (e.g., the memory 2121 of FIG. 21), while in other embodiments, the memory may be external to the data processing system.

As shown in FIG. 23, the data processing system may partition a tensor that includes a plurality of data values into a number (K) of subtensors, where each of the K subtensors includes a respective subset of the plurality of data values (2310). In some embodiments, the tensor and the K subtensors may be stored in the memory (e.g., the memory 2121 of FIG. 21). Further, the plurality of data values may collectively represent, for example, an IFM, an OFM, or a plurality of weights (e.g., of a CNN model). In some embodiments, each of the K subtensors may be of the same size or dimension (e.g., has the same width, height, and depth).

The data processing system may further retrieve one or more first data values of the subset of data values included in a first subtensor of the K subtensors in accordance with an access pattern associated with a neural network processor (2320). The one or more first data values may be an example of the data elements labeled 1-4 of FIG. 14. The access pattern may be an embodiment of the CNN access pattern discussed above with reference to FIGS. 6A-6D, and the neural network processor may be an embodiment of the multi-engine processor 2123 of FIG. 21. In some embodiments, the one or more first data values of the subset may be retrieved from the memory (e.g., the memory 2121 of FIG. 21). Further, each of the one or more first data values of the subset may be associated with a respective cache address including a tag, a segment number, an index and an offset. Each respective cache address may be an embodiment of the cache address discussed above with reference to FIG. 18. Each of the one or more first data values of the subset may also be associated with a processor address including a plurality of coordinates of a coordinate system. Each of the processor addresses may be an example of an engine address (or engine coordinates) discussed above with reference to FIG. 11. Further, in some embodiments, the data processing system may retrieve the one or more first data values of the subset by pre-fetching the one or more first data values of the subset prior to receiving a request from the neural network processor for the one or more first data values of the subset.

In some embodiments, the data processing system may store the one or more first data values of the subset of data values in one of K segments of the cache memory, where each of the K segments may be associated with a respective one of the K subtensors (2330). The cache memory may include level 1 (L1) cache memory. Further the one or more first data values of the subset may be associated with a plurality of dimensions of a mapping tensor, where the mapping tensor is configured to map, in accordance with the access pattern, the subset of data values included in the first subtensor to the segment of cache memory associated with the first subtensor. The mapping tensor may be an embodiment of the mapping tensor Z of FIG. 14 and/or the mapping tensor 1702$_{MT}$ of FIG. 17. Further, the plurality of dimensions of the mapping tensor may include a width, a height, and a channel of the mapping tensor. The width, the height, and the channel of the mapping tensor may be examples of the parameters MapT_Width, MapT_Height, and MapT_CH_Num, respectively, discussed above with reference to FIG. 17.

The data processing system may further process, using the neural network processor, the one or more first data values of the subset of data values in accordance with the access pattern (2340). In some embodiments, the neural network processor includes K processors, where each of the K processors may be configured to process data using the coordinate system. The K processors of the neural network processor may be examples of the K engines of the multi-engine processor 2123, discussed above with reference to FIG. 21. Further, the neural network processor may represent a convolutional neural network processor.

In some embodiments, the data processing system may further retrieve one or more second data values of the subset of data values included in the first subtensor in accordance with the access pattern, where the one or more second data values of the subset is associated with the plurality of dimensions of the mapping tensor. The one or more second data values may be an example of the data elements labeled 5-8 of FIG. 14, and/or the data elements included in the mapping tensor X of FIG. 12B and/or FIG. 12C. The data processing system may further store the one or more second data values of the subset in the segment of the cache memory associated with the first subtensor. In addition, the data processing system may process, using the neural network processor, the one or more second data values of the subset in accordance with the access pattern.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method comprising:
partitioning a tensor that includes a plurality of data values into a number (K) of subtensors, wherein each of the K subtensors includes a respective subset of the plurality of data values;
retrieving one or more first data values of the subset of data values included in a first subtensor of the K subtensors in accordance with an access pattern associated with a mapping tensor that maps the one or more first data values to a first segment of K segments of cache memory;
storing, based on the mapping tensor, the one or more first data values of the subset of data values in the first segment of the cache memory, wherein each of the K segments is associated with a respective one of the K subtensors; and
processing, using a neural network processor, the one or more first data values of the subset of data values in accordance with the access pattern.

2. The method of claim 1, wherein each of the one or more first data values of the subset is associated with a respective cache address including a tag, a segment number, an index, and an offset.

3. The method of claim 1, wherein each of the one or more first data values of the subset is associated with a processor address including a plurality of coordinates of a coordinate system.

4. The method of claim 3, wherein the neural network processor includes K processors, and wherein each of the K processors is configured to process data using the coordinate system.

5. The method of claim 1, wherein the one or more first data values is associated with a plurality of dimensions of the mapping tensor, wherein the mapping tensor maps, in accordance with the access pattern, the data values included in the first subtensor to the first segment of the cache memory associated with the first subtensor.

6. The method of claim 5, wherein the plurality of dimensions includes a width, a height, and a channel of the mapping tensor.

7. The method of claim 5, further comprising:
retrieving one or more second data values of the subset of data values included in the first subtensor in accordance with the access pattern, wherein the one or more second data values of the subset is associated with the plurality of dimensions of the mapping tensor;
storing the one or more second data values of the subset in the first segment of the cache memory; and
processing, using the neural network processor, the one or more second data values of the subset in accordance with the access pattern.

8. The method of claim 1, further comprising:
receiving a request from the neural network processor for the one or more first data values of the subset, wherein retrieving the one or more first data values of the subset includes pre-fetching the one or more first data values of the subset prior to receiving the request from the neural network processor.

9. The method of claim 1, wherein retrieving the one or more first data values of the subset includes retrieving the one or more first data values of the subset from a memory.

10. The method of claim 1, wherein the plurality of data values represents an input feature map, an output feature map, or a plurality of weights.

11. The method of claim 1, wherein each of the K subtensors is of the same size or dimension.

12. The method of claim 1, wherein the cache memory comprises a level 1 (L1) cache memory.

13. The method of claim 1, wherein the neural network processor comprises a convolutional neural network processor.

14. A system comprising:
a processing system; and
a memory storing instructions that, when executed by the processing system, cause the system to:
partition a tensor that includes a plurality of data values into a number (K) of subtensors, wherein each of the K subtensors includes a respective subset of the plurality of data values;
retrieve one or more first data values of the subset of data values included in a first subtensor of the K subtensors in accordance with an access pattern associated with a mapping tensor that maps the one or more first data values to a first segment of K segments of cache memory;
store, based on the mapping tensor, the one or more first data values of the subset of data values in the first segment of the cache memory, wherein each of the K segments is associated with a respective one of the K subtensors; and
process, using a neural network processor, the one or more first data values of the subset of data values in accordance with the access pattern.

15. The system of claim 14, wherein each of the one or more first data values of the subset is associated with a respective cache address including a tag, a segment number, an index, and an offset.

16. The system of claim 14, wherein each of the one or more first data values of the subset is associated with a processor address including a plurality of coordinates of a coordinate system.

17. The system of claim 16, wherein the neural network processor includes K processors, and wherein each of the K processors is configured to process data using the coordinate system.

18. The system of claim 14, wherein the one or more first data values is associated with a plurality of dimensions of the mapping tensor, wherein the mapping tensor, in accordance with the access pattern, the data values included in the first subtensor to the first segment of the cache memory associated with the first subtensor.

19. The system of claim 14, wherein execution of the instructions further causes the system to:
receive a request from the neural network processor for the one or more first data values of the subset, wherein retrieving the one or more first data values of the subset includes pre-fetching the one or more first data values of the subset prior to receiving the request from the neural network processor.

20. The system of claim 14, wherein each of the K subtensors is of the same size or dimension.

* * * * *

UNITED STATES PATENT AND TRADEMARK OFFICE
CERTIFICATE OF CORRECTION

| | | |
|---|---|---|
| PATENT NO. | : 12,327,143 B2 | Page 1 of 1 |
| APPLICATION NO. | : 18/365138 | |
| DATED | : June 10, 2025 | |
| INVENTOR(S) | : Hagay Rozin et al. | |

It is certified that error appears in the above-identified patent and that said Letters Patent is hereby corrected as shown below:

In the Claims

Column 38, Line 19, "wherein the mapping tensor," should read "wherein the mapping tensor maps,"

Signed and Sealed this
Eighth Day of July, 2025

Coke Morgan Stewart
*Acting Director of the United States Patent and Trademark Office*